W. S. GUBELMANN.
ADDING AND RECORDING MACHINE.
APPLICATION FILED JAN. 10, 1900.
1,429,201.
Patented Sept. 12, 1922.
12 SHEETS—SHEET 2.
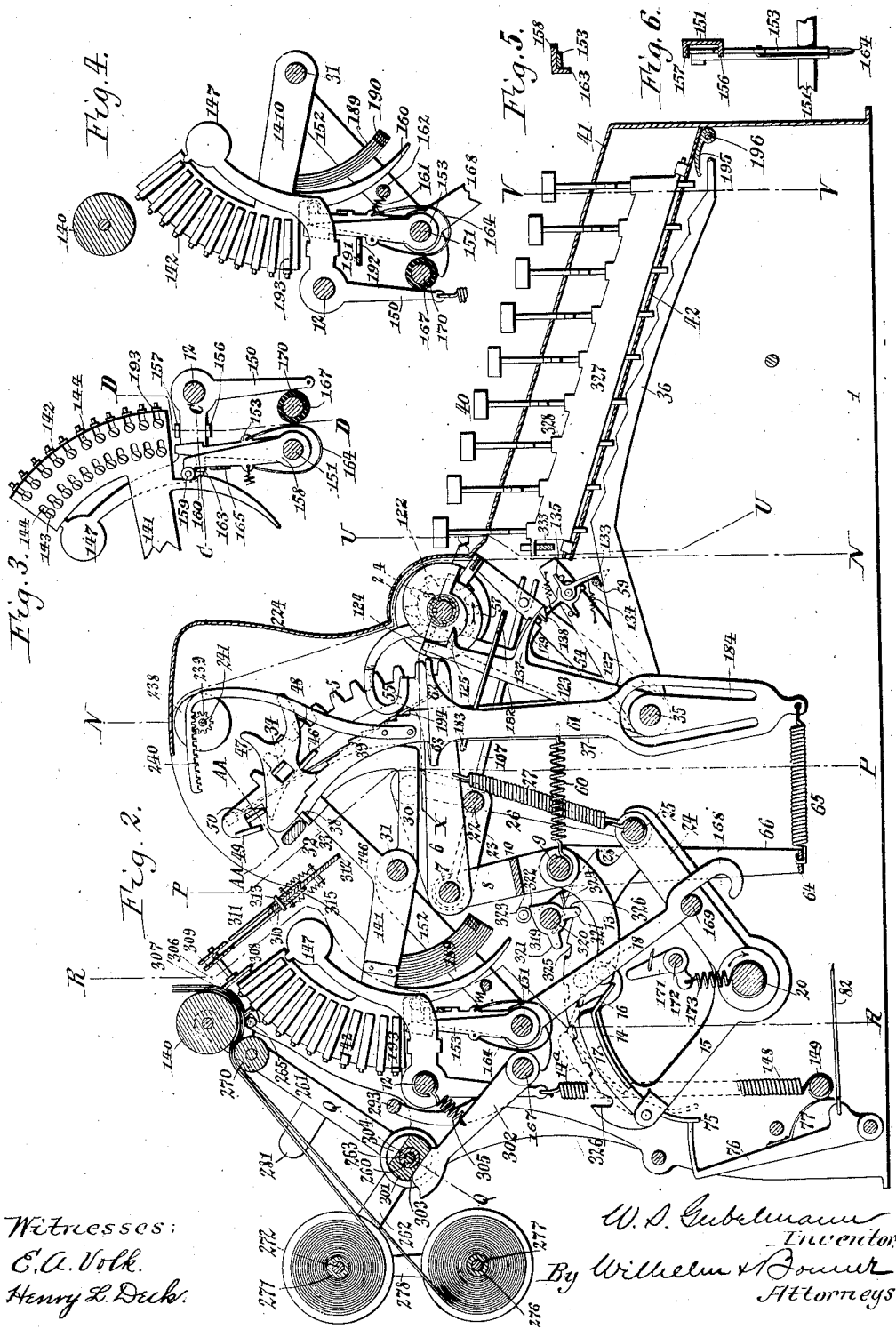
Witnesses:
E. A. Volk.
Henry L. Dick.
W. S. Gubelmann
Inventor
By Wilhelm & Bonner
Attorneys

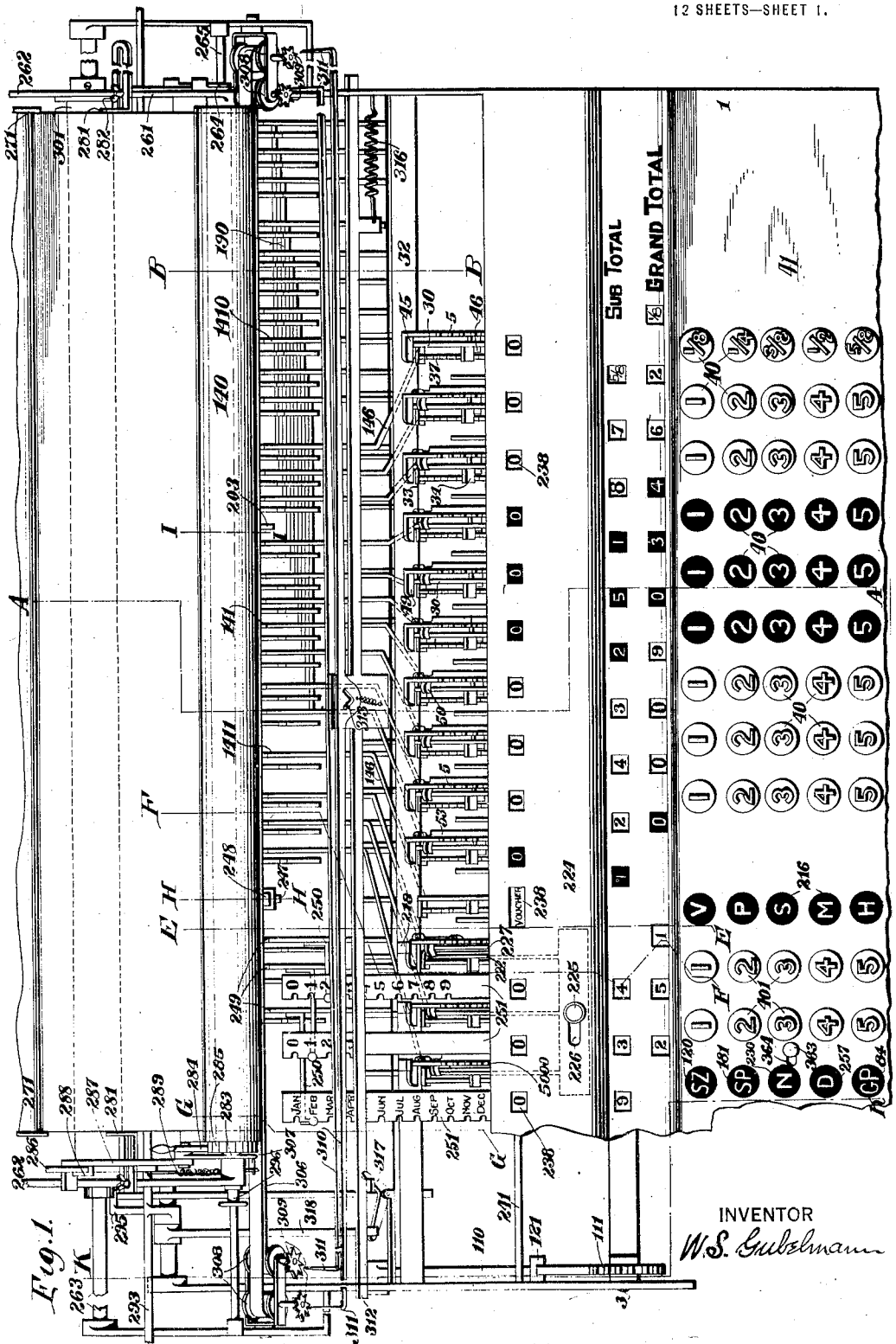

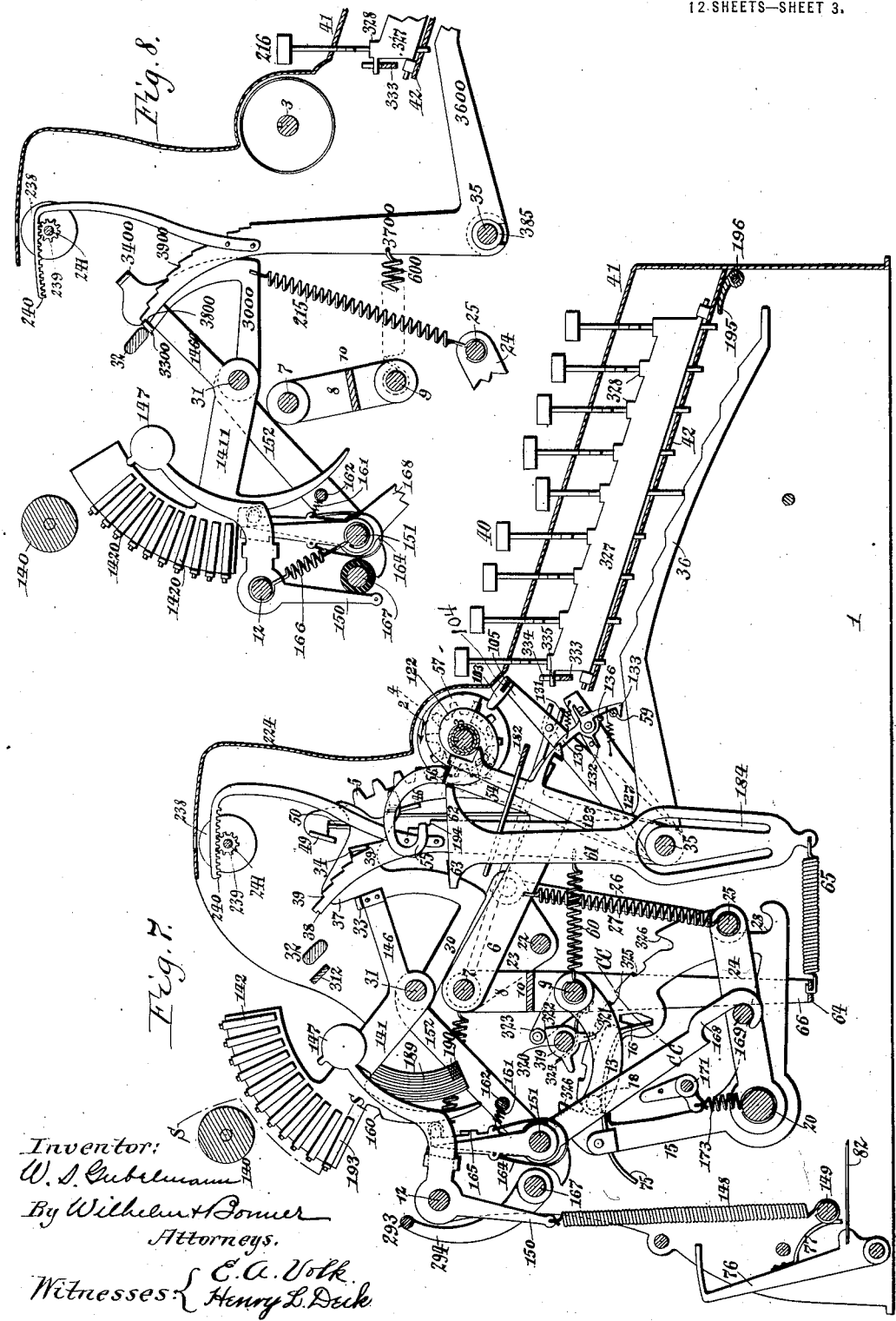

W. S. GUBELMANN.
ADDING AND RECORDING MACHINE.
APPLICATION FILED JAN. 10, 1900.
1,429,201.
Patented Sept. 12, 1922.
12 SHEETS—SHEET 4.
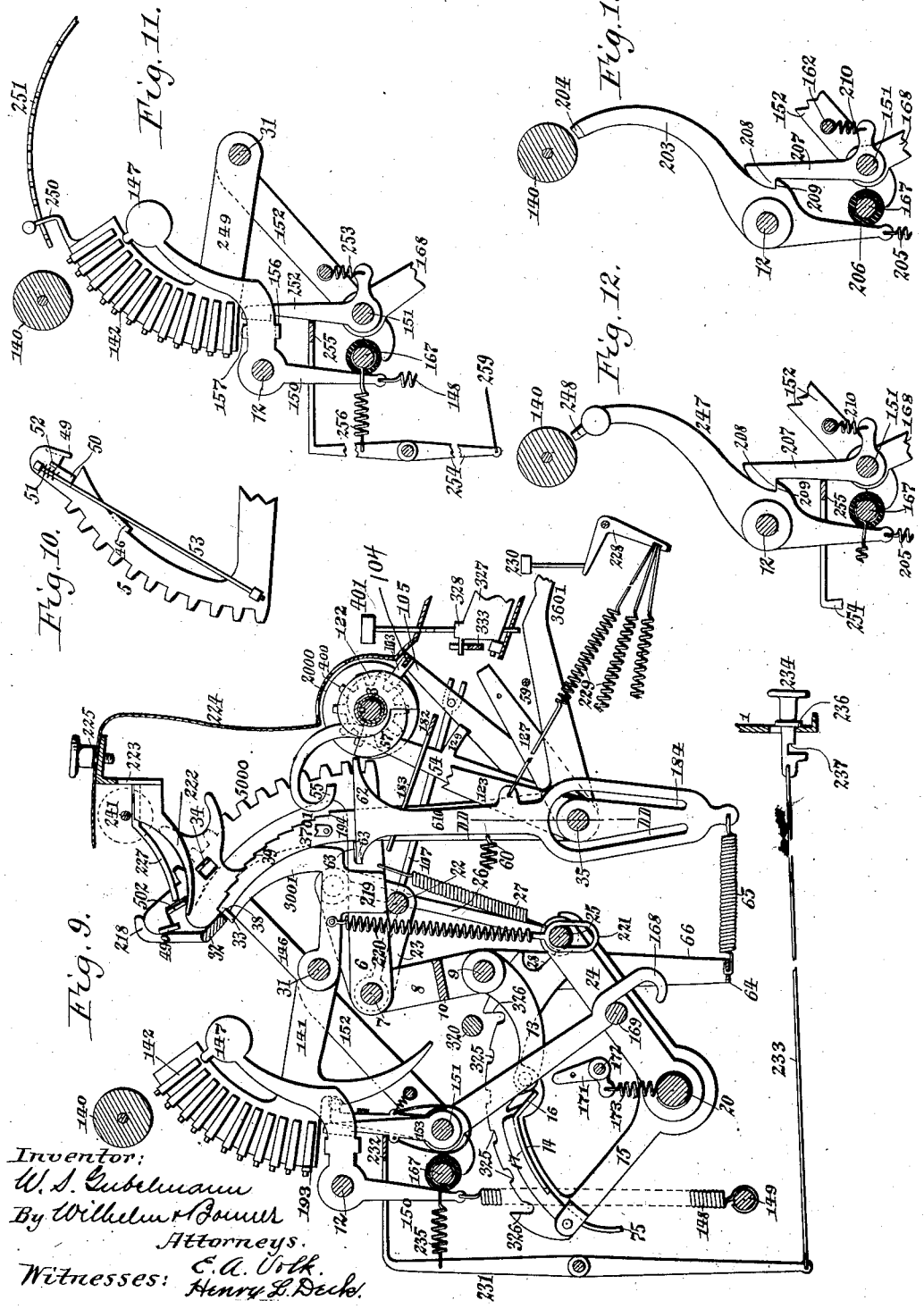

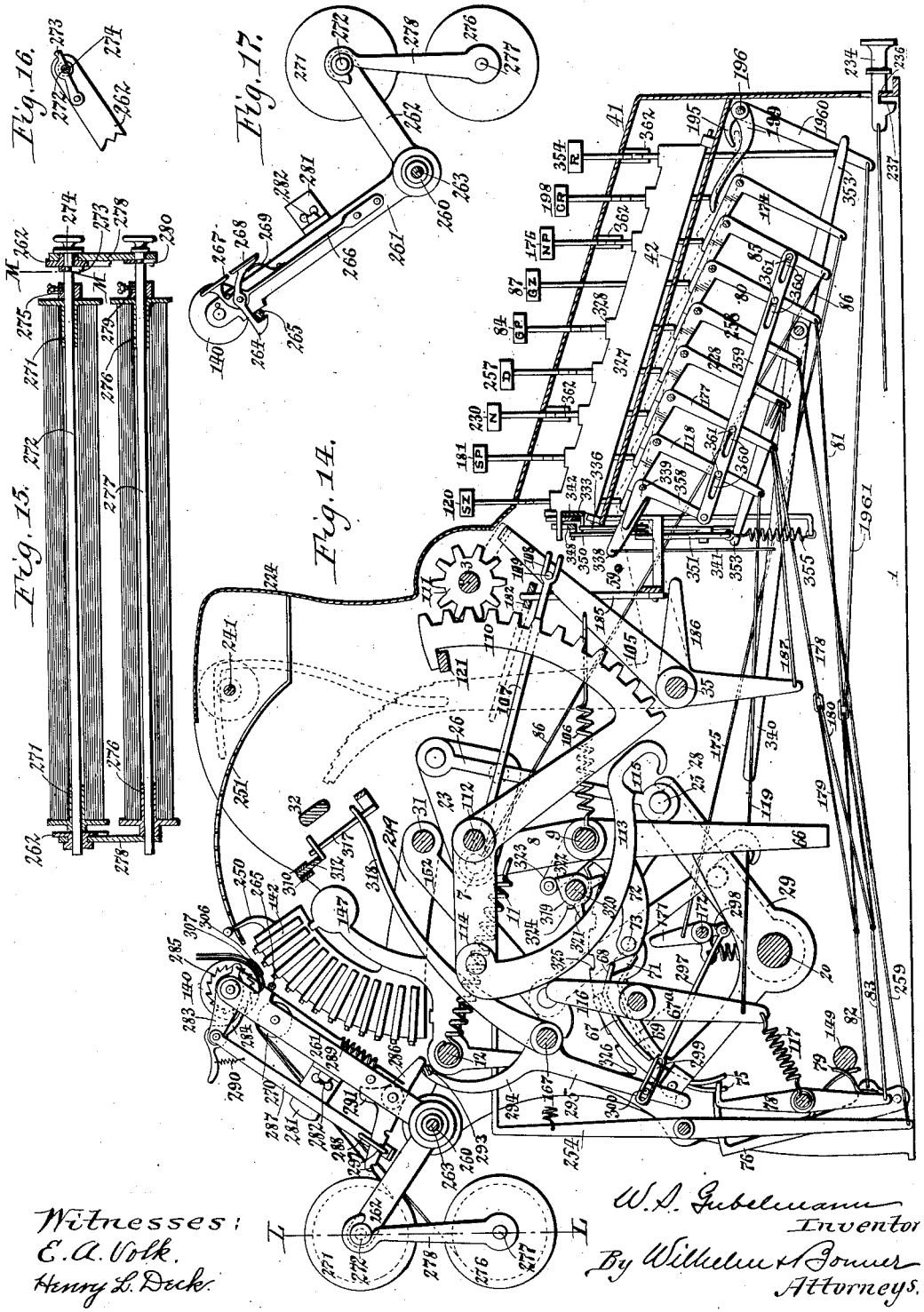

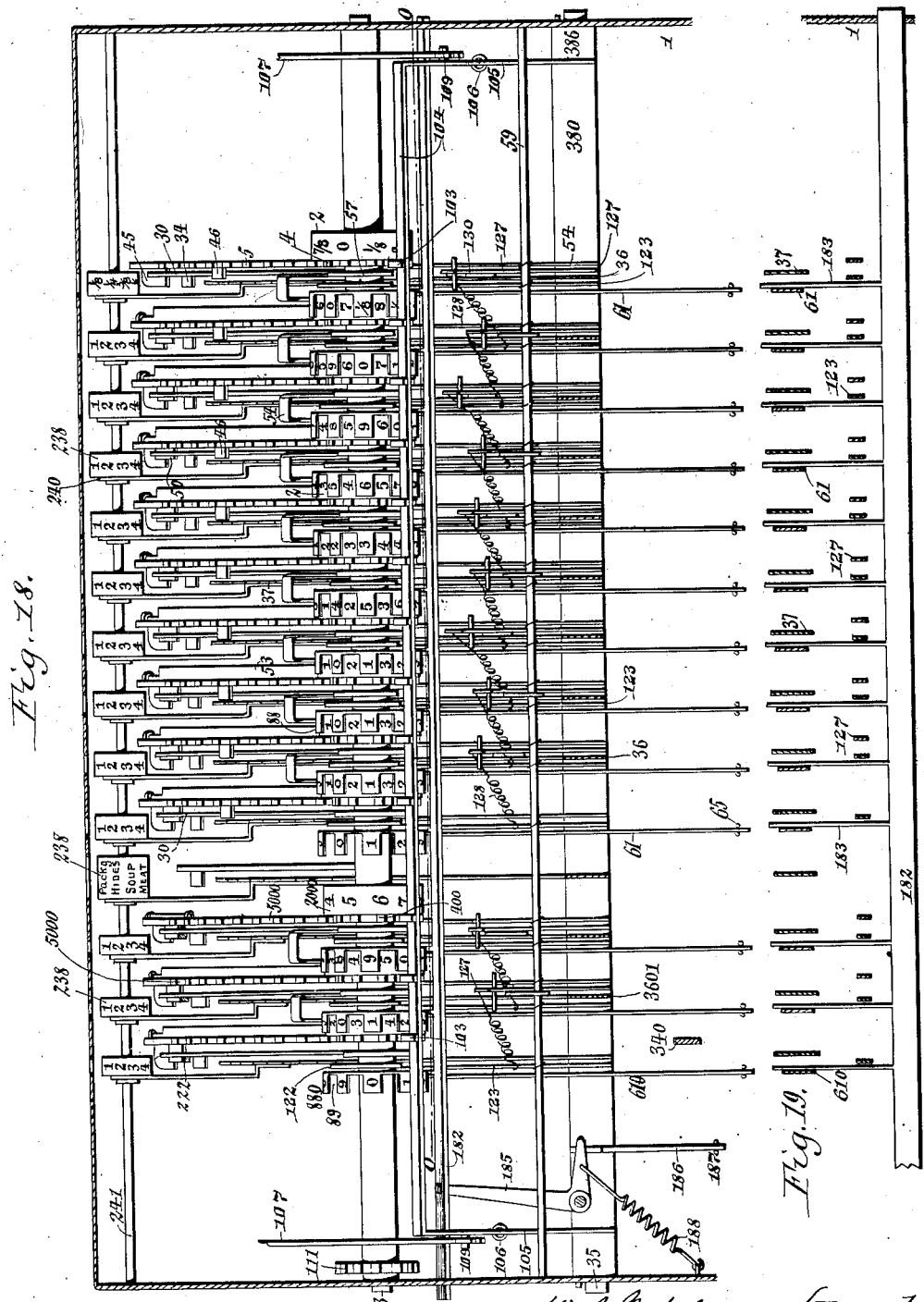

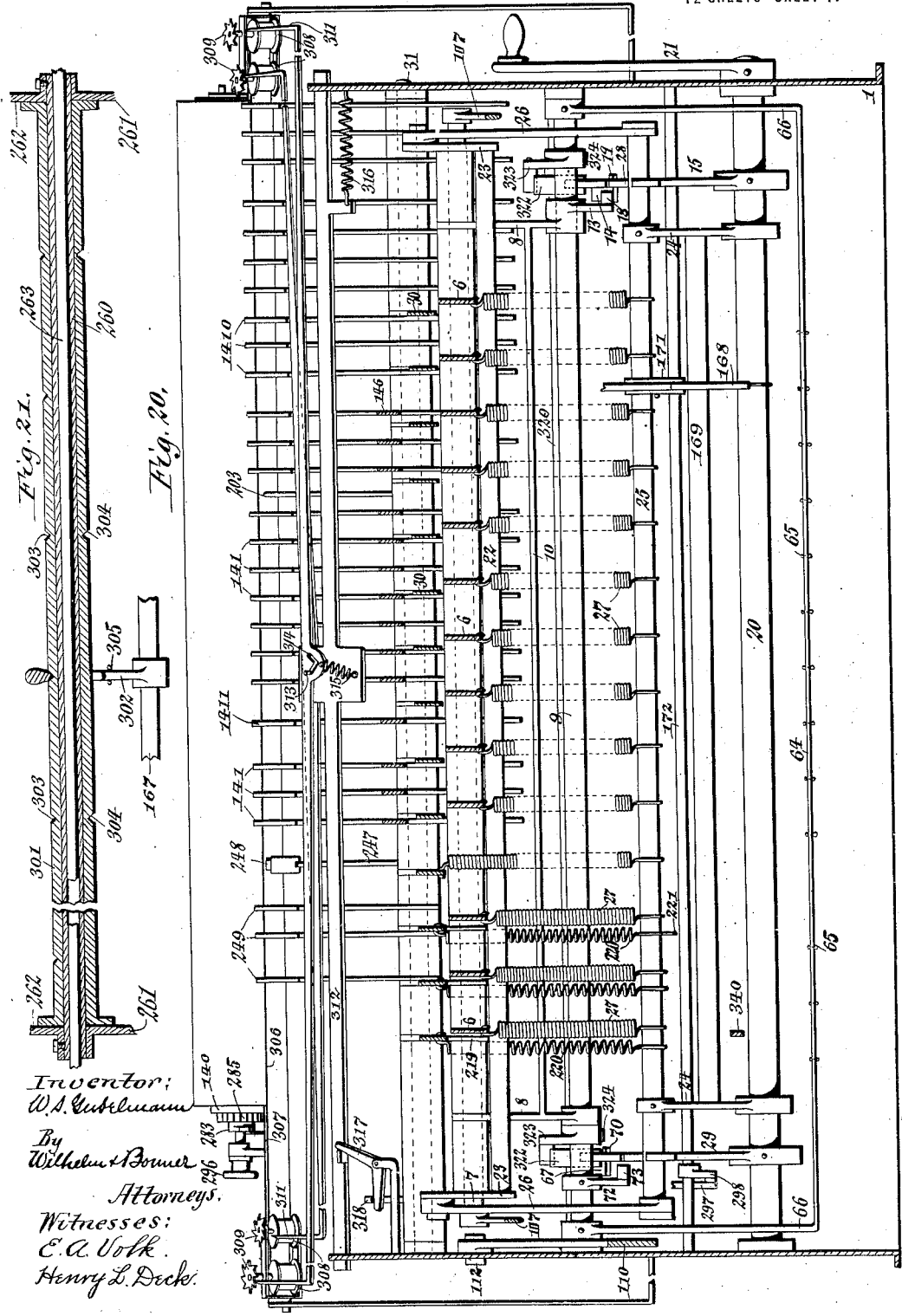

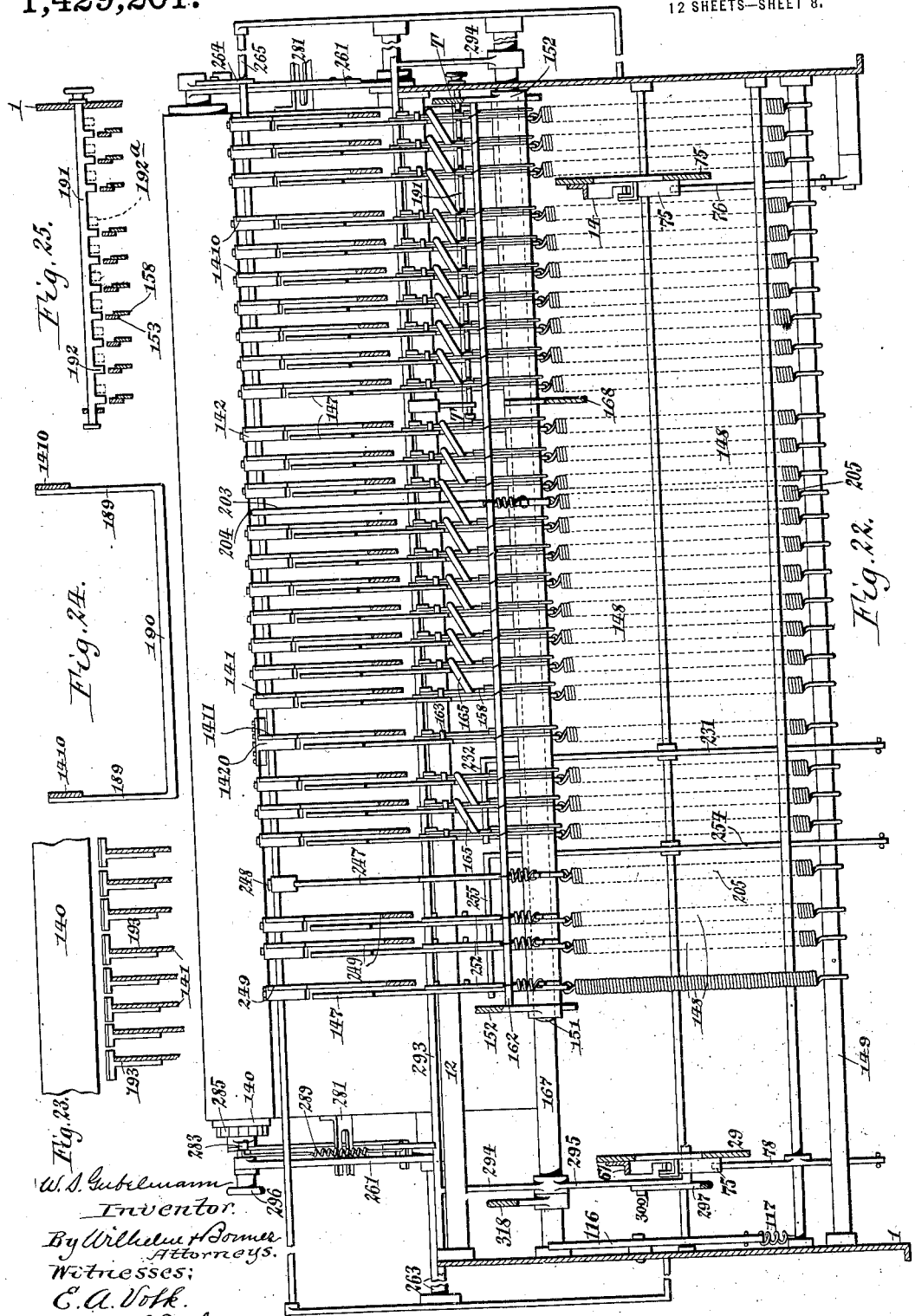

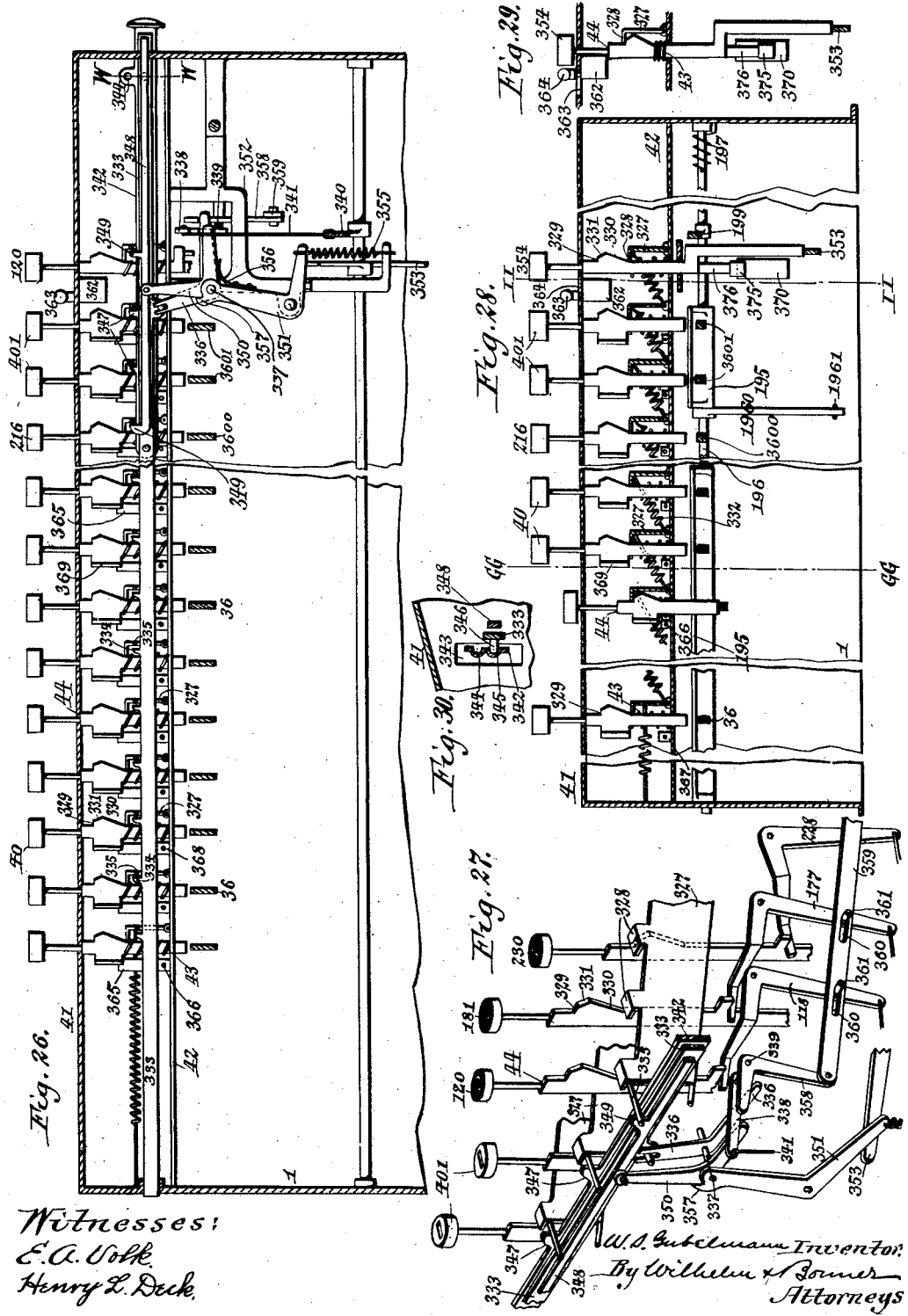

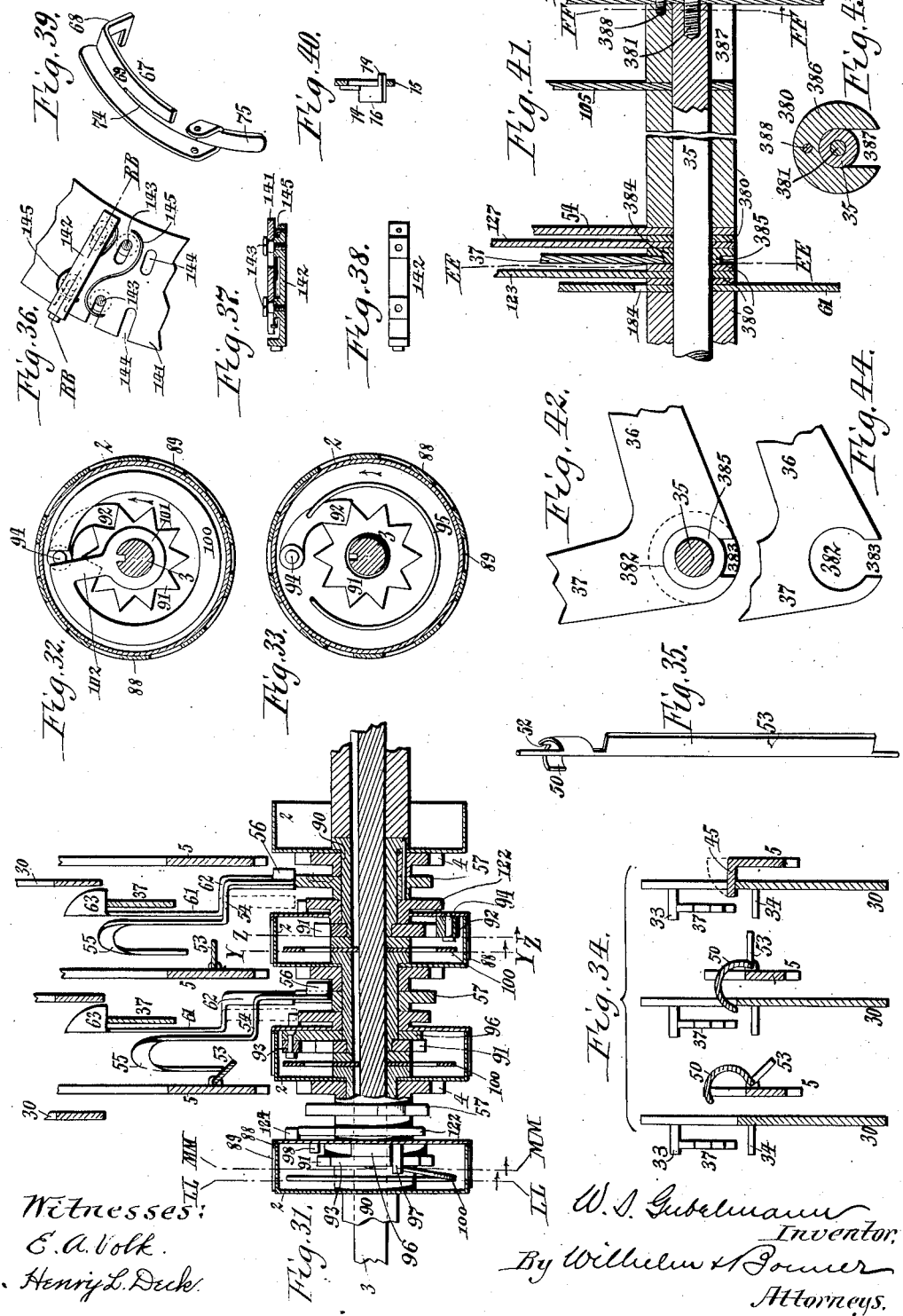

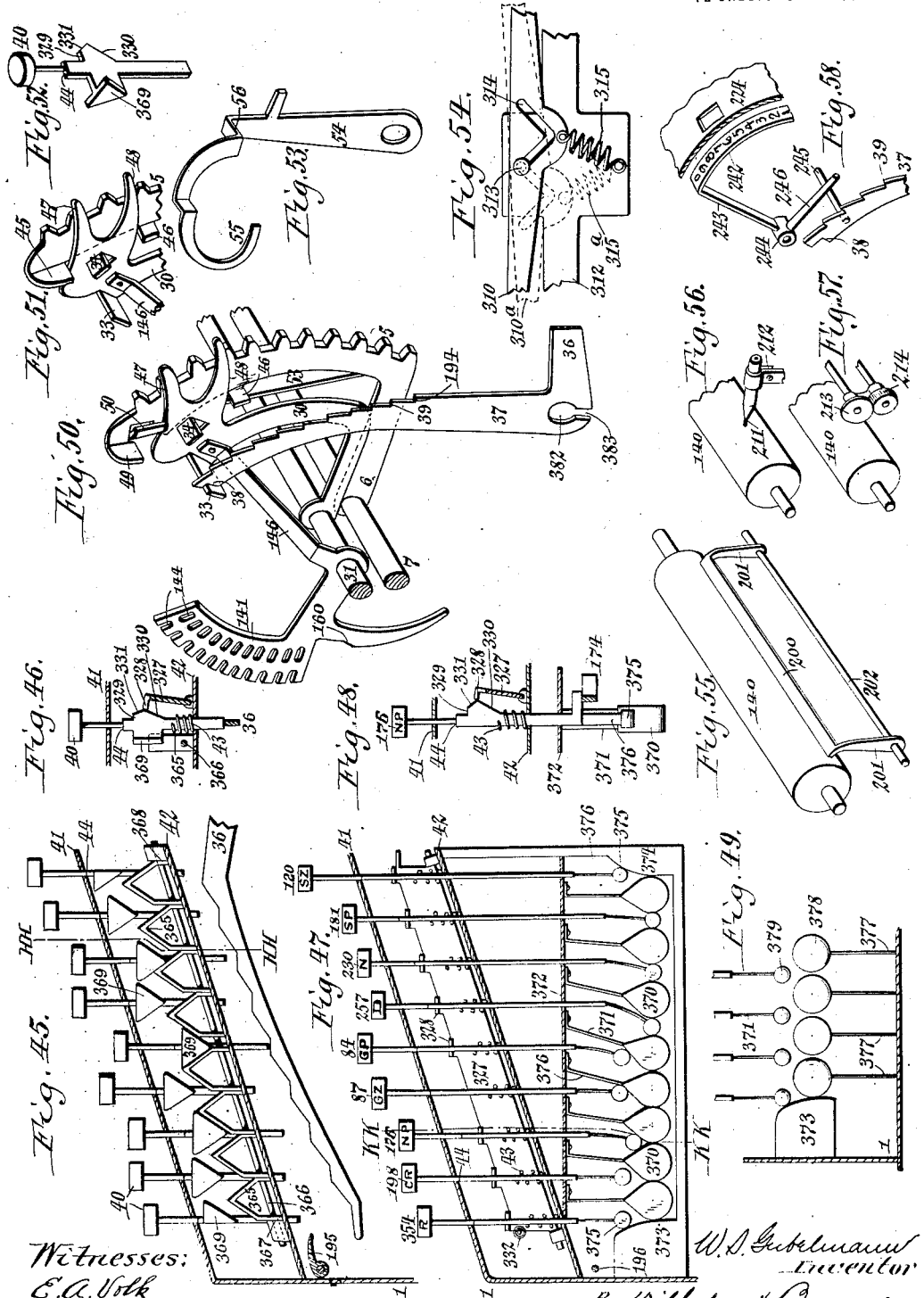

W. S. GUBELMANN
ADDING AND RECORDING MACHINE.
APPLICATION FILED JAN. 10, 1900.
1,429,201.
Patented Sept. 12, 1922.
12 SHEETS—SHEET 12.
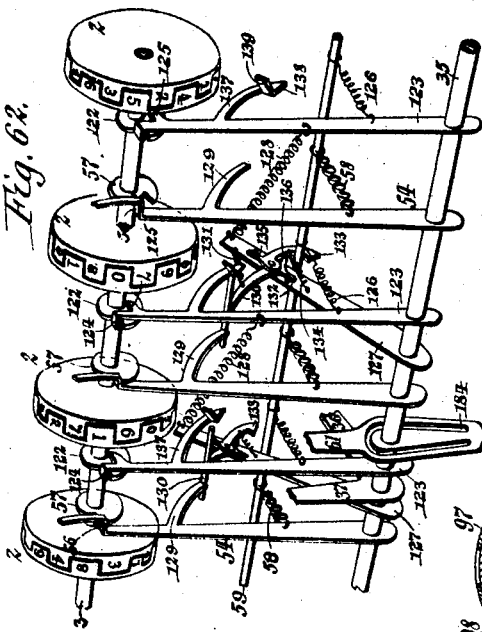
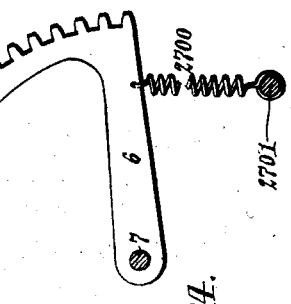
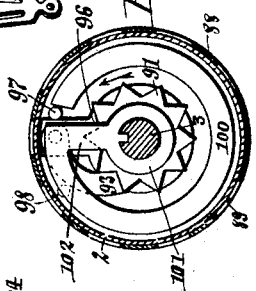
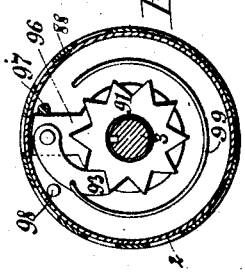
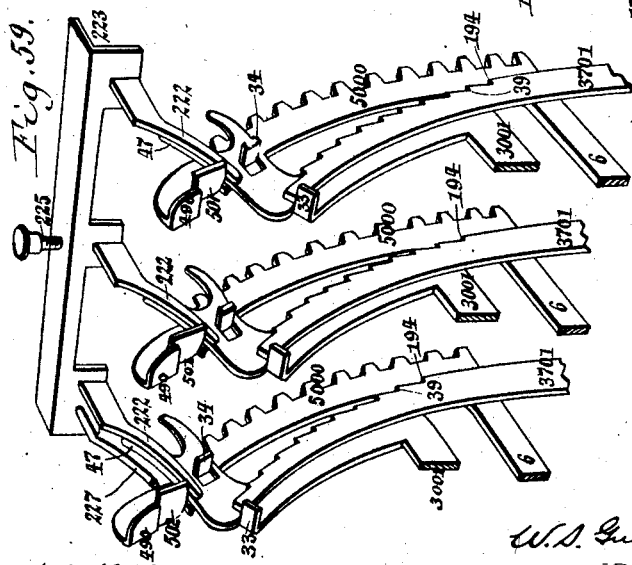
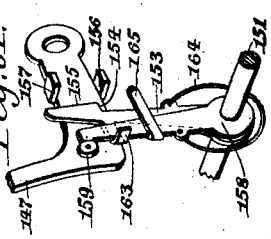
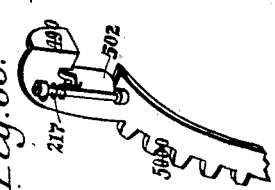

Patented Sept. 12, 1922.

1,429,201

UNITED STATES PATENT OFFICE.

WILLIAM S. GUBELMANN, OF BUFFALO, NEW YORK.

ADDING AND RECORDING MACHINE.

Application filed January 10, 1900. Serial No. 1,004.

*To all whom it may concern:*

Be it known that I, WILLIAM S. GUBELMANN, a citizen of the United States, residing in Buffalo, in the county of Erie and State of New York, have invented new and useful Improvements in Adding and Recording Machines, of which the following is a specification.

This invention relates to an adding and recording machine. The principal objects of this invention are to improve the means for adding and recording numbers; to permit of printing words in connection with the numbers; to permit of recording in duplicate the numbers which have been added; to provide means whereby the total of a group of numbers may be registered and recorded at the same time that these numbers are being added to the grand total of all the numbers which have been added together; to provide means whereby two separate sets or groups of numbers may be added simultaneously; to provide means whereby the number of individual adding operations may be registered and recorded consecutively; to permit of printing the date together with the numbers which are added, to provide an improved construction of paper carriage and connecting parts; to provide groups of keys with distinctive marks so as to facilitate manipulating the same; to provide means which prevent the depression of more than the correct number of keys; to provide means for readily producing vertical and horizontal ruling on the record and to improve the machine in other respects.

The word "grand-total" as used in this description of the machine is intended to mean the sum or aggregate of all the numbers which are added by the machine and the word "sub-total" is intended to mean the sum of any group of numbers forming part of or included in the sum of all the numbers added by the machine.

In the accompanying drawings consisting of twelve sheets: Figure 1 is a fragmentary top plan view of my improved adding and recording machine. Figure 2 is a vertical longitudinal section of the same, taken substantially in line A—A, Figure 1, and showing the adding and recording mechanism of one column or set of keys in the normal or inoperative position. Figure 3 is a fragmentary sectional elevation of the printing mechanism of one of the rows of keys viewed from the side opposite to that shown in Figure 2. Figure 4 is a fragmentary sectional elevation taken in line B—B, Figure 1, and showing the devices whereby numbers are printed in duplicate. Figure 5 is a horizontal section in line C—C, Figure 3. Figure 6 is a vertical section in line D—D, Figure 3. Figure 7 is a view similar to Figure 2 with the paper carrying device omitted and showing the parts of the adding and recording mechanism in a shifted position. Figure 8 is a fragmentary longitudinal sectional elevation taken substantially in line E—E, Figure 1, and showing the mechanism whereby words are printed. Figure 9 is a fragmentary longitudinal sectional elevation taken substantially in line F—F, Figure 1, and showing the mechanism whereby the number of adding operations of the machine are separately added and recorded. Figure 10 is a fragmentary elevation of one of the main registering gear segments viewed from the side opposite to that shown in Figures 2, 7 and 9. Figure 11 is a fragmentary longitudinal sectional elevation taken substantially in line G—G, Figure 1, and showing the mechanism whereby the months and days are recorded. Figure 12 is a similar section, taken in line H—H, Figure 1, and showing the mechanism whereby the year is printed. Figure 13 is a similar section, taken in line I—I, Figure 1, and showing the preferred means for producing vertical ruling on the sheet which receives the record. Figure 14 is a longitudinal sectional elevation, taken substantially in line K—K, Figure 1, and showing particularly the paper carriage and the mechanism whereby different parts of the machine may be thrown into and out of gear. Figure 15 is a vertical transverse section, on a reduced scale, taken in line L—L, Figure 14, and showing the means for supporting two rolls of web-paper, for manifold recording. Figure 16 is a fragmentary vertical section, taken in line M—M, Figure 15, and showing the means for holding the paper spindle in place. Figure 17 is a detached side elevation of the paper carriage, viewed from the side opposite to that shown in Figure 14. Figure 18 is a fragmentary vertical section, taken substantially in line N—N, Figure 2. Figure 19 is a fragmentary horizontal section, taken in line O—O, Figure 18. Figure 20 is a vertical section, taken substantially in line P—P, Figure 2. Figure 21 is a fragmentary transverse section, taken in line Q—Q, Figure 2, and showing the means for adjusting the paper carriage lengthwise of the line of printing. Figure 22 is a vertical transverse section taken in line R—R, Figure 2. Figure 23 is a fragmentary section taken in line S—S, Figure 7, and showing the preferred means for producing horizontal or cross ruling on the surface which receives the record. Figure 24 is a fragmentary cross section showing the means for connecting one of the main printing segments with its companion duplicate printing segment. Figure 25 is a fragmentary horizontal section taken in line T—T, Figure 22, and showing the means whereby the duplicate printing segments may be rendered operative or inoperative. Figure 26 is a fragmentary transverse sectional elevation taken in line U—U, Figure 2, and showing the mechanism for holding the keys in their depressed position and for releasing the same. Figure 27 is a fragmentary perspective view of the key holding and releasing mechanism. Figure 28 is a fragmentary transverse sectional elevation, taken in line V—V, Figure 2. Figure 29 is a similar view showing one of the keys locked in a depressed position. Figure 30 is a fragmentary vertical section in line W—W, Figure 26. Figure 31 is a horizontal section, on an enlarged scale, taken substantially in line X—X, Figure 2, and showing a number of the main registering dials and the adjacent actuating mechanism. Figures 32 and 33 are vertical sections taken in lines Y—Y and Z—Z, Figure 31, respectively. Figure 34 is a fragmentary horizontal section, on an enlarged scale, taken in line A—A, A—A, Figure 2. Figure 35 is a perspective view of one of the latches forming part of the mechanism, whereby the addition of numbers is carried from each registering dial to the next higher dial. Figure 36 is a fragmentary sectional side elevation of one of the printing segments showing the means for mounting the type movably thereon. Figure 37 is a cross section of the type segment taken in line B—B, B—B, Figure 36. Figure 38 is a side view of one of the type carriers viewed from the side opposite to that shown in Figure 36. Figure 39 is a perspective view, showing one of a pair of substantially similar cams, one of which serves to shift the main dial operating segments into their operative position and the other one of which serves to shift the parts into position for printing a total of the added numbers. Figure 40 is a vertical section in line C—C, C—C, Figure 7. Figure 41 is a fragmentary vertical section, on an enlarged scale, taken in line D—D, D—D, Figure 9, and showing the means for supporting the key levers and adjacent parts. Figures 42 and 43 are vertical sections in lines E—E, E—E and F F—F F, Figure 41, respectively. Figure 44 is a fragmentary detached view of one of the key levers. Figure 45 is a fragmentary longitudinal sectional elevation, taken in line G G—G G, Figure 28, and showing the mechanism whereby only one key can be in a depressed position at a time. Figure 46 is a cross section in line H H—H H, Figure 45. Figure 47 is a fragmentary longitudinal sectional elevation, taken in line I I—I I, Figure 28, and showing the mechanism whereby only a predetermined number of keys may be in a depressed position at any one time. Figure 48 is a cross section in line K K—K K, Figure 47. Figure 49 is a fragmentary longitudinal section showing a modification of the mechanism shown in Figure 47. Figure 50 is a fragmentary perspective view showing the key lever, the main gear segment, the controller arm and the printing segment of one of the higher columns of numbers. Figure 51 is a fragmentary perspective view of the units register of the main adding mechanism. Figure 52 is a perspective view of one of the registering keys. Figure 53 is a perspective view of one of the trip arms forming part of the device, whereby a number is carried from a lower to a higher dial. Figure 54 is a fragmentary view, on an enlarged scale, of the mechanism for automatically reversing the ink ribbon of the recording mechanism when the same reaches the end of its movement in either direction. Figure 55 is a perspective view showing a modification of the means for producing cross ruling. Figures 56 and 57 are perspective views showing different means for producing vertical ruling. Figure 58 is a fragmentary perspective view showing an alteration in the construction of the dial for indicating each number which is to be added and recorded. Figure 59 is a fragmentary perspective view of the auxiliary adding mechanism. Figure 60 is a fragmentary perspective view of the units register of the auxiliary adding mechanism. Figure 61 is a fragmentary perspective view of the hammer operating mechanism. Figure 62 is a fragmentary perspective view of the sub-total dial operating mechanism and adjacent parts, the same being shown separated abnormally for the purpose of illustrating the construction clearly. Figures 63 and 64 are cross sections in lines L L—L L and M M—M M, Figure 31, respectively. Figure 65 is a fragmentary sectional view of one of the main registering gear segments, showing a modification in the arrangement of its operating spring.

Like letters of reference refer to like parts in the several figures.

General construction.

1 represents the main frame of the machine, which may be of any suitable construction so as to support the working parts of the machine. 2, Figures 2, 7, 9, 18, 31, 32, 33, 62, 63 and 64, represents a number of main dials which register the grand total of the numbers which are added together. These dials consist preferably of cup-shaped wheels which are numbered on their periphery and are mounted in their proper order on a transverse dial shaft 3, which is journaled in bearings on the main frame, the dials being so arranged that the dial representing the lowest number is arranged on the right hand end of the series and the dials representing the successively higher numbers being arranged successively in their order toward the left from the dial representing the lowest number. The lowest or right hand dial is preferably divided on its periphery into one eighths so as to indicate fractions of a cent in eighths, and the remaining dials are graduated on their periphery according to the decimal system into tenths. As shown in the drawings ten grand-total dials are shown and extend from fractions of a cent to tens of millions, but if desired, additional dials may be added to the right and to the left of the series, if it is desired to register smaller divisions of a cent or more than tens of millions. Each of the main or grand-total dials 2 is provided on its left hand side with a gear pinion 4, which is rigidly connected therewith, as shown in Figures 2, 7, 9, 18 and 31. The pinion of the fraction wheel has eight teeth while the pinions of the remaining dials are each provided with ten teeth. 5 represents the main registering gear segments, one of which is provided for each of the dials 2 and is adapted to engage with the pinion thereof, for operating the respective dial.

Each of these gear segments is arranged in rear of its companion gear pinion and is provided at its lower end with a rearwardly projecting arm 6 which is pivoted loosely on a transverse supporting rod 7. This rod is mounted with its ends on the upper ends of two rock arms 8 which turn loosely with their lower ends on a transverse rock-shaft 9. The rock-arms 8 are connected by a transverse bar 10 which compels the two arms to move back and forth together. In the normal position of the gear segments when the machine is at rest these segments are retracted rearwardly out of engagement with the dial pinions of the dials and the segments are elevated so that their lowermost teeth are opposite the spaces between the adjacent teeth of the dial pinions, these spaces being in line with the pivots of the pinions and the gear segments. The gear segments are yieldably held backwardly out of engagment with the dial pinions by means of springs 11 connecting the rock-arms 8 with a stationary part of the frame. Figure 14 shows one of the springs 11 connecting one of the rock-arms 8 with a transverse stationary bar 12 in the rear part of the machine. The gear segments are moved forwardly so that their teeth engage with the dial pinions 4 by means of a shifting rock-arm 13 which is preferably secured to the right hand rock-arm 8 and projects rearwardly. Upon raising the shifting rock-arm 13, the rock-arms 8 are swung forwardly and the gear segments 5 are engaged with the dial pinions, while upon swinging the shifting rock-arms downwardly, the rock-arms 8 are swung rearwardly and the gear segments are disengaged from the dial pinions. 14 represents a cam whereby the gear segments are engaged with the dial pinions. This cam is mounted on the upper portion of a vertically swinging rocking frame 15 which is arranged on the right hand side of the machine. This cam is provided at its front end with an incline or cam face 16 and at its rear end with a concentric face 17. When the cam is in its rearmost or retracted position, its incline stands in rear of a roller or projection 18 on the rear end of the shifting arm 13, as shown in Figures 2, 7, 9 and 20. Upon swinging the rocking frame 15, so that the cam 14 moves forwardly, the incline of the latter engages underneath the roller 18 and raises the arm 13, thereby moving the arms 8 forwardly. The throw of the incline 16 is just sufficient to engage the teeth of the gear segments with the dial pinions. When the roller 18 has been raised to the top of the incline, the concentric portion of the cam engages with the roller during the continued forward movement of the cam and the latter does not shift the gear segments any further forward. When the rear end of the concentric face 17 of the cam passes forwardly from underneath the roller 18, the constant pull of the springs 11 causes the rock-arm 13 to be depressed and the rock-arms 8 to be moved rearward, thereby disengaging the gear segments from the dial pinions. Upon now moving the cam 14 backwardly together with the rocking frame 15, this cam does not affect the arm 13 and the parts connected therewith, but is affected by said arm at the last portion of the backward movement of the cam, at which time the back or lower side of incline 16 engages with the roller 18 which lifts said incline and at the end of the backward movement of the cam, the latter clears said roller and drops behind the same, as shown in Figure 2, preparatory to again raising the roller 18 and connecting parts during the next forward movement of the cam 14. For the purpose of permitting the front end of the cam to rise so as to clear the roller 18, this cam is 1 pivoted at its rear end to the rear portion of the rocking frame 15. The upward and downward movement of the front end of the cam is limited by means of a lug 19 projecting from the side of the cam and engaging with a slot in the adjacent part of the rocking frame 15, as shown in figures 20 and 40.

The rocking frame is secured with its lower portion to a transverse rock-shaft 20 journaled in the main frame and provided outside of the frame with a hand crank 21, as shown in Fig. 20, whereby this shaft is rocked and the parts connected therewith are operated. The gear segments 5 are raised to their highest position by means of a return or lifting bar 22 which extends transversely underneath all of the arms 6 of the gear segments and which is connected loosely at its rear ends with the transverse rod 7 by lifting plates 23. 24 represents two shifting arms which are mounted loosely at their rear ends on the rock-shaft 20 and which support at their other ends a transverse bar 25 which transverse bar is connected at its ends by two links 26 with the lifting plates 23, whereby upon raising the shifting arms 24, the lifting bar 22 is caused to raise the gear segments and the other parts connected therewith resting on said bar. Upon depressing the transverse bar 25, the lifting bar 22 is moved downwardly and the gear segments resting thereon are permitted to move downwardly with the bar until the segments are arrested. Each of the gear segments is yieldingly held in contact with the lifting bar 22 by a spring 27 which connects the arm of the segment with the transverse bar 25. If the downward movement of the gear segment is arrested while the shifting arms 24 continue to move downwardly, the lifting bar 22 is moved away from the underside of the arm of the gear segment and the spring 27 is strained. The transverse bar 25 is arranged at one end in a segmental notch 28 formed in the front part of the rocking frame 15, shown in Figures 2, 7, 9 and 20, and its opposite end is arranged in a similar segmental notch 28, formed in a rocking frame 29 which is secured to the operating shaft 20 on the left-hand side of the machine. The rocking frames 15 and 29 together with the operating shaft 20 constitute the main or universal operating frame of the machine. When the machine is at rest, as shown in Figure 2, the transverse bar 25 engages with the front side of the notches 28 in the rocking frames 15 and 29. Upon turning the rocking shaft 20 forwardly by means of its handle 21 in the direction of the arrow, Figure 2, the rocking frames are moved forwardly during the first part of the movement independent of the transverse bar 25. The latter remains at rest until the inclined front end 16 of the cam 14 has raised the arm 13 and moved the gear segments into engagement with the dial pinions, during which movement the rocking frames move idly the extent of their notches 28 along the ends of the bar 25 without disturbing the latter. After the gear segments have been engaged with the dial pinions, the continued forward movement of the rocking frames causes the rear ends of their notches 28 to engage with the bar 25 and depress the same, thereby causing the lifting bar 22 to be moved downwardly and strain the springs 27. This causes all of the gear segments which are free, to be moved downwardly and to continue their downward movement until they are arrested. During the downward movement of the gear segments, while they are in engagement with the dial pinions, the latter and the dials connected therewith are turned in the direction of the arrow, Figure 7, until the downward movement of the segments is arrested. The extent which each dial is turned depends upon the position in which the downward movement of its operating segment is arrested. After the segments have been arrested in their downward movement, they remain in this position while the rocking frames complete their forward movement. At the end of the forward movement of the rocking frames, the roller 18 of the rock arm 13 drops off from the rear end of the concentric part of the cam 14, thereby allowing the springs 11 to pull the gear segments rearwardly out of engagement from the dial pinions. Upon now turning the rock-shaft 20 backwardly by means of the handle 21, the rocking frames are moved backwardly until the front ends of the notches engage with bar 25. When the latter is so engaged it is moved backwardly with the rocking frames to the end of their rearward movement which causes the transverse bar 25 to lift the lifting bar 22 and the gear segments which have been depressed into their highest or normal position.

During this upward movement of the depressed gear segments they are out of engagement with the dial pinions, whereby the dials are not turned backwardly with the segments, but remain in their shifted position. 30 represents a number of elbow-shaped controlling arms, which form part of the devices whereby the downward movement of the registering gear segments is controlled. One of these arms is arranged along the left-hand side of each gear segment and consists of an upright front part and a horizontal lower part which extends rearwardly from the lower end of the upright part, thereby leaving a clear space in rear of the upright part of the controlling lever, as represented in Figures 1, 2, 7, 9, 18, 31, 34, 50, 51 and 59. The rear end of the lower part of each controlling arm is mounted loosely on a transverse supporting bar 31, while the upper end of its front or upright part is loosely connected with the upper portion of its companion gear segment. This loose connection permits the controlling arm and the gear segment to swing freely about their individual centers, which are arranged parallel but out of line, and also permits the gear segment to move forward and backward into and out of engagement with its companion dial pinion. In the uppermost position of the controlling arms the same bear with their upper ends against a transverse stop bar 32, as shown in Figure 2, which limits the upward movement of these arms. Each controlling arm is provided on the rear part of its upper end with a locking lug 33, and on the front part of its upper end with a stop lug 34, both of which lugs project toward the left and are preferably stamped out of one piece with the controlling arm.

The operation of the registering devices is controlled by a number of elbow-shaped key levers which are arranged side by side and pivoted to a transverse supporting rod 35. Each key lever is provided with a lower actuating arm 36 which projects forwardly and an upper stop arm 37 which projects upwardly along the left hand side of one of the controlling arms and gear segments, as represented in Figures 2, 7, 18, 31 and 50. Each of these key levers is provided on the rear side of its stop arm with a locking shoulder 38 which is adapted to engage with the locking lug 33 of the controlling arm when the latter is elevated into its highest position and the key-lever is in its fully retracted position, as shown in Figure 2. When the parts are in this position, the key lever holds the controlling arm against downward movement and the latter holds the gear segment against downward movement. If the gear segment while so held against downward movement is moved forward into engagement with the adjacent dial pinion and the rocking frames are turned forwardly for depressing the gear segment, the spring 27 of this segment will be strained without, however, shifting the segment. At the end of this forward movement of the rocking segments, the roller 18 of the rock arm 13 drops off from the rear end of the cam 14, the gear segment is moved rearwardly out of engagement from the dial pinion and then the rocking frames move backwardly without having shifted the dial. The upper arm of each key lever is provided on its front side with a vertical series of differential stop shoulders 39, which are arranged step fashion and extend from the upper end of this arm downwardly and forwardly thereon or in other words the stop shoulders 39 are arranged radially out of line with one another and different distances from the pivot of the key lever. These stop shoulders of the key lever are adapted to be moved forwardly into the path of the stop lug 34 on the controlling arm. The stop shoulders are arranged different distances from the stop lug 34 of the controlling arm, so that by moving different stop shoulders of the key lever into the path of the stop lug of the controller arm, the latter and the gear segment connected therewith may be arrested at different points in their downward movement. The uppermost stop shoulder of the key lever is most remote from the stop lug of the controlling arm and therefore requires the greatest forward movement of the key lever, in order to bring this stop shoulder into the path of this stop lug.

The stop shoulders of the key lever are so arranged that the distance from the stop shoulders to the path of the stop lug gradually grows less from the uppermost stop shoulder to the lowermost stop shoulder. The relative position of the different stop shoulders of the key lever is such that when its locking shoulder 38 remains in engagement with the locking lug 33 and the gear segment is simply moved into and out of engagement with its dial pinion, the latter remains at zero, if the same has not been previously moved. But when the key lever has been moved forwardly, so as to disengage its locking shoulder from the locking lug and moves one of its stop shoulders into the path of the stop lug of the controlling arm, the latter arm and gear segment connected therewith will be moved downwardly, upon moving the rocking frames forwardly, until the stop lug of the controlling arm strikes the respective stop shoulder of the key lever which stands in its path, as represented in Figure 7, whereby the gear segment while turning in engagement with the adjacent dial gear pinion turns the same forward. By turning the key lever forward more or less and moving one or the other of its stop shoulders into the path of the stop lug 34 of the controlling arm, the distance which this arm descends can be varied, thereby varying the number of spaces which its gear segment turns the adjacent dial.

Main number key mechanism.

40 represents the main keys whereby the key levers of the main registering and recording mechanism are operated, and which are guided with their depending stems in the top 41 and bottom 42 of the key-board. As shown in the drawings, nine longitudinal columns of these keys are arranged transversely side by side. The first column on the right hand side of the machine contains seven keys and represents fractions of one-eighth of a cent, the next column toward the left contains nine keys and represents cents and the remaining columns of keys toward the left each contains nine keys and represents progressively higher orders of numbers according to the decimal system, so that the registering keys in the last or left hand column represent hundreds of thousands of dollars. The lowest number of the several columns of keys are arranged transversely in a row on the rear part of the key-board and the corresponding higher numbers of the several columns are arranged likewise in transverse rows and progressively in their order toward the front end of the key-board. Each of the registering keys is yieldingly held in an elevated position by a spring 43 surrounding the stem of the key and connected at its upper end to the key and bearing with its lower end against the bottom of the key-board. The upper movement of each key is limited by a shoulder 44 formed on the upper part of its stem and engaging with the underside of the top of the key-board, as represented in Figures 26, 28, 46 and 47. The downward movement of all of the keys is substantially the same, but the arrangement of each column of keys lengthwise of the lower actuating arm of each key lever causes the keys to bear against the lever at different distances from its pivot so that by depressing different keys the same distance, the key lever will be turned different distances. The keys having the lowest numbers bear against their respective key levers nearest the pivot and consequently the levers are thereby thrown the greatest distance, and the uppermost stop shoulders are shifted into the path of the stop lug 34 of the respective controlling arms. The throw of each key lever upon depressing any one of its keys is so adjusted, that the proper stop shoulder on its upper arm is moved into the path of the stop lug 34 of the controlling arm and the downward movement of the respective gear segment is arrested after having turned the adjacent dial gear pinion a number of spaces corresponding to the number of the key which is depressed.

*Loose connection for segments.*

The loose connection between each controlling arm and its gear segment, heretofore referred to, is shown in its simplest form in the connection between the controlling arm and the gear segment, which are controlled by the initial or lowest column of registering keys. As shown in Figures 1, 18, 34 and 51, the loose connection between the controlling arm and the gear segment of the lowest registering device consists of upper and lower guide lugs 45 and 46 arranged on the upper end of the segment and bearing against the upper and lower guide faces 47 and 48, which are formed on the upper end of its companion controlling arm. As the controlling arm and segment rise and fall, the guide lugs of the segment slide back and forth on the guide faces of the arm. The guide faces are so constructed that the back and forth movement of the segment on the arm is radially with reference to the dial pinion in all positions of the segment. By so forming the guide faces of the arm, the gear segment can be engaged with and disengaged from the dial pinion in all positions of the segment without disturbing the position of the dial pinion. The construction of the loose connections between the controlling arms and gear segments of all of the higher registering devices above the fractional registering device are combined with carrying devices, whereby each registering dial, upon making one complete turn, causes the next higher dial to be turned forward one space, thereby carrying up a number from one column to the next higher column. The loose connections between the controlling arms and the segments and the carrying mechanism of the higher registering devices are constructed as follows:—

As shown in Figures, 1, 2, 7, 18 and 51, each controlling arm is provided at its upper end with upper and lower guide faces 47 and 48 and its lower guide face is engaged by a lower guide lug 46 on the adjacent gear segment, the same as in the coupling between the controlling arm and segment of the initial registering device.

The gear segments of the higher registering devices are each provided with an upper guide lug 49 which is adapted at times to bear against the upper guide face 47 of the companion controlling arm in substantially the same manner in which the upper guide lug 45 of the fractional gear segment bears against its companion arm, the only difference being that the upper guide lug 49 of the higher gear segments are held out of engagement and separated by a space from the upper guide face of the companion arm when no number is carried from a lower to a higher registering device. The upper guide lug 49 is held in this elevated position above the adjacent guide face by a rocking latch 50 which is arranged in a notch in the rear side of the gear segment and which normally projects toward the left and engages with the upper guide face 47 of the adjacent controlling arm, as shown in Figures 2, 34 and 50. During the ordinary up and down movement of each higher controlling arm and gear segment, the latter is guided by its lower guide lug 46 and the locking latch 50 engaging with the lower and upper faces of the adjacent arm, this movement being the same as the movement of the controlling arm and gear segment of the fractional registering device. Normally the downward movement of the controlling arm is determined by the position of its companion key lever and this arm in turn controls the extent of the downward movement of the gear segment. When, however, the locking finger 50 is withdrawn out of engagement from the upper guide face 47 of the arm, the companion gear segment is capable of moving downward independent of the arm until the upper guide lug 49 engages with the upper guide face of the arm. The extent of this independent movement of the gear segment with reference to its companion arm is equal to one tooth or space of the segment, so that by this means the gear segment is enabled to turn the dial pinion one space more than the position of the key lever permits the same to move.

The withdrawal of the locking latch of each higher registering device is controlled by the next lower registration device and the withdrawal of each latch is effected when the next lower registering device has made one complete turn and arrived at zero. Each of the locking latches is pivoted on the right hand side of its adjacent gear segment, so as to turn transversely with reference to the latter. The latch is turned toward the left into its operative position by a spring 51, the movement in this direction being limited by a shoulder 52 arranged on the latch and bearing against the right hand side of the gear segment, as shown in Figure 10. 53 is an upright trip plate connected with the lower end of each latch and arranged normally at right angles or nearly so to the adjacent gear segment, when the latch is in its operating position. 54 represents a number of upright trip arms, each of which is controlled by a lower registering device and which turns the locking latch of the next higher registering device into an inoperative position. This arm is mounted loosely with its lower end on the supporting bar 35 and is provided at its upper end with a rearwardly and forwardly projecting hook 55, and in front and below said hook with a bend forming a bearing finger 56. 57 represents trip cams arranged on the left-hand side of each registering dial pinion and connected with the adjacent pinion and dial, but separated from the pinion by an intervening space or groove. The face of each of these cams may begin at its lowermost point near the axis thereof and then extend outwardly in a spiral line terminating with its highest point in line with its lowermost point with which it connects abruptly. The trip cam of the fractional registering device has its face divided into eight parts, each part of which except the first is arranged one-eighth of a space further from the center of the cam than the preceding part, while the trip cams of the higher registering devices each has its face divided into ten parts, each part except the first being arranged one tenth of a space farther from the axis of the cam than the preceding part. Each of the trip arms 54 extends upwardly along the right-hand side of the trip cam of a lower registering device and its shoulder 56 engages with the face of this cam, while the hook 55 at its upper end extends toward the left and is adapted to engage with the trip plate 53 of the next higher registering mechanism. In the initial position of each trip arm, its shoulder 56 engages with the lowest part of its trip cam, as represented in Figures 2, 9 and 31. As the trip cam is turned in the direction of the arrow, Figure 2, at the same time that its dial and gear pinion are moved forwardly by the adjacent gear segment during the adding operation, the trip arm is moved backwardly by the gradually rising face of the trip cam. During this backward movement of the trip arm, its hook engages with the trip plate 53 of the next higher registering device and is deflected toward the right thereby, the hook being sufficiently elastic for this purpose. After the hook has passed in rear of said trip plate, the hook owing to its resilience springs back to its normal position, so as to stand behind said trip plate. When the shoulder of the trip arm reaches the highest part of the face on the trip cam the trip arm has been shifted to its rearmost position. Upon now turning this cam forwardly another space together with its companion dial and pinion, the highest part of the cam is carried from underneath the shoulder of the trip arm and the latter is moved forwardly over the abrupt face of the cam until its shoulder 56 again engages with the lowest part of the cam face. During this movement of the trip arm, its hook strikes the rear side of the trip plate 53 of the next higher registering mechanism and turns the same forwardly, as shown in Figures 31 and 34, thereby disengaging the locking latch from the adjacent controlling arm and permitting the gear segment carrying the trip plate to move forward one space. The forward movement of the trip arm is effected when the dial with which its trip cam is connected has made one complete rotation and again stands at zero, whereby the addition represented by this complete rotation is carried to the next higher registering device. The forward movement of the trip arm is effected quickly by a spring 58, which connects with a stationary cross bar 59 arranged in front of the trip arms, as shown in Figure 62. The trip plate 53 of each registering device is so arranged and is of such length that the hook of the next lower trip arm can engage with the rear side of the plate, for disengaging its latch in any position of the gear segment carrying the plate, and in order to accomplish this engagement it is obvious that cams 57 should be constructed so as to give arms 56 the proper throw. If a gear segment is locked in its highest position by reason of none of its companion keys having been depressed, the withdrawal of its latch from the controlling arm simply permits the gear segment to drop one space and turn its companion dial pinion forward one space, while in engagement therewith, the movement of this dial representing one number carried up from the next lower dial. If any of the keys of the key levers has been depressed, so as to release the gear segment and permit the same to move downwardly for effecting an addition, and if during this time the next lower registering device has made a complete turn, so as to require the carrying up of a number from the next lower registering mechanism, the latch of the higher registering device will be withdrawn while the same is effecting its addition, thereby causing the segment to descend and turn its dial one space in addition to the spaces corresponding to the depression of its respective key.

When the locking latch has been withdrawn so as to permit a gear segment to move downwardly one space farther than its controlling arm, the latch remains in this position during the subsequent upward movement of the arm and the segment until the upward movement of the arm is arrested by striking the stop bar 32 and the gear segment continues its upward movement independent of the arm the extent of one space. The gear segment has now reached its highest position and its latch is again swung automatically by its spring over the controlling arm. The controlling arm and gear segment now remain in this relative position until another number is to be carried up from the next lower registering device. When the controlling arm has been retracted to its highest position, the adjacent key lever is moved into its normal retracted position, so that its locking shoulder 38 engages with the locking lug 33 of the controlling arm and locks the latter against downward movement. The return movement of each key lever is preferably effected by a spring 60 which connects the upper arm of the key lever with the transverse shaft 9, as shown in Figures 2 and 7, or some other convenient part of the machine. The lower guide lugs of the gear segment is not absolutely necessary because the weight of the parts connected with the controlling arm and arranged in rear of its pivot is sufficient to raise the arm, but it is preferable to employ this lower guide lug 46 on the gear segment because it compels the arm to rise with the gear segment and avoids displacement of these parts with reference to each other, and also serves as a stop to limit the upward movement of the gear segment. The gear pinion and the cooperating gear segment of the fractional registering device are so constructed that the fractional dial makes one rotation whenever it is moved forward eight spaces. After the fractional dial has made one rotation the whole number represented by this rotation is transferred by the first carrying device from the registering mechanism of the fractional dials to the next higher registering device which represents cents.

The complete turns of each of the following registering devices are in like manner carried or transferred to the next higher dial by the respective carrying device. The dial which records the highest number, in this instance the millions of dollars, is preferably operated only by the adjacent carrying device of the next lower dial and is incapable of being operated directly from the key-board because it is not provided with a key operating mechanism.

The mechanism whereby the grand-total dials are all turned back to zero or the place of beginning after the addition of numbers has been completed is constructed as follows:

61 represents a series of feeling rock levers which are adapted to shift the key levers, so as to permit the gear segments to descend the proper distance for resetting or restoring the main registering dials to zero. One of these shifting levers is mounted loosely on the supporting bar 35 adjacent to the left hand side of each of the key levers and is provided on its upper arm with a forwardly projecting feeling finger 62 and with a shifting finger 63 which extends behind the upper arm of the adjacent key lever, as shown in Figure 31. The feeling levers have their fingers normally arranged in rear of the grand-total cams 57 and each of these levers is turned so that its upper arm moves backwardly by the upper arm of the adjacent key lever engaging with the shifting finger 63 of the feeling lever. 64 represents a transverse pull bar arranged in rear of the lower arms of the feeling levers and connected with each of the latter by a pull spring 65, as represented in Figures 2, 7 and 20. This pull bar is connected at its end to the lower end of two depending pull or rock arms 66, which are secured at their upper ends to the rock shaft 9, as shown in Figure 20. Upon turning this rock-shaft, so as to swing its depending pull arms backwardly the feeling levers are turned by means of the springs 65 so as to move the upper arms of these levers forwardly. This movement of the rock-shaft 9 is effected by a cam 67, which is mounted on the left-hand side of the rocking frame 29 and which is constructed substantially the same as the cam 14 which is mounted on the rocking frame 15. As shown in Figures 14, and 22, this cam is pivoted at its rear end by a transverse pin to the rear portion of the rocking frame 29 and is provided at its front end with an incline or cam face 68, the cam 67 is pivotally supported on the rocking frame 29 in the same manner in which the like cam 14 is pivoted on its corresponding rocking frame 15, and in rear of the incline with a concentric face 69. The cam 67 can be raised and lowered with its front end into an inoperative or operative position, this movement being limited by means of a lug 70 arranged on the cam as shown in Fig. 20 and projecting into a slot 71 in the adjacent rocking frame in the same manner in which the movement of the cam 14 is limited as shown in Fig. 40. 72, Figures 14 and 20, represents a rearwardly projecting rock-arm secured to the rock shaft 9 and provided at its rear end with a roller or projection 73 which is adapted to be engaged by the cam 67 for turning the rock shaft 9. When numbers are being added with the machine, the cam 14 is depressed, as shown in full lines, Figure 2, so as to be in a position when moved forwardly by the rocking frame 15 to engage the roller on the arm 13, for moving the gear segments into engagement with the dial pinions, and during this time the cam 67 is lifted into the position shown in full lines, Figure 14, so that when the rocking frame 29 is moved forwardly the cam 67 will clear the roller 73 of the rock arm 72 and not disturb the rock-shaft 9 and the parts connected therewith. If it is desired to restore all of the grand-total dials 2 to zero, the cam 14 is raised into its inoperative position, shown by dotted lines 14 in Figure 2, and the cam 67 is lowered into its operative position, as shown by dotted lines 67ª in Figure 14. Upon now turning the rock-shaft 20 by hand so as to move both rocking frames 15 and 29 forwardly, the cam 14 passes over the roller 18 of the arm 13 without disturbing the same, but the inclined front of the cam 67 engages with the roller 73 on the rear end of the rock-arm 72 and raises the same until this roller engages with the concentric part 69 of this cam. By this movement of the arm 72, the rock shaft 9 is turned in the direction for moving its depending arms 66 rearwardly and pulling the springs 65 rearwardly. This pull on the springs 65 causes the feeling levers to be turned until the feeling fingers of their upper arms engage with the spiral surfaces of the grand-total ip cams. After the feeling fingers bear against these cams, their movement is arrested and the continued backward movement of the pull bar 64 simply stretches the springs 65 until the bar reaches the end of its backward movement. The feeling finger of each feeling lever engages with that part of the surface of the adjacent trip cam which is directly opposite the feeling finger, and as these trip cams are turned with the adjacent grand-total dial they present different parts of their spiral surfaces to the opposing feeling fingers, which causes the forward movement of the upper arms of the feeling levers to be arrested in different positions when swung forwardly. During the forward movement of the upper arm of each feeling lever, its shifting finger 63 engages with the rear side of the upwardly projecting arm of the adjacent key lever and moves this arm forwardly. The construction of the parts is such that the spiral surfaces of the trip cam bears a definite relation to the step-shaped series of stop shoulders on the upper arm of the key lever. When the feeling finger of the feeling lever upon being moved forwardly, bears against the lowest key-lever stop-controlling part of the adjacent trip cam, the adjacent key lever is carried simultaneously forward with the feeling lever the greatest distance and its uppermost stop shoulder is carried into the path of the stop lug of the controlling arm. The succeeding parts of the spiral surface of the trip cam are so constructed that they rise progressively higher and arrest the forward movement of the feeling lever when the same has carried the adjacent key lever with its corresponding stop shoulder into the path of the stop lug of the controlling arm. This forward movement of the feeling lever and that of the upper arm of the key lever is gradually reduced as the progressively higher parts of the trip cam are presented to the feeling finger, and when the highest part of the trip cam is presented to the feeling finger, the feeling lever is prevented from moving forward at all and the upper arm of the key lever is not moved with its locking shoulder out of engagement with the locking stop of the controlling arm and consequently the companion gear segment connected therewith is held against downward movement. After the rocking frames 15 and 29 have been turned forwardly sufficiently to engage with several feeling fingers of the feeling levers with their respective trip cams, the rear ends of the segmental notches 28 in the rocking frames engage with the cross bar 25 and depress the same, thereby moving the lifting bar 22 downwardly and at the same time pulling down the springs 27. This downward pull on these springs causes each spring to pull its respective gear segment down as far as possible, and after the downward movement of the segment has been arrested the continued downward movement of the cross bar 22 together with the rocking frames simply stretches these springs until this bar reaches the end of its downward movement.

If a gear segment is locked in its uppermost or zero position its spring 27 will be stretched its fullest extent, whereas, if a gear segment moves downwardly more or less before it is arrested by its shifted key lever, its spring 27 will be stretched less in proportion. This downward movement of the gear segments which are free to move in this direction takes place while the gear segments are in their retracted position and out of engagement, from the dial pinions, so that the dials are not affected by this movement of the segments. After the rocking frames have reached the end of their forward movement and the roller 73 has dropped off from the rear end of the concentric portion 69 of the cam 67, the gear segments are moved forwardly by hand operated mechanism into engagement with their respective dial pinions and are held in this position during the entire subsequent backward movement of the rocking frames, which is effected by hand operated mechanism. During the backward movement of the rocking frames, the gear segments are raised to their highest positions, while in engagement with the dial pinions by the rod 22 and connecting parts and turn the dial backwardly. At the end of the upward movement of the gear segments the latter are released, so as to permit them to move into their retracted position, out of engagement from the dial pinions. During this operation, those gear segments which are held or locked in their highest positions, by reason of their dials being at zero, are simply moved forward at the end of the forward movement of the rocking frames, so as to engage with their respective dial pinions and are again moved backwardly out of engagement therefrom at the end of the forward movement of the rocking frames, without disturbing their respective dials. Each of the unlocked gear segments is moved downwardly a number of spaces corresponding to the number which is registered on its dial, the extent of this movement being controlled by the companion trip cam which arrests the forward movement of the key lever, through the medium of its feeling lever, when the proper stop shoulder of the key lever has been presented to the controlling arm.

Upon now moving the gear segments forwardly in their variously depressed positions and then raising them to their highest position, each depressed gear segment will turn its dial backward the same number of spaces that the gear segment was depressed. Inasmuch as each gear segment was permitted to descend by its trip cam, feeling lever and key lever the same number of spaces as the number indicated on its dial, the gear segment subsequently moves upwardly the same number of spaces before reaching its highest position, thereby turning its dial backwardly the same number of spaces and restoring the same to zero. When all of the dials have been returned to zero, the shoulders 56 of all the trip arms engage with the lowest parts of all of the trip cams 57. The cams 14 and 67 are provided with a longitudinal slit 74, as shown in Figure 39, so as to facilitate the manufacture of these parts. The mechanism whereby the positions of the cams 14 and 67 are reversed preparatory to restoring the dials to zero is constructed as follows:

The cams 14 and 67 drop into their operative position by gravity. Each of these cams is provided in rear of its pivot with a tail 75 which is depressed when it is desired to lift the respective cam into its inoperative position.

76 is a shifting lever which is pivoted at its lower end and is normally turned so that its upper end is disengaged from the rear side of the tail on the cam 14 by a spring 77, as shown in Figures 2 and 7. The member 76 projects in rear of the main frame so as to be accessible for manual operation. 78 is a shifting lever which is pivoted between its upper and lower arms and arranged with its upper arm in rear of the tail on the cam 67 and normally held in engagement therewith by a spring 79, as shown in Figure 14. 80 represents an elbow lever pivoted below the bottom of the key-board, as represented in Figure 14. 81 represents a main line or cord which is connected with the lower arm of the elbow lever 80 and which is provided at its rear end with two branches 82 and 83. The branch 82 connects with the shifting lever 76 above its pivot, and the branch 83 connects with the shifting lever 78 below its pivot. 84 represents grand-total shifting key having a depending stem which is guided in top and bottom of the key-board and which bears with its lower end against the upper arm of the elbow lever 80. Upon depressing the key 84, the elbow lever 80 is turned, so as to draw the cords or lines 81, 82 and 83 forwardly, thereby moving the upper end of the shifting lever 76 into engagement with the tail of the cam 14 and lifting the same into an inoperative position, while the shifting lever 78 is moved rearwardly with its upper arm from the tail of the cam 67, thereby allowing the latter to drop into its operative position. Upon depressing the gear segments while the parts are in this shifted position, the segments move downwardly out of engagement with the dial pinions. After the gear segments have been depressed they are moved forwardly into engagement with their respective dial pinions by an elbow lever 85 which is connected with its lower arm by a line or cord 86 to the rod or bar 7, as shown in Figure 14, or to one of the rock arms 8. The elbow lever is turned in the proper direction for this purpose by a shifting key 87 having a depending stem which is guided in the top and bottom of the key-board and which bears against the upper arm of the elbow lever 85. After the gear segments have been moved forwardly into engagement with the dial pinions, while in the depressed position, the gear segments are retained in forward position, and at the same time raised until they reach their uppermost position, whereby the dials are turned to zero. The shifting key 87 is now released which permits the spring 11 to move the gear segments rearwardly out of engagement with the dial pinions. The key 84 is also released, thereby permitting the shifting levers 76 and 78 to resume the positions shown in Figures 2 and 14, leaving the machine in position to resume adding. For the purpose of permitting the sub-total of a group of numbers to be obtained at any time without interfering with the grand-total of all the numbers which have been added the following mechanism is provided:

88 represents a number of circular sub-total dials, one of which is provided for each grand-total dial and is mounted loosely on the dial shaft 3 on the left hand side of its companion grand-total dial, as represented in Figures 18, 31-33 and 63-64. For the sake of making the machine compact the adjacent dials of two registering devices telescope one over the other, and in order to permit both the dials to be read the outer member of the telescoping dials is provided with notches 89 in its rim which uncover the numbers on the rim of the inner member of the telescoping dials. As shown in the drawings, the rim of each grand-total dial is made complete and arranged within the notched rim of the sub-total dial of the next lower registering device, but if desired, the rim of the sub-total dial may be made complete and arranged within the rim of the grand-total dial, which latter in this case is notched, so as to uncover the numbers of the sub-total dial. Each of the sub-total dials is graduated or numbered on its rim to correspond with its companion grand-total dial and is capable of turning simultaneously with its companion grand-total dial and also independent thereof. 90 represents a number of supporting sleeves, whereby the several registering devices are supported upon the dial shaft 3.

One of these sleeves is provided for each registering device and has the grand-total dial 2, the gear pinion 4 and the grand-total cam 57 of one of the registering devices rigidly secured to its right hand end, while the sub-total dial 88 of the same registering device is mounted loosely on the sleeve toward the left of its companion grand-total dial, as shown in Figure 31.

91 represents a number of star wheels one of which is secured to the left hand end of the supporting sleeve 90 of each registering device, as shown in Figures 31-33 and 63-64. The star wheel of the fractional registering device has eight teeth, while the star wheels of the remaining registering devices each is provided with ten teeth, so that each star wheel corresponds to its companion registering device. Each star wheel is arranged in the space between the sub-total dial of its companion registering device and the grand-total dial of the next higher registering device, as shown in Figure 31. 92, 93 represent the pawls of the coupling devices whereby the sub-total dials are coupled with their companion grand-total dials. The coupling pawl 92 of the initial or first sub-total dial is pivoted by a pin 94 to the left-hand side of this sub-total dial and is held by a bow spring 95 in engagement with its companion star wheel 91, as shown in Figures 31-33. The spring 95 is secured with its ends to the initial sub-total dial and to its pawl and is sufficiently stiff to hold the pawl ordinarily in engagement with the star wheel and thereby cause the sub-total dial to turn with the grand-total dial, when the latter is shifted by the operating mechanism. Upon turning the sub-total dial and its pawl when the grand-total dial is held against movement, the tension of the spring 95 is overcome and the sub-total dial can be moved independently of its companion grand-total dial, during which movement the spring pawl simply trips from one tooth of the star wheel to another. The coupling pawl 93 of each of the higher registering devices engages with its companion star wheel 91 and is pivoted on an arm 96 which turns loosely on the adjacent supporting sleeve 90 between its star wheel and its companion sub-total dial. 97, 98 represent front and rear stops which are arranged on each higher sub-total dial in front and in rear of the arm 96 supporting its companion coupling pawl. 99 represents bow springs each of which is connected at one end to one of the higher coupling pawls 93 and at its other end to the adjacent higher sub-total dial, as represented in Figure 64. The tension of each of these springs holds its pawl yieldingly in engagement with the teeth of its star wheel and it also holds the sub-total dial with its front stop 97 yieldingly in engagement with the adjacent pawl arm 96, as shown in full lines of Figure 64, so that the sub-total dial when unrestrained moves with the pawl arm 96. By thus connecting each sub-total dial with its companion grand-total dial, the sub-total dial is capable of turning with its grand-total dial for any length of time and thereby separately adds the same group of numbers which have been added to the grand-total dial during this time, and then the sub-total dial can be turned backwardly to the zero point for separately adding the next group of numbers which are added to the grand-total dial, while the latter continues to add up all of the numbers. The sub-total dials are turned back to zero by a number of resetting pawls, one of which is arranged in each space between the adjacent telescoping dials of two registering devices. Each resetting pawl consists of a split ring 100, a hub 101 which is keyed or splined to the dial shaft 3 between two adjacent supporting sleeves 90 so as to turn positively with the shaft and a radial arm 102 connecting the rear end of the split ring, as shown in Figures 31, 32 and 63.

The front or free end of the split ring is deflected toward the right and adapted to engage with a coupling shoulder or projection on the sub-total dial upon turning the resetting pawl forwardly. A shoulder for this purpose is formed on the initial sub-total dial by its pawl pivot 94 and a similar shoulder is provided on each higher sub-total dial by the front stop 97 thereof. Upon turning the dial shaft 3 backwardly by segment 110 and connecting mechanism as hereinafter described all of the resetting pawls are turned simultaneously in the same direction by reason of these pawls being keyed to the shaft and during this movement the free ends of the pawls are deflected upon striking the coupling shoulders 94 and 97 and pass over the same without shifting the sub-total dials connected therewith. During the forward movement of the dial shaft and the resetting pawls in the direction of the arrow, Figures 32 and 63, each of the resetting pawls moves idly until its free front end engages with the coupling shoulder of the adjacent sub-total dial, after which the sub-total dial is caused to move forwardly with the resetting pawl until the latter reaches the end of its forward stroke in which position the sub-total dial is at zero. Inasmuch as the sub-total dials may be in different positions preparatory to resetting the same, the resetting pawls of the different sub-total dials will move forwardly different distances before engaging the respective coupling shoulders thereof. The dial shaft may be turned backwardly ten spaces, or only slightly over nine spaces so as not to disturb the sub-total dials which stand at zero, and as the dial shaft is moved forwardly the resetting pawls engage successively with the coupling shoulders of the differently shifted sub-total dials and when the dial shaft reaches the end of its forward movement all of the shifted sub-total dials are turned to zero. If any of the sub-total dials was under tension so that carrying occurred during the clearing operation, thus causing such sub-total dial to indicate "1" at the end of such operation, a second clearing operation will clear this dial so that all the sub-total dials will indicate zero. During this forward movement of the sub-total dials the grand-total dials are held against turning which causes the coupling pawls of the sub-total dials to trip over the star wheels connected with the grand-total dials until the sub-total dials reach the zero position. Each of the grand-total dials is held against turning while its companion sub-total dial is being turned to zero by means of a detent pawl 103 which engages with the front side of its companion gear pinion, as shown in Figures 2, 7, 9 and 18. The pawls 103 of the several gear pinions are mounted on a transverse pawl bar 104, which is supported at its ends by means of two pawl arms 105, which turn loosely upon the supporting rod or bar 35 of the key levers, as shown in Figures 2, 18 and 41. The pawl arms are moved rearwardly for engaging the pawls of the bar 104 with the gear pinions by means of springs 106, as shown in Figures 14 and 18. These springs are connected loosely at their rear ends to the rock-shaft 9 and at their front ends to the pawl arms 105. During the forward movement of the gear segments preparatory to turning the dial pinions, the detent pawls are swung forwardly out of engagement with the dial pinions by means of two shifting rods 107 which are connected at their rear ends to opposite ends of the transverse rod 7 or some part moving therewith and each of which is provided at its front end with a fork or bifurcation 108, which engages with a pin or shoulder 109 on the pawl arm arranged on the adjacent side of the machine, as shown in Figures 2, 14 and 18. As the gear segments move forward into engagement with the gear pinions the shifting rods 107 move the detent pawls 103 out of engagement with the dial pinions and when the gear segments move backwardly the detent pawls are again engaged with the dial pinions by the springs 106. 110 represents a resetting gear segment whereby the sub-total dials are turned to zero. This segment meshes with the rear side of a resetting gear pinion 111 which is secured to the left hand end of the dial shaft 3, as shown in Figures 1, 14 and 18. The resetting segment is pivoted by a pin 112 to the left hand side of the frame so that it is axially in line with the pivots of the registering gear segments when the latter are in their foremost position. 113 represents a resetting link which is pivoted at its upper end to an arm 114 formed on the resetting segment in rear of its pivot and which link 113 is provided at its lower end with a hook 115. When this link is free it drops with its lower end so that its hook engages with the adjacent left-hand end of the shifting bar 25. When the link is so engaged with the bar and the rocking frames 15 and 29 are moved forwardly for engaging the registering gear segment with the dial pinions and turning the latter forwardly, the bar 25 at the same time pulls the link 113 downwardly and thereby raises the resetting gear segment. During the movement of the latter the dial shaft 3 and resetting pawls 100 are turned backwardly without disturbing the sub-total dials. During the subsequent backward movement of the rocking frames 15 and 29 for raising the registering gear segments, the cross bar 25 raises the link 113 and depresses the resetting gear segment. During this movement of the latter the dial shaft and the resetting pawls connected therewith are turned forwardly and the sub-total dials coupled with the resetting pawls during this movement of the pawls are turned to the zero position. When a group of numbers is being added by the sub-total dials the resetting link is raised with its hook out of engagement from the bar 25, as represented in Figure 14, so that the resetting mechanism is inoperative while the addition of the sub-total of a group of numbers is being effected. The resetting link is held in its elevated inoperative position by means of a disengaging lever 116 which is pivoted to the adjacent side of the frame, and which is held with its upper arm yieldingly in engagement with the rear side of the resetting link by means of a spring 117 connected with the lower arm of the disengaging lever, as represented in Figures 14 and 22. This spring constantly tends to turn the disengaging lever in the direction for lifting the resetting lever with its hook out of engagement from the bar 25. When it is desired to turn the sub-total dials to zero the disengaging lever is swung in the direction for allowing the resetting link to engage with the bar 25 by an elbow lever 118 arranged under the bottom of the key-board and connected with its lower arm by a line or cord 119 with the lower arm of the disengaging lever, and a shifting key 120 having a depending stem which is guided in the key-board and which engages with the upper arm of the elbow lever 118, as represented in Figure 14. Upon depressing this key the elbow lever 118 is turned in the direction for disengaging the lever 116 from the resetting link, thereby permitting the latter to engage with the bar 25 and causing the sub-total dials to be turned to zero during the subsequent rocking movement of the frames 15 and 29. Upon releasing the sub-total zero shifting key 120, the disengaging lever 116 is again permitted to raise the resetting link out of engagement from the bar 25, thereby permitting the next group of numbers to be added on the sub-total dials. The downward movement of the resetting segment is limited by a stop 121 arranged on the frame and adapted to be engaged by a co-operating stop on said segment, as shown in Figures 1 and 14.

When a group of numbers has been added on the grand-total and sub-total dials and the latter have been turned to zero for obtaining the sub-total of the next group of numbers separate from the grand-total, it is necessary at times to prevent each sub-total dial, except the first, from turning forward with its companion grand-total dial in order to avoid producing an incorrect sub-total. If the first of a pair of adjacent grand-total dials registers 9 and the second registers 5, forming together the number 59, and subsequently the number 4, is added to the first dial, this latter dial would be turned to 3 and the carrying mechanism would turn the second dial to 6 forming the number 63.

Assuming that the grand-total dials representing 59 had their sub-total dials at zero previous to adding 4, the addition of this number to the grand-total dials causes the sub-total dial of the first grand-total dial to turn to 4, and in the absence of any provision to the contrary the sub-total dial of the second grand-total dial would be turned to 1 at the same time the second grand-total dial is turned from 5 to 6, thereby registering an erroneous sub-total of 14 instead of 4. For the purpose of avoiding the registration of an incorrect sub-total in this manner the following mechanism is provided:

122 represents a number of sub-total cams which are provided with spiral faces similar to the grand-total cams, as hereinafter described, and one of which is secured to the right side of each sub-total dial, as represented in Figures 2, 7, 9, 18, 31 and 62. 123 represents a number of retarding or brake arms whereby the forward rotation of the sub-total dials, except the first, is at times retarded, and which are mounted loosely with their lower ends on the supporting rod 35. Each of these retarding arms is provided at its upper end with a shoulder or bearing piece 124 which engages with the spiral face of one of the sub-total cams, and at its side with a lip or bearing piece 125 which engages with the left-hand side of the same sub-total cam.

126 represents a number of light springs, whereby the retarding arms are connected with the cross bar 59, as shown in Figure 62, and which draw the retarding arms with their upper ends against the faces of the higher sub-total cams with a sufficiently light pressure, so as not to retard the rotation of these cams and the sub-total dials connected therewith.

127 represents tension arms, one of which is pivoted on the rod 35 between the trip arm 54 and retarding arm 123 of each pair of grand-total and sub-total dials and inclines forwardly with its upper end, as represented in Figures 2, 7, 18, 41, and 62. Each tension arm is connected at its upper end by a comparatively heavy spring 128 with the retarding arm 123 of the next higher sub-total dial, this connection of the spring causing the same to be arranged obliquely, as shown in Figures 18 and 62. 129 represents a forwardly projecting presser finger arranged on the upper end of each grand-total trip arm 54. 130 represents a rearwardly projecting shifting head pivoted on the upper end of the adjacent tension arm and provided with a transverse bar at its rear end, which is adapted to be engaged by the adjacent presser finger, as represented in Figures 2, 7, and 62. The shifting head is yieldingly held in an elevated position with its bar in the path of the presser finger by a spring 131, and this movement of the shifting finger is limited by a stop 132 formed thereon and engaging with a stop on the tension arm, as represented in Figures 2 and 62. 133 represents a forwardly projecting catch pivoted on the tension arm concentrically with the shifting head and provided at its front end with a depending hook. This hook is yieldingly held in a depressed position by a spring 134 connected with the tension arm and the downward movement of the catch is limited by a stop 135 arranged on the catch and engaging with a co-operating stop on the tension arm. Upon moving the tension arm into its foremost position, its catch engages over the transverse rod 59 secured to the main frame of the machine. The shifting head is provided in front of its pivot and below the catch with a shifting pin 136, whereby upon depressing the rear end of the head the catch is released from the rod 59 and the tension arm is permitted to move rearwardly. 137 represents a forwardly projecting releasing finger arranged on each retarding arm 123 adjacent to the presser finger of its companion grand-total trip arm. Each of these releasing fingers is provided at its front end with a hook shaped cam having a vertically inclined front side 138 and a horizontally inclined rear side 139.

When two adjacent grand-total dials indicate 59 and the number 4 is added to the first of these dials, as before described, the trip arm of the first grand-total cam drops from the high to the low part of its cam, when the latter completes a revolution and moves forwardly. During this forward movement of this trip arm its presser finger 129 engages with the cross bar of the shifting head on the adjacent tension arm and moves the latter forwardly until its catch engages with the rod 59. While in this foremost position the tension arm through the medium of its oblique spring 128 causes the next higher retarding arm 123 to be pressed against its sub-total cam 122 sufficiently to prevent the same from being turned forward easily, thereby causing the rotation of this cam and its dial to be retarded. As the first dial moves from 9 past zero to 3, its companion sub-total dial is turned from 0 to 4, and the carrying device turns the second grand-total dial from 5 to 6. While the second grand-total dial is thus advanced one number, its companion sub-total dial is held against forward movement by the pressure of the retarding arm 123 against its cam. During this independent movement of the second grand-total dial with reference to its sub-total dial, the pawl arm 96 of the flexible coupling between these two dials moves from the front stop 97 of this sub-total dial to the rear stop 98 thereof without shifting this sub-total dial, so that the same remains at zero.

This movement of the pawl arm 96 is due to the fact that its pawl 93 at this time is held in engagement with the star wheel 91 by the spring 99, so that the movement of the star wheel is transmitted to the pawl arm while at the same time the wheel 88 which carries the stops 97 and 98 is yieldingly held against turning by the pressure of the arm 123 against the respective cam 122 which is connected with the wheel 88.

The extent of this independent movement of the dials with reference to each other is equal to one space on the dials. During the independent forward movement of the second grand-total dial, the spring 99 holds the coupling pawl 93 in engagement with the star wheel 91, but the spring is trained as the pawl supporting arm 96 moves from the front stop 97 to the rear stop 98 of the sub-total cam. When further numbers are added to the second grand-total dial either by operating the same directly from its own key lever or by carrying numbers up from the next lower grand-total dial, the second sub-total dial is turned with the second grand-total dial by the supporting arm of the coupling pawl engaging with the rear stop 98 of the sub-total dial, during which movement of the second sub-total dial its cam overcomes the friction of the retarding arm 123 and slips past the same. This retarded movement of the second sub-total dial to the extent of one space or number with reference to the second grand-total dial continues until the first sub-total cam has made one complete rotation and its retarding arm drops from the high towards the low part of its cam and moves forward. As the retarding arm of the first sub-total cam moves forward its releasing finger 137 engages with its inclined front end against the cross bar on the shifting head of the adjacent tension arm and depresses this head, thereby disengaging its catch 133 from the rod 59 and releasing the tension arm. When the tension arm is released, it is moved backwardly by its oblique spring 128, thereby relieving the next higher sub-total cam from the retarding pressure of its retarding arm. The instant this takes place the resilience of the spring 99 causes the second sub-total cam to be turned forward until its front stop 97 engages with the adjacent pawl supporting arm 96, whereby its sub-total dial is advanced one space or number which represents the number carried up from the next lower sub-total dial. During the backward movement of the sub-total retarding arm the inclined rear side 139 of its hook engages with the cross bar of the shifting head on the tension arm and deflects the same laterally sufficiently to permit these parts to pass each other. The relative position of the presser finger and the releasing finger of the companion trip and retarding arms 54, 123, is such that when companion arms move forwardly during synchronous addition on their respective dials the inclined front end of the releasing finger deflects the shifting head of the tension arm downwardly, thereby preventing the tension arm from effectively retarding the next higher sub-total cam. By arranging the springs 128 obliquely, each retarding arm is pulled laterally toward the right as well as forwardly when its tension arm is moved forward. This causes the lower lip 125 of the retarding arm to bear against the left side of the sub-total cam at the same time that its upper lip 124 bears against the face thereof, thereby retaining control over the sub-total cam, and preventing the sub-total dial from carrying up a number if its retarding arm is passing from the high to the low part of this cam while retarding the same.

It will thus be seen that each lower grand-total dial when completing a turn carries a number to the next higher grand-total dial, but the next higher sub-total dial is prevented from registering the number which was carried up on the grand-total dial until the lower sub-total dial has also made a complete turn and then the higher sub-total dial is permitted to carry up the number from the lower sub-total dial.

*Recording mechanism.*

For the purpose of recording the numbers which are added together by the above described mechanism a recording mechanism is provided which is constructed as follows:—

140 represents a printing roller or platen which is arranged transversely in the upper, rear part of the machine and under the lower side of which the sheet or other article is placed which receives the record. 141 represents a number of type segments which are arranged transversely side by side below the platen and which are pivoted at their front ends to the supporting bar 31 upon which the rear ends of the controlling arms are pivoted. Each of these type segments is provided at its rear end with a segmental row of type carriers 142, which are capable of moving radially back and forth on the type segment. Each of the type carriers is provided at its rear end with a type and is guided upon the type segment by means of screws or rivets 143 secured to the type carrier and arranged in radial slots 144 formed in the type segment, as shown in Figures 2, 3 and 37. Each of the type carriers is held in its inward or retracted position by means of an S-shaped spring 145, which is arranged between the carrier and the type segment and is secured with one end to the carrier and with its other end to the type segment, as shown in Figures 36 and 37. Upon raising or lowering the type segment any one of its type can be brought to the printing point or line, and upon striking the back or inner end of the type carrier, when the same is in line with the printing point the type carrier will be driven outwardly and its type will produce an impression on the sheet supported by the platen. After the carrier has received the blow for driving the same against the platen, the carrier is again quickly retracted to its innermost position by means of its spring. Each of the type segments is connected with one of the controlling arms, so that upon depressing a controlling arm and the registering gear segment connected therewith, the companion type segment will be raised and present one of its type to the printing point. For convenience in operating the machine, the keys are separated a considerable distance on the key-board and in order to produce a compact record, the printing segments are arranged closer together than the keys and the registering mechanism. In order to permit of this arrangement, each type segment and its corresponding controlling arm are connected by a connecting arm 146, as represented in Figures 1, 2 and 50. The connecting arms of the central controlling arms and type segments are comparatively straight, but the connecting arms of the outer type segments and controlling arms are arranged obliquely, the degree of this obliquity gradually increasing from the central type segments and controlling arms in opposite directions toward the outer type segments and controlling arms, as represented in Figure 1. The connecting arms 146 of the outer controlling arms are arranged in the spaces behind the upright parts and above the horizontal parts of the controlling arms, thereby permitting the inner controlling arms to move up and down without interfering with the connecting arms 146 of the outer controlling arms.

The types on each type segment are arranged to correspond with the teeth and numbers of its companion gear segment and registering dial, the zero type being at the upper end of the series and the progressively higher digits arranged in their order downwardly from the zero type. When the registering gear segment is in its highest position it presents its zero tooth to the dial pinion, and the type segment which at this time is in its lowest position presents its zero type to the printing point. Upon depressing a gear segment so as to present one of its higher teeth to the dial pinion, its companion type segment is raised proportionally and presents a corresponding higher numbered type to the printing point. 147 represents a number of hammers whereby the type carriers are struck for driving the type against the platen. One of these hammers is arranged adjacent to each type segment and is provided with a head which is arranged in front of the series of types and in line with the printing point of the platen. Upon shifting the type segment so as to bring one or another of its type carriers to the printing line and then operating the hammer, the latter delivers a blow against the inner end of the particular carrier which is at the printing point and produces an impression of its type on the platen. The several hammers are pivoted on the transverse rod 12 arranged in rear of the segments and each of the hammers is yieldingly held in its forward position by a spring 148 connected at its lower end to a cross bar 149 and at its upper end to a depending arm 150 on the hammer. 151 represents a vertically movable trip bar or rod which is arranged transversely below the hammers and whereby the latter are operated. This bar is supported at its ends upon the rear end of rock arms 152 which turn loosely with their front ends on the rod 31 supporting the type segments and controlling arms. 153 represents a number of hammer or trip pawls, whereby the hammers are retracted preparatory to delivering a blow against the type carriers which are at the printing point. One of these pawls is arranged adjacent to each hammer and pivoted loosely at its lower end to the trip bar 151 and its upper end is provided on its rear side with a downwardly facing hook or shoulder 154, and above said shoulder with a trip face 155, as shown in Figures 3, 6 and 61. Each of the hammers is provided in front of its pivot adjacent to the upper end of the hammer pawl with a lower trip lug or shoulder 156 and an upper trip lug or shoulder 157. When the parts are at rest the hammer pawl 153 is raised into its highest position and the hammer is in its foremost position with its lower trip lug 156 below and in rear of the hook of the hammer pawl and with its upper shoulder 157 in rear of the trip face of the hammer pawl, as represented in Figures 2, 3 and 61. Upon shifting the hammer pawl rearwardly, while the parts are in this position, so that its hook overhangs the lower shoulder 156 of the hammer, and then pulling the hammer pawl downwardly, the hook of the hammer pawl engages with the lower shoulder of the hammer and turns the same so that its head is retracted from the type carrier at the printing line. As the hammer moves downwardly with the hammer pawl, the upper shoulder of the hammer comes into engagement with the trip face of the hammer pawl and during the continued downward movement of the hammer and its pawl, this upper shoulder gradually crowds the hammer pawl forwardly with reference to the hammer by reason of the hammer and its pawl swinging on different centers. During the last portion of the downward movement of the trip bar 151 and the hammer pawl mounted thereon, the pawl is crowded forwardly by the upper shoulder 157 of the hammer to such an extent that its hook is disengaged from the lower shoulder 156 of the hammer, thereby liberating the latter and permitting its spring 148 to throw the same quickly and deliver a blow against the type carrier at the printing line. The trip bar 151 now rises and carries the hammer pawl into its highest position, preparatory to again engaging the hammer for depressing the same. 158 represents a number of upright shifting arms whereby the hammer pawls are moved rearwardly, so that their hooks engage with the lower shoulders of the hammers. One of these arms is arranged adjacent to each hammer pawl, as shown in Figures 3, 6 and 61, and is pivoted at its lower end on the trip bar 151, and its upper end is provided with a roller or projection 159 which bears against a hammer cam 160 on the lower part of the adjacent type segment, as shown in Figures 3, 7 and 50. This hammer cam is provided at its upper end with a receding or low portion, an inclined portion arranged below the low portion and a concentric or high portion arranged below the inclined portion. Each shifting arm 158 is moved forwardly and its roller is yieldingly held in engagement with the adjacent hammer cam by a spring 161 connecting said arm with a cross bar 162 secured to the rock arms 152, as represented in Figures 7 and 8. The backward movement of each hammer pawl with reference to its companion shifting arm is limited by means of a stop 163 secured to the upper portion of the hammer pawl and engaging with the front side of the shifting arm, as represented in Figures 3, 5 and 61. Each hammer pawl is yieldingly held in its rearmost position with reference to its shifting arm by means of a C-shaped spring 164 secured with its ends, respectively, to the hammer pawl and its shifting arm, as shown in Figures 2, 3 and 61. In the lowermost position of a type segment the receding part of its cam is presented to the roller of the shifting arm 158, which permits the hammer pawl to be retracted into its foremost position, as represented in Figure 2. Upon depressing the trip bar 151 when the parts are in this position, the roller 159 is not engaged soon enough by the incline of the cam 160 to engage the hook of the hammer pawl with the lower shoulder of the hammer, before the hook has passed below this shoulder, but instead the trip face of the hammer pawl slides idly against the shoulder 156 without retracting the hammer, whereby no impression of the particular type at the printing line is produced. If the type segment is raised, so as to present one of its lower types to the printing point or line, the incline of its cam during the first part of the upward movement of the segment moves the shifting arm 158 rearwardly together with the hammer pawl yieldingly connected therewith, so that the hook of the hammer pawl stands over the lower shoulder 156 of the hammer. Upon now depressing the pawl the hammer will be retracted and released near the end of the downward movement of the pawl and will be quickly swung up by the spring 148, thereby delivering a blow against the type at the printing point and producing an impression thereof.

The incline 160 of the type segment cam is so constructed that it throws the hammer pawl backwardly into an operative position when the segment is raised one digit space, and during the continued upward movement of the segment, the hammer pawl is held in this operative position by the high concentric part of the segment cam. By thus constructing the type segment cam its companion hammer pawl is not shifted when the segment is not raised and its zero type remains at the printing line, but the hammer pawl is shifted into an operative position for producing an impression, if the type segment is raised one or more digit spaces and presents any one of its digits higher than zero to the printing line.

Automatic printing of zero.

165 represents a number of transfer or coupling fingers which enable the ciphers in a number to be printed automatically. One of these transfer fingers is secured to each of the shifting arms 158, as represented in Figures 3, 7 and 61, and extends laterally toward the right therefrom into engagement with the shifting arm of the next lower hammer pawl, as represented in Figure 22. If any one of the printing segments remains in its lowest position, so that its cipher remains at the printing line and the next higher printing segment has been raised for printing a higher number or digit, the transfer finger of the higher hammer shifting arm 158 while being moved rearwardly by the cam of its companion printing segment, is caused to engage with the shifting arm 158 of the next lower hammer pawl and shift the latter backwardly, so that its hook is carried backwardly over the lower shoulder of the companion hammer. Upon now depressing the trip bar 151, the higher hammer pawl 153 is coupled with its hammer and the next lower hammer pawl is also coupled with its hammer, whereby an impression of the cipher or zero type on the lower segment is produced on the platen at the same time that the next higher number is printed on the platen.

If two ciphers occur in succession in the body of a number, the shifting arm to the left of the highest order printing segment to be operated for printing a zero sets the hammer mechanism of said highest zero-printing segment by means of the transfer finger of said shifting arm, and the shifting arm of said highest zero printing segment in turn, by means of its transfer finger sets the hammer mechanism of the printing segment of next lower order, etc. This operation of producing an impression of the cipher type is effected automatically and renders it possible to print any number of ciphers in succession in the body of a number because the hammer operating mechanism of each segment which remains standing with its upper type at the printing line is controlled by the hammer operating mechanism of a higher type segment and in turns controls the hammer operating mechanism of the next lower type segment, if the next lower segment presents a cipher to the printing line. Only the ciphers below the highest digit in the number to be recorded are thus printed automatically because the printing of a digit depends upon the upward movement of a printing segment, thereby avoiding the printing of ciphers ahead of the highest digit in the number to be recorded. The hammer shifting device of the segment which prints the numbers representing units of cents is, preferably, not provided with a transfer finger to operate on the hammer shifting device of the segment which prints fractions of a cent, because it is proper that the space to the right of the lowest integer shall remain blank when no fraction is recorded therein. The carrying bar 151 is raised by one or more springs 166 which connect this bar with the transverse rod 12, as shown in Figure 8, and the upward movement of the bar 151 is arrested when the hammer operating pawls reach their highest position by a transverse bar 167 which is engaged by the rear ends of the rock arms 152. 168 represents a coupling hook, whereby the hammer trip devices are depressed. This hook is pivoted with its upper end to the trip bar 151 and its lower engaging end is provided with a notch having upper and lower shoulders.

In the lowered position of this hook its notch engages with a cross bar 169 which is connected with the rock arms 24, as represented in Figures 2 and 7, so that the hook and the hammer operating devices connecting therewith are actuated from the rocking frames 15 and 29, through the medium of the rock arms 24. In the rearmost position of the rocking frames, the front ends of their notches 28 bear against the front side of the bar 25 to which the gear segments are yieldingly connected and the cross bar 169 bears against the rear or upper shoulder of the notch of the hook 168, as represented in Figure 2. Upon swinging the rocking frames forwardly, the incline of the cam 14 first raises the rock arm 13 and shifts the gear segments into engagement with the dial pinions, and after the segments have been so shifted, the rear shoulders of the notches 28 in the rocking frames engage with the cross bar 25, so that thereafter this bar is carried downwardly with the rocking frames and the gear segments are depressed. During this downward movement of the bar 25 with the rocking frames, the companion bar 169 moves down idly in the notch of the hook 168 until this bar engages with the lower or front shoulder of this hook. After the cross bar 169 engages with the lower shoulder of the notch of the hook, the latter and the hammer operating devices connected therewith are moved downwardly with the rocking frames until these frames reach the end of their downward movement. During the last portion of the downward movement of the rocking frames the hammer pawls are disengaged as before described, from the retracted hammers, whereby the latter are released and strike the type carriers which are at the printing line. By this means, the blow of the hammers is delivered after the registering of the numbers has been effected on the dials and the type segments have been shifted into their proper position for recording the respective number. The hammers do not follow the type carriers to the end of their outward movement but are stopped short, after delivering a blow against the inner ends of the carriers by their depending arms 150 engaging with a rubber facing 170 on the cross bar 167, as shown in Figure 3, so that the types are moved outwardly by the impact of the hammers and are then returned by their springs so as to clear the printing surface.

*Non-print mechanism.*

When it is desired to only add the numbers and not record the same, the coupling hook 168 is raised with its notch out of engagement with the cross bar 169, which allows the rocking frames and connecting parts to move back and forth without affecting the hammer operating devices. The coupling hook is disengaged from the cross bar by means of an elbow lever 171 secured to a transverse rock shaft 172. The lower arm of the elbow lever is connected with the shaft 20 by a spring 173, whereby the lever and the shaft carrying the same are turned in the direction for disconnecting the upper arm of the lever 171 from the hook 168, thereby permitting the latter to engage the bar 169. 174 represents an elbow lever arranged below the bottom of the key-board and connected by a line or cord 175 with its lower arm to the upper arm of the elbow lever 171 as represented in Figure 14. 176 represents a shifting key having a depending stem which is guided in the top and bottom of the key-board and which engages with its lower end against the upper arm of the elbow lever 174. Upon depressing this key the elbow lever 174 is turned in the direction for moving the rock arm 171 into engagement with the coupling hook 168 and disengaging the latter from the cross bar 169, thereby throwing the recording mechanism out of gear. Upon releasing the key 176, the rock arm 171 is permitted to swing backwardly and allow the coupling hook to engage with the cross bar 169, thereby throwing the recording mechanism into gear. When the gear segments and the printing segments are thus operated relatively to the keys which have been depressed, the number represented by the depressed keys is registered and also recorded by the printing mechanism. The addition of further numbers proceeds in like manner the several numbers added successively by the registering mechanism but each number is printed individually by the recording mechanism.

When it is desired to print or record the grand-total at the foot of the column of the numbers which have been printed, the operation is as follows: The grand-total key 34 is first depressed, thereby raising the cam 14 into an inoperative position and lowering the cam 67 into an operative position. Upon now moving the rocking frames 15 and 29 forwardly the feeling levers 61 are turned so as to move their feeling fingers forwardly into engagement with the respective cams 57 of the grand-total dials and at the same time each feeling lever carries the adjacent key lever forwardly so that its particular stop shoulder 39 corresponding to the positon of the trip cam 57 and its grand-total dial is moved into the path of the stop lug 34 of the controlling arm. After the key levers have been thus shifted forwardly into their respective positions corresponding with their dials, the continued forward movement of the rocking frames causes the gear segments while in a retracted position out of engagement with the dial pinions to be depressed until each segment is arrested by the engagement of the stop lug on its controlling arm with the respective stop shoulder of its key lever, whereby each printing segment is raised so as to present the type carrier to the printing point which carries the type corresponding to the number registered on its companion grand-total dial. During the last part of the forward and downward rocking movement of the rocking frames the hammers are operated and the particular type at the printing line are impressed on the platen.

Upon now swinging the rocking frames backwardly, the gear segments are raised while still in a retracted position out of engagement with their companion dial pinions, thereby permitting further numbers to be added to the total already registered on the dials. If however, it is desired to turn the grand-total dials back to zero, after the grand-total of the added numbers has been printed or recorded the gear segments, while in the retracted lower position which they occupy while printing the totals, are moved forwardly into engagement with their respective dial pinions by the depression of the key 87. Upon now moving the rocking frames backwardly the gear segments are raised while in their forward position in engagement with their pinions, whereby each of the latter is turned backwardly and when the segments reach the end of their upward movement, the dials have been turned backwardly a number of spaces corresponding to the number on the dial, thereby turning all of the dials to zero.

For the purpose of recording the sub-total of any particular group of numbers forming part of the grand-total, the machine is provided with mechanism which is constructed and operated as follows:—

177 represents an elbow lever arranged below the bottom of the key-board and having its lower arm connected by a wire or cord 178 and branch wires or cords 179, 180 with the cords 82, 83 leading to the levers 76 78, as shown in Figure 14. 181 is a shifting key provided with a depending stem which is guided in the top and bottom of the keyboard and which engages with the upper arm of the elbow lever 177. 182 represents a transversely movable shifting bar which is guided with its ends in the main frame and which is provided with a number of rearwardly projecting shifting fingers 183, one of which is adapted to engage with the right hand side of the upper arm of each feeling lever 61, as represented in Figures 2, 18 and 19.

The upper arm of each feeling lever 61 is made flexible so that the same can be shifted laterally or in the direction parallel with its axis, so as to bring the front end of its feeling finger in rear of the face of the adjacent sub-total trip cam. In order to provide the necessary lateral flexibility in the feeling lever and still maintain the same comparatively rigid when moved in a direction at right angles to its axis, the lever is provided with an inverted U-shaped slot 184. This slot is arranged with its bight or curved portion in the lever above the pivot thereof and its branches or ends extend downwardly on opposite sides of its pivot, as shown in Figures 2, 3 and 62. By this construction of the feeling lever its upper arm, when deflected in the direction of its axis, swings from a point near the lower end of the lever, thereby distributing the deflection of the lever over a considerable portion thereof and preserving its elasticity without danger of kinking the same.

185 represents an upper elbow lever which is connected with its upper arm to the shifting bar 182, and 186 is a lower elbow lever which is pivoted on the rod 35 and engages with its upper arm against the lower arm of the upper lever 185, as represented in Figures 14 and 18. 187 represents a cord which connects the lower arm of the lower elbow lever 186 with the lower arm of the elbow lever 177, as represented in Figure 14. The shifting bar 182 is yieldingly held in its normal position toward the right by a spring 188 which connects the lower arm of the lower elbow lever 186 with the adjacent stationary part of the machine, as represented in Figure 18, whereby the feeling fingers of the feeling levers are always held normally in rear of the grand-total cam of the registering devices, ready to print the grand-total of the numbers. Upon depressing the key 181, the elbow levers 185 and 186 are turned in the proper direction so that the shifting bar 182 is moved toward the left and the feeling fingers of the feeling levers 61 are moved in rear of the sub-total trip cams and at the same time the trip levers 76 and 78 are shifted simultaneously in opposite directions, so as to raise the cam 14 into an inoperative position, and depress the cam 67 into an operative position, thereby recording the subtotal of a group of numbers.

Upon now moving the rocking frames 15 and 29 forwardly by means of the handle 21, the upper arms of the feeling levers are moved forwardly until they bear with their feeling fingers against their companion subtotal cams, and the feeling levers carry the key levers forwardly until their stop shoulders corresponding with the position of the sub-total cams and their respective sub-total dials stand in the path of the stop lugs of the controlling arms. During the continued forward movement of the rocking frames the gear segments are depressed in a retracted position out of engagement with their dial pinions until arrested by the stop lugs on their respective controlling arms engaging with the proper stop shoulders of the key levers, thereby carrying the type segments upwardly so that they present the types which correspond to the numbers registered on the sub-total dials to the printing point. During the continued forward movement of the rocking frames, the hammers are operated and produce impressions of the types which are at the printing line. If it is desired to add more numbers to the sub-total of the group of numbers already registered on the sub-total dials the gear segments are moved upward in a retracted position and the cams 14 and 67 are reversed, so as to permit of resuming the adding of numbers. When it is desired to turn the sub-total dials to zero after having printed the sub-total of the separate group of numbers, the sub-total zero key 120 is depressed so as to permit the coupling hook 113 to engage with the end of the bar 25 before the rocking frames begin their forward movement. During the forward movement of the rocking frames with cam 14 elevated and the cam 67 depressed the printing of the sub-total of the group of numbers will be effected, as before described, and during this movement the resetting gear segment 110 turns all of the resetting pawls backwardly. During the subsequent backward movement of the rocking frames the gear segment 110 moves downwardly and the resetting pawls coupled therewith are engaged with the stops 94 and 97 of the sub-total dials and turn all of these dials forward to zero. Upon releasing the key 181, the shifting bar 182 is shifted toward the right by the spring 188, thereby permitting the upper arms of the feeling levers to move toward the right and carry their feeling fingers from the sub-total cams to the grand total cams, and at the same time the cams 14 and 67 are restored to their normal position.

The grand total cams 57 and the sub-total cams 122 are alike at the points contacted by the feeling fingers so that the same feeling fingers can control the taking of a total from either of the sets of cams, as above described, but may vary at other points in order to effect proper movements of fingers 129 and 137 relatively to each other and to the cross heads 130.

In the highest registering and recording mechanism which registers and records the highest numbers for which the machine is designed, the stop arm 37 having the differential stops, is not provided with a lower key operated arm 36, because the arm 37 is only used to arrest its gear segment and printing segment at different points, for setting the parts preparatory to turning the highest grand-total dial to zero or for printing the grand-total or sub-total of the number indicated by the highest grand-total or sub-total dials.

*Duplicate printing by counterpart types.*

For the purpose of permitting the numbers to be printed in duplicate, for instance, when it is desired to print an amount on a bank check, and the same amount on a stub, the machine is provided with mechanism which is constructed as follows:

1410 represents a number of duplicate printing or type segments which are arranged transversely in line and preferably toward the right of the main printing segments 141, as represented in Figures 1, 20 and 22, and which are pivoted loosely at their front ends on the supporting rod 31. One of these duplicate number printing segments is provided for each of the main number printing segments and each duplicate segment is connec d with its companion main segment by a U-shaped frame which is connected by the upper ends of its arms 189 to its duplicate and main segment and has its cross bar 190 arranged transversely below the intervening segments, as shown in Figures 1, 2, 4, 7 and 24. The cross bars 190 are arranged sufficient distances below the segments so that each pair of connected main and duplicate printing segments can be raised to its highest position without interfering with the other segments. For the purpose of permitting the connecting frames of the several pairs of printing segments to be arranged compactly, the arms of the connecting frame are curved concentrically with the pivots of the segments, as represented in Figures 2 and 4.

Each of these duplicate printing segments is provided with type carriers corresponding to and constructed the same as the type carriers of its companion main segment and each of these duplicate segments is provided with a hammer operating device which is constructed the same as the hammer operating devices of the main segments, and the same description and letters of reference, therefore apply to the details of both the main and duplicate printing segments.

*Duplicate printing inoperative.*

If it is desired to duplicate only the small numbers no duplicate segments need be provided for the higher numbered printing segments. For the purpose of throwing the duplicate printing mechanism out of gear when it is not desired to print the numbers in duplicate a horizontal movable bar 191 is provided which is arranged transversely in rear of the hammer pawls of the duplicate printing segments and which is provided with a number of forwardly projecting lugs or stops 192, as represented in full lines in Figures 4, 22 and 25. Upon shifting this bar, so that its stops stand in rear of the duplicate hammer pawls, as shown in full lines in Figure 25, these pawls are prevented from being swung rearwardly and operating the hammers. Upon moving this bar so that its stops clear the duplicate hammer pawls, as represented by dotted lines 192ª, Figure 25, these pawls are free to be swung rearwardly by the segment cams 160 into engagement with the hammers, so as to retract the same during the downward movement of the pawls for producing an impression of the types of the duplicate segments which are at the printing line. A suitable key or finger-piece is provided, by the operation of which the bar 191 is shifted into effective position.

*Horizontal ruling.*

For the purpose of producing horizontal or cross ruling upon the sheet or surface which receives the record, the following mechanism is provided:—

193 represents the lowermost type carrier of each of the number printing segments, each of which is provided at its rear end with a horizontal ruling type. Each of these ruling type carriers is constructed the same as the number type carriers with the exception that the front end of each ruling type carrier is widened horizontally, preferably, in both directions in the form of the letter T, as shown in Figure 23, and the ruling type extends transversely from end to end of the widened part of this carrier, so that the ruling types when placed transversely in line and driven against the platen will produce a practically continuous line transversely on the recording surface. Each of the number key levers is provided on the front side of its upper arm with a ruling stop or shoulder 194, which is arranged one space below the lowermost number registering stop or shoulder 39. Upon swinging the key levers, so as to bring their ruling shoulders 194 into the path of the lugs 34 of the controlling arms, the latter together with the gear segments connected therewith are depressed upon moving the rocking frames 15 and 29 forwardly until the stop lugs 34 of the controlling arm engage with the lowermost or ruling shoulders 194 of the key levers. When the controlling arms reach this lowermost position the printing segments connected therewith have been raised to their highest position and present to the ruling types of all of the segments to the printing line. During the last portion of the forward movement of the rocking frames 15 and 29, while the ruling types are at the printing line, the proper hammers are operated for producing an impression of these types. The key levers are turned simultaneously for bringing all of their ruling shoulders simultaneously into the path of the stop lugs of the respective controlling arms 70 by means of a rocking plate 195 which is arranged transversely in front of the lower arms of the key levers and overhangs the front ends thereof, as represented in Figures 2, 7 and 28. This rocking plate is secured to a transverse rock shaft 196 which is journaled in the frame of the machine and which is turned for holding the rocking plate in its uppermost position out of engagement from the key levers by means of a spring 197, as shown in Figure 28. 198 represents a shifting key, whereby the parts are shifted to permit of producing cross or horizontal ruling. This key is provided with a depending stem which is guided in the top and bottom of the key-board and which engages against the rear end of a rock arm 199 projecting rearwardly from the rock shaft 196, as represented in Figure 14. Upon depressing this key, the rocking plate 195 is turned in the direction for depressing the front arms of all the number key levers and bringing the ruling shoulders 194 on the upper arms thereof into position for arresting the type segments during their upward movement when the ruling types arrive at the printing point. In order to prevent the gear segments from meshing with the dial pinions during the cross ruling operation the position of the cams 14 and 67 is reversed at the same time that the plate 195 is depressed. This is effected by a depending arm 1960 secured to the shaft 196 and connected by a cord or wire 1961 with the branch wires 82, 83 leading to the shifting levers 76 and 78, as represented in Figures 14 and 28. When it is desired to produce horizontal ruling on the recording surface, the key 198 is depressed thereby raising the cam 14 into an inoperative position, depressing the cam 67 into an operative position and moving all the number key levers with their ruling shoulders 194 into the paths of the stop lugs of the controlling arms. Upon now moving the handle 21 forwardly, the rocking of the frames 15 and 29 first causes the gear segments together with their controlling arms to be moved downwardly until arrested by the ruling shoulders of the keys, in which position of the parts, the printing segments have been raised with their ruling types to the printing line. The continued forward movement of the rocking frames operates the hammer tripping mechanism and produces an impression of the ruling types on the recording surface. Upon now moving the handle 21 backwardly and releasing the key 198, the parts resume their normal position. While the cams 14 and 67 are reversed so as to move the gear segments downwardly out of engagement with the dial pinions for producing horizontal ruling, the feeling levers are also shifted, but this movement of the feeling levers is of no effect. Instead of producing cross ruling by means of a transverse row of independent types, this ruling may be effected by a separate ruling plate 200 which extends transversely along the entire width of the space to be ruled, as represented in Figure 55. In this modified construction of the horizontal ruling device, the ruling plate may be supported by upright arms 201 from a transverse bar or shaft 202, and may be operated by any suitable mechanism.

Vertical ruling.

Mechanism is provided whereby vertical ruling may be produced on the recording surface, this mechanism being constructed as follows:—

203 represents an upright ruling lever which turns loosely on the supporting bar 12 and which is arranged between the dollars and dimes printing segments, as shown in Figures 1, 13, 20 and 22. The upper arm of the ruling lever is provided with a vertical ruling blade 204 which is arranged close to the platen when in its upper position. The ruling lever is yieldingly held in this position by means of a spring 205 connected with the lower arm of the ruling lever and the movement of the latter toward the platen is limited by the engagement of its lower arm with the rear side of a rubber buffer 206 on the cross bar 167 similar to the rubber 170. 207 represents a pawl whereby the ruling lever is retracted and then released for permitting the same to deliver a blow against the recording surface for producing a vertical ruling impression thereon. This pawl is pivoted at its lower end on the cross bar 151 and is yieldingly held with the hook 208 on its upper arm in engagement with a shoulder 209 on the ruling lever by means of a spring 210 which connects the lower arm of the ruling lever with the rod 162.

In the uppermost position of the bar 167 the ruling pawl engages the shoulder of the ruling lever and upon depressing this bar, the ruling lever is pulled downwardly by the ruling pawl. During this downward movement of the ruling lever and pawl, the front side of this lever engages with the upper arm of the pawl and gradually crowds the pawl forward until the pawl is disengaged from the shoulder of the lever. When the ruling lever is thus released from the pawl, the lever is quickly turned by the spring 205 in a direction for throwing its upper arm upwardly, whereby its blade delivers a blow against the recording sheet or surface on the platen and produces a ruling impression thereon. During the last portion of the subsequent upward movement of the ruling pawl 207 its hook again engages over the shoulder of the ruling lever. This construction of vertical ruling devices produces the vertical ruling in sections by successive blows of the ruling blade. If desired vertical ruling may be produced by holding a stylus or lead pencil 211 against the recording surface by means of a stationary holder 212, as represented in Figure 56, whereby continuous ruling is produced on the recording surface or sheet as the sheet is fed past the same.

Vertical ruling may also be produced by a ruling disk 213 arranged to bear with one side against the recording surface and an inking wheel 214 supplying the ink to the edge of the ruling disk, as represented in Figure 57.

Word printing mechanism.

For the purpose of permitting words to be printed in front of the numbers which are added together the following mechanism is provided:—

1411 represents a word printing segment which is mounted loosely on the rod 31 next to the highest number printing segment of the main number recording mechanism, as represented in Figures 1, 8, 20 and 22. This segment is provided with a number of radially movable carriers 1420, which are constructed the same as the carriers of the number printing segments and each of which is provided on its face with a word type. The words of these types are selected according to the purpose or business for which the machine is to be used. For instance, if the machine is to be used in a bank, types representing the words "Vouchers," "Checks," "Drafts," "Bills," and similar words common to the banking business may be used. When the machine is designed for use in a restaurant the words "Soup," "Vegetables," "Meats," "Dessert," and other words peculiar to this business may be used. The position of the word type segment is controlled by a key lever 3600, Fig. 8, which turns on the bar 35, is similar to the number key levers and is provided on the front side of its upper arm 3700 with a vertical series of differential stops or shoulders 3900 which are adapted to be engaged by the stop lug 3400 of a controlling arm 3000; and lever 3600 is also provided with a locking stop or shoulder which is adapted to be engaged by a locking lug 3300 on the controlling arm, as represented in Figure 8. The controlling arm 3000 is connected with the word printing segment by a connecting bar 1460. The stop shoulders on the upper arm of the word key lever are so arranged that upon swinging this lever so as to carry different shoulders into the path of the stop lug on the controlling arm, the latter will be arrested at different points in its downward or forward movement and the word printing segment connected therewith will be stopped at different points in its upward movement and present the particular word type to the printing point which corresponds with the shoulder or stop on the word key lever. The upward movement of the controlling arm 3000 is limited by its rear locking lug 3300 engaging with the stop bar 32 which arrest the upward movement of the controlling arms 30 of the number registering and recording mechanism. The downward movement of the controlling arm 3000 and the simultaneously upward movement of the word printing segment is effected by a spring 215 which yieldingly connects this arm with the bar 25 to which the registering gear segments are connected. 216, Fig. 1, represents a row of word keys having depending stems which are guided in the top and bottom of the key-board and which engage against the upper side of the front arm 3600 of the word key lever at different distances from the fulcrum thereof. Upon depressing any one of the word keys the word key lever will be turned the proper distance to bring its proper stop shoulder into the path of the stop lug of the companion controlling arm and arrest the word type segment during its upward movement, when the word type corresponding with the word of the depressed key has reached the printing line. When the respective word type is in this position the same is driven against the recording surface for producing an impression thereon, at the same time that the printing of the numbers by the numbering printing segments is effected. The word types are driven against the platen by a hammer operating mechanism which is constructed the same as the hammer operating devices of the number printing mechanism and the same letters of reference are therefore used to denote the same. The word key lever is yieldingly held in its normal position by a spring 600.

An auxiliary adding mechanism is provided which permits of registering and recording the individual or separate number of adding and recording operations which have been made by the main adding mechanism and also permits of effecting an addition of numbers different from the numbers which are added by the main adding mechanism.

This auxiliary adding mechanism is constructed as follows:

2000 represents a number of auxiliary grand-total dials and 380 a number of auxiliary sub-total dials which are mounted on the left hand end of the dial shaft 3. 5000 represents a number of auxiliary gear segments which are mounted on the transverse rod 7 and are adapted to engage with gear pinions 400 on the auxiliary grand-total dials, as represented in Figures 9 and 18. Each gear segment 500 is connected with a controlling arm 3001 arranged adjacent to the gear segment by a latch or coupling which at times permits the segment to move independently of the controlling arm. 3601 and 3701 represent auxiliary key levers which are operated by auxiliary keys 401 and which control the operation of the auxiliary registering and recording mechanism. The detail construction of the dials, gear segments, printing segments, key levers and the parts co-operating therewith of the auxiliary registering and recording mechanism is substantially the same as the construction of the same parts in the main registering and recording mechanism, except as hereinafter distinguished, and the same letters of reference are therefore employed to denote like parts in both of these sets of mechanisms.

In the drawings, two auxiliary key levers and three pairs of auxiliary grand-total and sub-total dials are shown which permits of registering and recording a total of 999, but additional registering and recording devices may be employed if it is desired to increase the capacity of the machine.

In the auxiliary mechanism each of the higher gear segments 5000 is provided with a pivot latch 501 the same as in the main registering mechanism. The lowest or primary gear segment of the auxiliary registering mechanism is provided with a movable latch 502 which is adapted to be engaged with or to be disengaged from the upper guide face on its companion controlling arm. This latch is pivoted on the primary gear segment by a spring 217, shown in Fig. 60 and yieldingly held in position as shown in Figs. 9, 59 and 60 as to overhang the horn of its companion guide arm, as represented in Figure 60, while upon moving the latch rearwardly so as to clear the controlling arm its gear segment is permitted to drop until a stop 490 on the segment adjacent to the latch bears against the controlling arm. The extent of this drop of the primary segment independent of its controlling arm is equal to one space or number of the registering mechanism the same as in the higher auxiliary registering devices. In the auxiliary registering mechanism the gear segments are not provided with lower stops 46 like those of the gear segments of the main registering mechanism which permits the auxiliary controlling arms to move downwardly when necessary independently of the auxiliary gear segments. The upward movement of the auxiliary gear segments is limited by stops 218 with which the upper ends of the gear segments engage. 219 represents a foot formed on the lower side of each controlling arm 3001 and adapted to engage with the lifting cross bar 22.

For the purpose of effecting an ordinary addition of numbers on the auxiliary registering mechanism, the auxiliary key levers are shifted into the proper position by the depression of the keys 401 representing the numbers to be added and then the rocking segments 15 and 29 are turned forwardly. During the forward movement of the rocking frames the auxiliary gear segments are first moved into engagement with the auxiliary dial pinions by the cam 14 and then pulled down by the springs 27, and the controlling arms are also pulled down by the latches of the gear segments engaging with the controlling arms. The downward movement of the gear segments and controlling arms continues until the stops 34 of the controlling arm strike the shoulders 39 on the key levers which stand in the path of the stops 34. At the end of the forward movement of the rocking frames the gear segments are withdrawn from the dial pinions by the springs 60 and during the subsequent backward movement of the rocking frames the gear segments and controlling arms are raised by the cross bar 22 engaging with the gear segments and with the feet 219 of the arms. The carrying of numbers from the units dials to the tens dials and from the latter to the hundreds dials and the turning of the dials to zero is effected in the same manner as in the main registering mechanism.

By this organization of the machine, numbers such as sales or prices of goods can be added and recorded by the main registering mechanism and other numbers such as the rebate on sales or discount on the prices of the goods, can be separately added and recorded by the auxiliary registering mechanism.

The key controlled devices whereby the parts of the main registering and recording mechanism are shifted into the proper position preparatory to registering and recording a number are distinct from the key controlled devices whereby the same effect is produced in the auxiliary registering and recording mechanism, but both sets of registering and recording mechanisms are operated simultaneously by the one universal shifting mechanism for effecting the registration and recording of the numbers which are represented by the different positions of both key controlled devices. For the purpose of permitting counting of the separate number of additions which has been effected on the main registering mechanism the auxiliary adding mechanism is constructed as follows:

220 represents springs whereby the auxiliary controlling arms are connected with the cross bar 25. The springs 220 of auxiliary controlling arms are provided at their lower end with vertically elongated loops 221 which receive the bar 25, as shown in Figure 9, and which form a slack connection between the springs 220 and the bar 25.

222 represents a number of auxiliary stops, whereby the gear segments, when in their foremost position, are permitted to move downwardly only one space when the auxiliary register is used to count the number of additions which have been made by the main registering mechanism. One of these stops is arranged adjacent to the left hand side of each auxiliary controlling arm and is provided on the upper side of its rear end with a curved guide face which corresponds to and is in line with the upper curved bearing face of the controlling arm when the latter is in its highest position, as represented in Figures 9 and 59. The several stops 222 are secured with their front ends to a transversely movable slide 223 which is adjustably secured to the underside of the cover 224 of the registering mechanism by a screw 225 passing through a transverse slot 226 in the cover, as represented in Figures 1, 9 and 59. 227 represents a trip finger secured with its front end to the slide 223 and arranged with its rear end adjacent to the front side of the latch 502 of the primary or units gear segment. 228 represents an elbow lever arranged below the bottom of the key-board and having its lower arm connected with each of the upper arms of the auxiliary feeling levers 610 by springs 229, as shown in Figures 9 and 14. 230 represents a key having a depending stem which is guided in the top and bottom of the key-board and which bears against the upper arm of the elbow lever 228. During the ordinary adding operation by the auxiliary registering mechanism, the slide 223 is moved toward the left, so that the finger 227 and stops 222 are not in the path of the lugs 490 and latches 501, 502, the springs 229 are loose and do not interfere with the movement of the auxiliary key levers and the springs 220 do not come into use.

When it is desired to count and record consecutively the number of separate additions which are made by the main adding mechanism, the slide 223 is shifted to the right so that its stops 222 stand in the downward path of the stop lugs 490 and latches 501, and 502 of the gear segments and the trip finger 227 stands in the forward path of the latch 502 of the primary or initial gear segment, and the shifting key 230 is depressed, whereby the upper arms of the feeling levers are swung forwardly until their feeling fingers bear against the grand-total cams of the auxiliary dials, these levers together with their companion key levers being yieldingly held in this forward position by the springs 229.

Previous to beginning the consecutive counting and recording of the separate additions of the main registering mechanism, the dials are all turned to zero, in which position all of the upper key lever arms 3701 are in their rearmost position and have their locking shoulders 38 in engagement with the locking lugs 33 of the auxiliary controlling arms, whereby the latter are held in their highest position. Upon moving the rocking segments 15 and 29 forwardly after depressing the proper keys of the number to be added on the main registering mechanism, the gear segments are all moved forwardly into engagement with their respective dial pinions and the springs 27 of the several gear segments are then pulled downward by the bar 25.

During the forward movement of the auxiliary tens and hundreds gear segments their latches 501 engage with their companion controlling arms which prevents these gear segments from being depressed by the pull of their springs 27, whereby the tens and hundreds dials are not turned. During the forward movement of the primary or units gear segment its latch 502 engages with the trip finger 227 and is turned backwardly out of engagement with the top of its companion controlling arm, thereby releasing the units gear segment and permitting the same to be pulled downwardly by its spring 27, while in engagement with its gear pinion, whereby the grand-total and sub-total units dials are turned. As the auxiliary gear segments move forwardly into engagement with the dial pinions, their lugs 490 move over the stops 222, but in the foremost position of these gear segments their stop lugs 490 are separated from the stops 222 a distance equal to one tooth of the segments or one space on the dials. The instant the latch 502 of the units gear segment is released from the units controlling arm, while the units gear segment is in its formost position the pull of the spring 27 depresses the units segment until its stop lug 490 engages with the units stop 222, this movement of the units gear segment causing the same to turn the units dial one space or number. During the subsequent backward movement of the rocking segments 15 and 29 the auxiliary gear segments are withdrawn rearwardly from the dial pinions. While in this rearwardly retracted position the units gear segment is raised by the bar 22 and when the same reaches the upper end of this movement the latch 502 is automatically turned over the units controlling arm by the spring 217 of this latch. This operation is repeated and the grand-total and sub-total units dials are turned one space at a time during every adding operation of the main registering mechanism. When the units dials make one complete rotation the companion grand-total cam 57 releases the units trip arm 54, thereby causing the same to disengage the latch 501 of the auxiliary tens gear segment from the tens controlling arm, whereby the tens gear segment is liberated and permitted to be pulled downward by its spring 27 during the subsequent forward movement of the rocking segments 15 and 29. The tens gear segment moves downwardly until its stop lug 490 engages the adjacent tens stop 222, during which movement the tens gear segment turns the tens dials one space. During the subsequent backward movement of the rocking frames 15 and 29 the tens gear segment is moved backwardly by the springs 11 out of engagement with its dial pinion and upwardly by the bar 22 while in its retracted position at the same time that the units gear segment is retracted and moved upwardly. At the end of the upward movement of the tens gear segment its latch 501 is again turned by its spring into engagement with the tens controlling arm. When the tens gear segment has turned the tens dials one rotation, the auxiliary hundreds gear segment is released by the carrying mechanism between the tens and hundreds registering mechanisms and the hundreds dials are shifted by their gear segment in the same manner as the tens dials.

At the beginning of the counting operation by the auxiliary registering mechanism the grand-total cams thereof engage with their highest parts against the feeling fingers of the feeling levers whereby the upper arms of the key levers are permitted to occupy their rearmost position with their locking shoulders 38 in engagement with the locking lug 33 of the controlling arms, thereby preventing these arms from being depressed by the pull of their spring 220 upon moving the rocking frames 15 and 29 forwardly. Upon counting the first number on the units dials the grand-total cam 57 thereof, while being shifted with said dials permits the units feeling lever to drop with its feeling finger 62 from the highest to the lowest part of the units grand-total cam, thereby causing the upper arm of the key lever to be moved forwardly by the feeling lever, so that the uppermost stop shoulder 39 of the key lever stands in the path of the stop lug of the units controlling arm. In this position of the parts, the units controlling arm is arrested after being moved downwardly one space by the pull of its spring 27 which is strained by the forward movement of the rocking frames 15 and 29. As the counting on the units dials progresses the units grand-total cam engages its successively higher parts with the feeling finger of the units feeling lever and moves the same rearwardly one space for each counting operation, and the springs 60 of the units key lever turns the upper arm of the latter backward intermittently in the same measure as the backward movement of the feeling lever permits the same. During every backward step of the upper arm of the units key lever the latter presents a successively lower stop shoulder 39 to the stop lug 34 of the units controlling arm, whereby the latter is permitted to be drawn down by its spring 220 one space farther during every counting operation, although its companion gear segment during this time never moves down more than one space by reason of its stop lug 490 engaging its stop 222, thereby causing its companion printing segment to be shifted to the proper position for printing the number corresponding to its grand-total dial. During the upward movement of the units gear segment its controlling arm is also moved upward to its highest position by the rod 22 engaging with the foot 219 of the controlling arm.

When the grand-total dial of each register except the highest has completed one rotation the highest part of its cam has turned the feeling lever backwardly to its fullest extent and the upper arm of the respective key lever is again engaged with its locking shoulder underneath the locking lug of the respective controlling arm. The loops 221 at the lower end of the lower controlling arm springs 220 are of such length as to permit its gear segment to descend in advance of the controlling arm and first turn the dials and grand-total cams one space and then the rod 25 engages with the lower end of the loops 221 and pulls the controlling arm downwardly, until each is arrested by the proper stop shoulder 39 on the upper arm of its key lever. By thus moving each lower gear segment down in advance of its controlling arm the respective grand-total cam upon turning from 9 to 0 permits the upper arm of the key lever to be shifted rearwardly and moved with its locking shoulder underneath the locking lug of its controlling arm before the latter can descend, thereby holding the controlling arm and the segment in the highest or zero position, if the dials while registering move to zero. When turning the grand-total dials of the auxiliary registering mechanism to zero, the latches 501 and 502 and stop lugs 490 of the auxiliary gear segments are moved downwardly in rear of the stops 222 and the trip finger 227, as the gear segments descend in their rearward position. The auxiliary segments while in their lowered position are now moved forwardly into engagement with their dial pinions. During the subsequent ascent of the gear segments in their forward position the stop lugs 490 and the latches 501 and 502 of the segments deflect the stops 222 and trip finger 227, so as to permit these lugs and latches to be moved above the said stops and fingers preparatory to beginning the next counting operation.

The co-operating sides of the lugs 490, latches 501, 502, stops 222 and finger 227 are slightly inclined, as shown in Figures 9 and 59, and are sufficiently elastic to permit these parts to pass each other. Instead of moving the gear segments and controlling arms downwardly by means of the springs 27, which connect these parts to the movable bar 25 or other actuating device, each gear segment and controlling arm connected therewith may be drawn downwardly constantly by a spring 2700 which connects the segment with a stationary bar 2701 of the main frame, as shown in Figure 65.

231 is an upright shifting lever, Fig. 9, whereby the operation of the printing mechanism of the auxiliary registering mechanism may be controlled. This lever is provided on its upper arm with a cross bar 232 which is arranged in rear of the hammer actuating pawls of the auxiliary printing segments and its lower arm is connected by a wire or cord 233 with a thumb piece 234 which is guided in an opening in the front part of the frame as shown in Figure 9. The lever 231 is turned by a spring 235 in the direction for moving its cross bar forwardly against the auxiliary hammer pawls, thereby holding the same out of engagement with the hammers 147 of the auxiliary printing segments and preventing the same from effecting recording on the impression surface. Upon pulling the thumb piece 234 forwardly, the lever is turned so as to move its cross bar rearwardly away from the auxiliary hammer pawls, thereby permitting the same to engage the hammers of the auxiliary printing segments for recording the numbers corresponding to the auxiliary registering mechanism. The shifting lever is held in its operative or inoperative position by two shoulders 236, 237 arranged one behind the other on the thumb piece and adapted to engage with the edge of the opening in which the thumb piece is guided.

By adjusting the auxiliary registering mechanism so as to count consecutively and throwing its printing mechanism into gear, numbers may be printed consecutively on the impression surface by simply rocking the handle 21 back and forth. While thus printing numbers consecutively, if none of the registering keys are depressed, the gear segments of the main registering mechanism are moved idly back and forth.

*Indicator or detector dials.*

In order to enable the operator to see which particular character or characters the machine is set for printing after depressing the keys and thereby detect any errors in the depression of the keys, each of the key levers is provided with an auxiliary dial indicator, or detector 238 which is turned forward the same number of spaces that the key lever has been depressed and then returns to its initial position when the key lever moves backward into its normal position. In the preferred construction of the detector dials shown in Figures 1, 2, 7 and 18, each of these dials consists preferably of a wheel 238 provided on one side with a pinion 239 which is engaged by a gear segment 240 secured to the adjacent key lever, as shown in Figures 2, 7 and 18. Upon depressing one of the number registering and recording keys, the detector dial thereof is turned forwardly by the connecting gearing the same number of spaces corresponding with the number of the key which has been depressed. If a key lever is not depressed its detector dial remains at zero. The detector dial of the word printing mechanism is in like manner turned by its key lever so as to indicate the word which corresponds to the word of the depressed key.

The detector dials of the several registering and recording devices are mounted loosely on a transverse supporting rod 241. In the modified construction of the detector dial shown in Figure 58, this dial is constructed in the form of a segment 242 which is connected by an arm 243 with a hub 244, and which is turned in one direction by gravity and in its opposite direction by a pin or lug 245 arranged on the adjacent key lever and engaging with an arm 246 on the hub 244. By means of these detector dials the operator can see which number and word is represented by the depressed keys, thereby enabling the same to be corrected if an error occurs before registering and printing the same.

*Date printing.*

For the purpose of permitting the date to be printed on the impression surface the following mechanism is provided:—

247 represents a year printing lever which is arranged toward the left of the auxiliary registering and numbering mechanism and which is mounted loosely upon the rod 12 which supports the hammers of the printing segments. The upper arm of the year lever is provided with a year type 248 representing the year to be printed, and this lever is turned for moving its type against the platen or the impression surface by means of a spring 205 secured to the lower arm thereof. The year printing lever is turned so that its type moves away from the platen and is then permitted to spring back quickly so as to produce an impression of its type on the impression surface by means of an operating mechanism which is constructed the same as the operating mechanism of the vertical ruling blade 204, shown in Figure 13, and the same reference letters are therefore used to denote like parts in these operating mechanisms.

249 represents three printing segments whereby the months and the days of the months may be printed and which are arranged in the order named on the left hand side of the year printing lever, as shown in Figures 1, 11, 20, and 22. Each of these segments is pivoted at its rear end on the same bar 31 which carries the outer printing segments and is provided with type carriers which are constructed the same as the type carriers of the other printing segments. The units dating segment, whereby the days of the month from 0 to 9 are printed is provided with ten correspondingly numbered type carriers. The tens dating segment which prints the days of the month above 9 in connection with the units dating segment is provided with three type carriers bearing the numbers 1, 2 and 3. The month printing segment is provided with twelve type carriers which are provided with type characters representing the different months of the year. Upon shifting the several type or printing segments of the dating mechanism, so as to carry the desired month and day of the month to the printing line the respective type may be driven against the impression surface for recording the date represented by the same. Each of the months and day printing segments is retained in its adjusted position by means of a catch 250 projecting upwardly from the segment and engaging with the notches of a curved bar 251 secured to the adjacent stationary part of the machine, as represented in Figures 1 and 11. The notches in each of these bars are spaced to correspond with the position of the type when the same are at the printing point, and each of these notches is marked according to the month or day of the month which it represents, as shown in Figure 1, for the purpose of enabling the operator to readily set the dating mechanism. Each of the dating segments is provided with a printing hammer which is constructed the same as the printing hammer of the other printing segments as shown in Figure 13. The printing hammer of each date printing segment is depressed by a pawl 252, shown in Figure 11, which, when free is moved rearward by a spring 253 so that its shoulder or hook engages with the lower shoulder 156 of the adjacent printing hammer and pulls the latter downwardly when the bar 151 is depressed. When the bar 151 is near the end of its downward movement, the pawl 252 is crowded with its hook from said lower shoulder by the upper shoulder 157 of the hammer engaging with the upper end of the pawl, thereby liberating the hammer and permitting the same to deliver a blow against the date type carrier which is at the printing line for producing an impression thereof. Inasmuch as the printing of the date is not required frequently, the pawls of the month, day and year printing mechanism are held in an inoperative position when it is not desired to print the date, by means of a rock lever 254, as shown in Figures 11, 12, 14 and 22. This rock lever is provided on its upper arm with a cross bar 255 which is arranged transversely in rear of the several pawls of the dating mechanism. The rock lever 254 is turned by a spring 256, so as to move its upper arm forwardly and cause its cross bar to engage with the rear side of the pawls 207 and 252 of the dating mechanism and shift them into an inoperative position out of engagement with the lever 247 and hammers 150 respectively. While the dating pawls are in this position, the same move up and down idly without operating the date printing mechanism, but the pawls of the other printing segments are free to operate.

257 represents a shifting key whereby the pawls of the dating mechanism are released and permitted to move into their operative position for printing the date. This key is provided with a depending stem which is guided in the top and bottom of the keyboard and which engages with its lower end against the upper arm of an elbow lever 258, as represented in Figure 14. The lower arm of this elbow lever is connected by a line or cord 259 with the lower arm of the lever 254. Upon depressing the shifting key 257 its respective elbow lever shifts the rock lever 254, so that the cross bar on its upper arm moves rearwardly from the dating pawls and permits the latter to assume an operative position.

*Platen mechanism.*

The mechanism whereby the platen is supported and operated and the sheet or other impression surface which receives the record is presented to the printing line, is constructed as follows:—

The frame of the carriage which supports the platen, paper and inking device consists of a transverse supporting sleeve 260 arranged in rear of the printing mechanism and provided at opposite ends with two upwardly and forwardly projecting arms 261 and with two upwardly and rearwardly projecting arms 262, as represented in Figures 1, 2, 14–16, 20, 21 and 22. The supporting sleeve is arranged to slide transversely on a rod or track 263 which is secured with its ends to the sides of the frame. The platen is journaled in the upper ends of the front arms 261 of the paper carriage and is held in position at the printing line by means of a catch 264 which engages with its front hooked end over a transverse rod 265 arranged below the platen and secured with its ends to the sides of the main frame, as represented in Figures 1, 2, 17 and 22. This catch is yieldingly connected with the paper carriage, so as to permit the platen to recede more or less from the printing mechanism for the purpose of adjusting the platen to the thickness of the sheet of paper or other object which receives the impression and which is interposed between the platen and the printing types. As shown in Figure 17, this yielding connection between the paper carriage and its retaining catch consists of a flat tension spring 266 which is secured with its lower end to the right hand front arm 261 of the paper carriage and the retaining catch 264 is pivoted to the upper end of this spring so as to turn in a vertical plane. The upper end of the tension spring 266 is provided with a thumb piece 267 and the adjacent end of the retaining catch is provided with a similar thumb or finger piece 268. The paper carriage is swung forwardly until its front arms 261 strike the cross bar 265. The retaining catch, while moving forwardly with the carriage rides with its inclined front end over the rod 265 and then engages with the front side of this bar, thereby holding the paper carriage in its operative position. If the article which receives the record is above normal thickness, the platen cannot be moved forwardly sufficiently to engage with the upper arms 261 with the cross bar 265. In order to hold the carriage in position while printing upon such an abnormally thick object, the upper end of the spring 266 is pressed forward by means of its finger piece 267 until the hook of the retaining catch engages with the cross bar 265. When it is desired to inspect the writing on the record sheet or object, the upper end of the paper carriage may be swung backwardly from the printing mechanism by first pressing the tension spring 266 forwardly to ease the strain on the catch 264 and then turning this catch by means of its finger piece out of engagement with the cross bar 265, thereby leaving the carriage free to move rearwardly. The catch 264 is yieldingly held in engagement with the cross bar 265 by a spring 269 which is secured at one end to the main tension spring 266 and bears with its opposite end against the rear end of the catch. When printing upon a sheet of paper this sheet is fed forwardly underneath the platen and upwardly in front of the same, so that the sheet passes the printing line. The sheet is pressed against the under side of the platen in rear of the printing line by a transverse presser roller 270 arranged below the platen and journaled with its ends in the front arms 261 of the paper carriage. When it is desired to print upon a roll or web of paper, this roll is supported in rear of the platen and fed with its web around the platen in the same manner in which a sheet is fed. As shown in Figures 2, 14 and 17, an upper roll of paper is supported upon a divided spool consisting of two sections 271 which support opposite ends of the roll. 272 represents a horizontal supporting spindle which extends through the center of the upper roll of paper and through the sections of its supporting spool and which is supported at its ends in openings formed in the rear arms 262 of the paper carriage. This spindle is held against displacement in the paper carriage by a catch 273 pivoted to one of said arms 262 and engaging with a notch or groove 274 formed in said spindle, as represented in Figures 15 and 16. The paper roll may be held against longitudinal displacement on the spindle by any suitable means, for instance by engaging one of its spool sections against one of the rear carriage arms and a clamping collar 275 secured to the spindle and bearing against the outer side of the other spool section, as represented in Figure 15. By moving the sections of the roll supporting spool toward and from each other on the spindle the spool can be adjusted to suit different widths of paper. When it is desired to print the record in duplicate, a duplicate roll or web of paper is fed simultaneously with the main sheet or web past the printing line. The duplicate roll or web of paper is preferably supported below the main roll on the sections 276 of a divided spool which is mounted on a spindle 277. This roll spindle is supported at its ends by means of hangers or hooks 278 which engage with the ends of the rear arms of the carriage, as shown in Figures 14, 15 and 17. The lower spool is held on its spindle by a collar 279 and the lower spindle is held in place on the hangers by a catch 280.

*Paper guides.*

281 represents two paper guides which engage against opposite sides of the webs or sheets between the rolls and the platen, as represented in Figures 1, 2, 14 and 17, and prevent lateral displacement of the same. Each of these guides is adjustably secured to the adjacent front arms of the paper carriage, preferably by means of a clamping screw 282 arranged on the adjacent carriage arm and engaging with a slot in the adjacent guide.

*Platen feed or line spacing.*

283 represents a platen feed lever which is pivoted loosely on the left end of the platen shaft and which is provided on its rearwardly projecting arm with a pawl 284 which engages with a ratchet wheel 285 secured to the adjacent end of the platen, as represented in Figures 1 and 14. 286 represents an intermediate actuating lever which is pivoted on the lower part of the front carriage arm 261 which is adjacent to the ratchet wheel 285. The ratchet lever is connected with the intermediate lever by means of a link 287 which is pivoted at its upper end to the rear arm of the ratchet lever and is provided at its lower end with a loop 288 which receives the rear arm of the intermediate lever. 289 represents a spring which connects the front arms of the ratchet lever and intermediate levers. The upper end of this spring is connected with the front arm of the ratchet lever a greater distance from the pivot of the latter than the distance between the connection of this spring with the intermediate lever and the pivot of the latter. By this connection of the spring 289, the leverage of the ratchet lever is greater than that of the intermediate lever which causes this spring, when both of these levers are free, to turn these levers simultaneously in the direction for raising their rear arms, thereby moving the ratchet pawl upwardly or backwardly for taking up a new tooth on the ratchet wheel. The ratchet pawl is yieldingly held in engagement with the ratchet teeth by means of a spring 290. The movement of the intermediate lever in the direction for raising its rear arm and moving the ratchet pawl backwardly is limited by means of a nose 291 formed on this lever and engaging with a stop on the adjacent arm of the carriage, as represented in Figure 14. The rocking motion of the intermediate lever is always the same, and in order to enable the same to turn the platen different distances, the rear arm of the intermediate lever is provided on its under side with a number of notches 292 which are arranged different distances from its fulcrum and one or another of which is engaged by the lower end of the loop 288 on the connecting link 287. Upon engaging this loop with the notch of the intermediate lever nearest its axis the ratchet pawl is shifted so that the platen is turned one line-space at a time, while upon shifting this loop into engagement with one of the outer notches of the intermediate lever, the platen will be turned forward by its ratchet mechanism a correspondingly greater distance by the operation of the machine. The intermediate lever is turned in the direction for shifting the platen by a transverse bar 293 arranged below the front arm thereof, as represented in Figures 1, 2, 7, 14 and 22. This bar is supported upon the upper ends of two rock arms 294 which are mounted loosely with their lower ends on the cross bar 167. 295 represents a depending arm which is preferably formed in one piece with that one of the arms 294 arranged on the left hand side of the machine. This depending arm is provided with a nose which is arranged in rear of and in the path of the rocking frame 29. During the last portion of the rearward movement of this rocking frame it engages with the nose of the depending arm 295 and moves the same rearwardly, and the upper arms 294 connected therewith are moved forwardly, thereby causing the cross bar 293 to be carried upwardly and turn the intermediate lever in the direction for feeding the platen and paper forwardly. During the forward movement of the rocking frame 29 the rock arms 294 are turned backwardly together with the intermediate lever and connecting parts by the spring 289 preparatory to feeding the platen forward the next space. As the line-spacing of the record sheet by feeding the platen, occurs after each item is printed and in the same operation in which said item is printed, the printed record is fed up into visible position at each operation of the machine. If desired the platen may be turned by hand when it is desired to adjust the paper, this being effected by releasing the pawl 284 from the ratchet wheel and then turning the platen by means of a button 296 secured to one end of the shaft, as shown in Figures 1, 20 and 22. The cross bar 293 extends a sufficient distance transversely of the machine so as to engage with the front arm of the intermediate rock lever 286 in all the positions which the paper carriage can be shifted transversely in the machine.

*Non-print renders paper feed inoperative.*

In order to render the paper feeding mechanism inoperative during the time that the printing mechanism is out of gear, the operating mechanism of the printing paper feeding mechanisms are so connected that the printing and paper feeding mechanisms are thrown into and out of gear simultaneously. A simple means for this purpose consists of a link 297 connected at its front end with a depending arm 298 on the rock shaft 172 and provided at its rear end with a slot 299 which receives a pin 300 on the depending arm 295, as represented in Figures 14 and 22. Upon turning the rock shaft 172 by means of the key 176 in the direction for engaging its upper arm 171 with the hook 168 and disengaging the latter from the bar 169, the link 297 is moved rearwardly so that the front end of its slot engages with the pin of the depending arm 295 and holds the latter in its rearmost position. While the depending rock arm is so held it cannot move forwardly with the rocking frame 29 and consequently the ratchet pawl of the paper feed mechanism does not move backwardly for taking up a new tooth on the ratchet wheel. Upon releasing the key 176 the rock shaft 172 turns in the direction for coupling the printing mechanism with the rocking segments, the link 297 is moved forwardly and the front end of its slot is carried forwardly a sufficient distance to permit the rock arm 295 to oscillate freely for actuating the paper feeding mechanism.

*Horizontally movable carriage.*

The paper carriage is capable of sliding lengthwise on the rods 263 and 265 for presenting different parts of the paper to any particular type and is held in its adjusted position by a spacing device which consists of a graduated adjusting sleeve 301 and an adjusting catch 302, as represented in Figures 2 and 21. The adjusting sleeve is revolubly mounted on the supporting sleeve 260 between the carriage frame arms 261 and is provided with two or more longitudinal series of stop notches or graduations 303, 304. The notches in each series may be equidistant and the notches in one series are spaced different from the notches in the other series, as shown in Figure 21. The catch 302 is pivoted on the rod 167 and is yieldingly held in engagement with any one of the notches in the adjusting sleeve 301 by a spring 305. When it is desired to shift the carriage intermittently short distances lengthwise of the platen for writing narrow columns, the adjusting sleeve is turned so as to present its closely spaced notches to the catch, and the latter is shifted from one of these notches to another as the writing progresses. When wider columns are to be written the adjusting sleeve is turned so as to present correspondingly wider spaced notches to the catch. As shown in the drawings only two series of adjusting notches are provided on the adjusting sleeve, but more series of notches may be provided if necessary.

If desired sheet paper may be substituted for web paper to receive the record without changing the parts of the machine, but the devices for holding the rolls of web paper may be removed from the machine when writing upon sheet paper.

*Inking means.*

306, 307 represent two inking ribbons whereby the impression of the types at the printing line is produced simultaneously on the two sheets or webs of paper. The front or outer ribbon 306 is arranged in front of the outer or lower sheet, and the rear or inner ribbon 307 is arranged between the front and rear sheets at the printing line, as represented in Figures 1, 2, 14 and 20. Each of these ink ribbons is wound with its opposite ends upon spools 308 and upon turning one of these spools in one direction, the ribbon will be wound thereon and unwound from the other spool and vice versa. The two spools on the same side of the machine are preferably arranged side by side and are journaled in bearings on the adjacent portion of the main frame, so that the spools of the front ribbon are arranged adjacent to the inner sides of the spools of the rear or inner ribbon. Each of the ink ribbon spools is provided on the front end of its shaft with a ratchet wheel 309, the ratchet wheels of the outer spools being arranged slightly forward of the ratchet wheels of the inner spools. 310 represents two ratchet levers whereby the ink ribbons are intermittently shifted lengthwise of the platen or transversely of the sheet. One of these levers is provided for each pair of spools and is provided at opposite ends with upwardly projecting hooks 311 which are adapted to engage with the ratchet wheels of its respective spools. 312 represents a transversely reciprocating bar which is guided with its ends in the side portions of the frame and which supports and operates the ribbon operating ratchet levers. The ribbon ratchet levers are arranged on opposite sides of the reciprocating bar 312 and the latter is provided on its central portion with a pin 313 which engages at its front end with a slot 314 in the central portion of the front ratchet lever and engages at its rear end with a similar slot 314 in the central portion of the rear ratchet lever, as represented in Figures 1, 2, 20 and 54. Each of the slots 314 consists of two branches which are united at their lower ends and diverge upwardly in the form of the letter V. 315 represents springs whereby the ribbon shifting ratchet levers are yieldingly held in their operative position. Each of these springs is secured at its upper end to one of the shifting levers adjacent to the junction of its slot branches and with its other end to the adjacent part of the reciprocating bar. The tension of each of the springs 315 serves to draw the central part of its ribbon shifting lever downwardly so that the upper end of one of its slot branches engages with the pivot pin 313 of the same. As shown in Figures 1, 20 and 54, the left branch of the V-shaped slot of the front ribbon shifting lever engages with its upper end against the pivot pin 313 and the connection between the spring 315 and this lever is now arranged on the right hand side of the pivot pin, which causes the right arm of this lever to be swung downwardly with its hook out of engagement with the opposing ratchet wheel, while its left arm is raised and its hook is yieldingly held in engagement with the adjacent ribbon ratchet wheel. Upon reciprocating the bar 312 by the spring 316, lever 317 and connecting mechanism hereinafter described when the parts are in this position, the left arm of the front ribbon shifting lever is moved idly toward the left and its hook takes up a new tooth on the adjacent ratchet wheel and during the subsequent movement of the lever with the bar 312 toward the right, this hook turns the ratchet wheel and the spool connected therewith in the direction for winding the ribbon thereon. This operation of the front shifting lever is repeated during every reciprocating movement of the bar 312 thereby feeding the ribbon intermittently from the right hand spool to the left hand spool. When the front ribbon has been wholly unwound from the right hand spool, the further movement of the ribbon toward the left is prevented by reason of the ribbon being connected with this spool. Upon moving the bar 312 toward the right while the right hand end of the ribbon is thus held, the ribbon shifting lever is prevented from moving toward the right with the bar by reason of the hook of its left arm being in engagement with the ratchet wheel of the left hand ribbon spool. When the ribbon shifting lever is thus arrested, the bar 312 moves toward the right independent of the lever and during this movement, the pivot pin 313 moves to the inner end of the left branch of the V slot and then outwardly in the right branch to the outer end thereof. By thus shifting the pivot pin 313 of the bar in the slot of the lever the connection between this lever and the spring 315 is carried toward the left side of the pivot pin, so that the relative position of the shifting lever and spring is reversed, as represented by dotted lines 310ª, 315ª, in Figure 54.

When this lever is so reversed its right arm is turned with its hook into engagement with the ratchet wheel of the adjacent ribbon spool and the left arm thereof is moved with its hook out of engagement from the ratchet wheel of the adjacent ribbon spool, whereby the movement of the ribbon is automatically reversed and the ribbon is caused to wind upon the right hand spool and to unwind from the left hand spool. The ribbon continues to move toward the right until wholly unwound from the left hand spool to which it is connected when the pivot pin 313 of the ribbon shifting lever is shifted back to the upper end of the left branch of the V slot and the movement of the ribbon is again reversed in the same manner as before described.

The front and rear shifting ribbon ratchet levers are reversed independently of each other and can feed their respective ribbons in opposite directions although they are both operated from the reciprocating bar. The latter is moved lengthwise in one direction preferably toward the right by a spring 316, as shown in Figures 1 and 20. The ribbon shifting bar 312 is moved in the opposite direction by an elbow lever 317 which engages with its upper end against a lug or shoulder on the bar. 318 represents a rock arm which is secured to the rock lever 294, 295 of the paper feed mechanism and which engages with the lower arm of the elbow lever 317, as shown in Figures 1, 14 and 20. When the rock lever 294, 295 turns in the direction for feeding the paper forward, the arm 318 turns the elbow lever 317 and moves the ribbon shifting bar 312 toward the left, and when the rock lever 294, 295 turns in the opposite direction, the spring 316 moves the bar 312 toward the right. When it is desired to print only one sheet or web of paper one of the ink ribbons may be removed, though not necessarily, as a single impression of the types may be made through both ribbons.

*Full stroke mechanism.*

In order to prevent the operator from making only a partial forward and backward stroke of the rocking frames 15 and 29, and thereby prevent erroneous registration, the following mechanism is provided:—

319 represents two detent pawls which are arranged over the rocking frames 15 and 29, respectively, and pivoted on a transverse rod 320, as represented in Figures 2, 7, 14 and 20. Each of these pawls is provided on its underside with two downwardly diverging detents 321 which are arranged substantially at right angles to each other and on its upper side with a V-shaped ridge 322. Upon turning the detent pawl in one direction its front detent engages with the upper concentric edge or face of the adjacent rocking frame, while upon turning the pawl in the opposite direction its rear detent engages with said edge. Each of the detent pawls is yieldingly held with either of its detents in engagement with the respective rocking frame by a presser arm 323 pivoted loosely on the transverse shaft 9 and provided at its rear end with a roller or projection which is held in engagement with the ridge of the adjacent pawl by a spring 324 connected with the pawl and bearing against the underside of the rod 320. The concentric face or edge of each rocking frame is provided with a segmental series of notches 325 and undercut inclines 326 converging upwardly from the outer sides of the front and rear notches in the said concentric edge, as represented in Figures 2, 7, 9 and 14. In the rearmost positions of the rocking frames 15 and 29, the front detents of the detent pawls engage with the front inclines 326 of the rocking frames and turn the pawls so that their front detents are depressed into engagement with the foremost notches of the frames, while their rear detents are raised, as shown in Figure 2. The pawls are yieldingly held in this position during the forward movement of the frames by the presser arms 322 bearing against the inclined rear sides of the ridges on the pawls.

As the rocking frames move forward the front detents of the detent pawls engage with one pair of notches after another of the frames 15, 29 and at the end of the forward movement of the frames the rear inclines 326 thereof engage with the rear detents of the pawls and turn the same so that the front detents are raised and the rear detents are depressed into engagement with the rearmost notches 325 of the rocking frames. When the pawls are thus reversed by the rear inclines of the rocking frames, the ridge of each pawl is moved with its highest part in rear of the roller of the presser arm, which causes this arm to now hold the pawl in this position during the subsequent backward movement of its frame. As the rocking frames move backwardly, the rear detents of the detent pawls engage successively with the notches of the rocking frames and when the latter reach the end of their backward movement, the front inclines 326 thereof engage with the front detents of the detent pawls and depress the same into engagement with the foremost notches of the frames and lift their rear detents into an inoperative position, as shown in Figure 2. If the operator has moved the rocking frames forwardly more or less, so that one of the intermediate notches in each frame stands in front of its detent pawl and then attempts to move the rocking frames backwardly, before completing the forward movement of the frames, the front detents of the pawls will engage with the intermediate notches immediately in front of the detent pawls and hold the frames against backward movement. After the rocking frames have completed their forward movement and the pawls have been reversed, each frame is in like manner held against forward movement after the same has been moved backward sufficiently to carry one of its intermediate notches in rear of the rear detent of its detent pawl. By this means the operator is compelled to complete a stroke of the rocking frames in one direction before reversing the movement of the frames, thereby avoiding displacement of the registering and recording mechanism.

*Keyboard mechanism.*

The keys which have been depressed in the operation of adding or recording a number, word or other character are automatically locked in a depressed position until the adding or recording operation of the particular number, word or other character has been completed, and then the depressed keys are automatically released and permitted to be raised by their springs. As shown in Figures 2, 7, 9, 14, 26–29 and 46–48, the keys are held in a depressed position by a number of locking plates 327, one of which is arranged lengthwise on the left side of the stems of each row of keys. Each of the locking plates is pivoted at its lower end to the top of the keyboard bottom, so as to swing transversely and is provided along its upper edge with a number of downwardly facing catches or shoulders 328 which are adapted to engage with upwardly facing locking shoulders 329 on the stems of the keys. Each of the keys is provided with a convex face below its locking shoulder, consisting of a lower rising portion 330 which inclines upwardly and laterally from the lower part of the key toward the adjacent locking plate, and an upper receding portion 331 which inclines from the upper end of the rising portion to the outer end of the locking shoulder 329 of the stem, as shown in Figures 27, 28 and 48. Each locking plate is drawn yieldingly with its catches against the stems of the adjacent rows of keys by a spring 332, as shown in Figures 28 and 47. The locking catches of the locking plates bear against the key stems below the convex faces thereof when the keys are in an elevated position, as shown in Figure 26. Upon depressing a key the convex face on its stem deflects the locking plate and when the key has been depressed fully the respective locking catch of the locking plate engages with the locking shoulder 329 of the stem of the depressed key, thereby retaining the parts which are operated by said key in a shifted position. If a wrong key has been depressed and the operator subsequently depresses the right key the latter during the first part of its downward movement engages the lower or rising part 330 of its convex face with the adjacent locking catch of the locking plate and disengages the respective locking catch from the locking shoulder of the previously depressed key, thereby releasing the same, as represented in Figures 46 and 48. Upon continuing the depression of the second or correct key after the first or wrong key has been released, the receding or upper part 331 of the convex face of the correct key engages with the adjacent locking catch of the locking plate, thereby permitting the latter to approach the key stem and when the correct key has been fully depressed its locking shoulder is carried below the locking catch of the plate and is engaged thereby, whereby the correct key is locked in a depressed position, as represented in Figure 29. By this means any incorrectly depressed key is automatically released by the depression of the correct key and the latter is in turn automatically locked in a depressed position.

*Automatic key release.*

333 represents a transversely movable releasing bar, whereby the keys of the main numbering registering devices are released. This bar is arranged transversely in rear of the rear ends of the locking plates of the main number keys and is guided with its ends in the frame of the machine, as shown in Figures 26 and 30. This bar is provided with a number of upwardly projecting releasing lugs or shoulders 334, one of which is adapted to engage with the right side of a pin or projection 335 on the rear end of each locking plate of the main registering keys, as represented in Figures 7 and 26. Upon shifting the releasing bar 333 toward the left its releasing lugs move the main locking plates in the same direction thereby releasing any number keys which are held in a depressed position by the same.

The main releasing bar 333 when free is shifted toward the right into its retracted position by resilience of the springs which hold the main locking plates in their operative position. The releasing bar 333 is shifted into its operative position by a releasing elbow lever 336 which turns on a pivot pin 337 and is connected with its upwardly projecting arm with the releasing bar 333 while its lower arm projects horizontally outward. 338 represents a releasing arm which is arranged lengthwise in the machine and transversely over the lower arm of the releasing elbow lever 336 and which is pivoted at its front end on a pin 339, as represented in Figures 14, 26 and 27. 340 represents a longitudinal releasing lever connected by an upright cord 341 with the rear end of the releasing arm 338 and projecting with its rear end into the path of the cross bar 25, as represented in Figure 14. The main number keys are held in their depressed position until the rocking frames 15 and 29 have been moved forwardly sufficiently to operate the registering and recording mechanisms in accordance with the numbers of the depressed main keys and then the cross bar 25, during the last part of its forward movement with the rocking frames 15 and 29 engages with the releasing lever 340 and depresses the same. The releasing arm 338, during its downward movement with the releasing lever 340 engages with the lower arm of the elbow lever 336 and turns the latter so that its upper arm moves the main releasing bar 333 toward the left and moves the main locking plates out of engagement with the main number keys, thereby releasing the depressed main keys and permitting them to rise preparatory to setting the machine for registering and recording the next number.

The row of word keys 216 is arranged on the left hand side of the main keys and the keys 401 of the auxiliary adding mechanism are arranged on the left hand side of the word keys. Each row of word and auxiliary number keys is provided with a locking mechanism similar to those of the rows of main keys.

The several shifting keys are arranged in a longitudinal row or column on the left side of the auxiliary keys, and the elbow levers operated thereby are arranged one behind the other, as represented in Figures 14, 26 and 27.

342 represents an auxiliary releasing bar whereby the locking plates of the auxiliary keys are released. This bar is arranged transversely of the machine, in front of and parallel with the main releasing bar 333 and is adjustably connected therewith, so that the auxiliary releasing bar can be moved into an operative or inoperative position on the main releasing bar. As shown in Figure 26, the auxiliary releasing bar is pivoted at its inner end to the main key-releasing bar by a horizontal pivot; and its outer end projects through an opening 343 in the frame, as shown in Figure 30, which permits this bar to be manipulated by the operator from the outside of the frame. The auxiliary releasing bar is held in its raised or lowered position by means of two notches or recesses 344, 345 formed one above the other in this bar and each of which is adapted to be engaged with a pin or projection 346 on the main releasing bar, as shown in Figures 26 and 30, by the resilience of the auxiliary releasing bar which is sufficiently elastic for this purpose. Upon raising the auxiliary releasing bar and engaging its lower recess with the pin 346, the releasing lugs 347 of this bar are carried in front of the right side of the pins on the rear ends of the locking plates of the auxiliary keys, so that upon removing the main releasing bar toward the left for releasing the main keys, the auxiliary releasing bar is simultaneously moved in the same direction and disengages the locking plates from the auxiliary keys. When it is desired to register or record an arithmetical progression of a number, the auxiliary releasing bar is depressed, so that its lugs 347 are below the pins of the locking plates of the auxiliary keys, this bar being held in this position by engaging its upper recess 344 with the pin 346. Upon now depressing the auxiliary keys of the desired number and then operating the registering and recording mechanism the number represented by the depressed keys will be registered and recorded, but these keys will not be released. While the depressed keys are thus held in a depressed position, the registering and recording mechanism can be repeatedly operated, during each of which operations the number represented by the depressed key is added over and over again, thereby registering and recording the arithmetical progression of this number. The two columns or rows of word and shifting keys are each provided with a locking mechanism similar to the main and auxiliary keys, but the locking plates of these keys are disengaged from the stems by a separate releasing mechanism so as to permit the main and auxiliary number keys to be released without releasing the word and shifting keys. As shown in Figures 26 and 27, the release of the word and shifting keys is effected by a supplemental releasing bar 348 having lugs 349 which engage with the pins 335 on the rear end of the locking plates of the word and shifting keys and which is guided at its outer end in the frame. The inner end of the supplemental releasing bar is pivoted to the upper arm of a releasing elbow lever 350. This lever is pivoted on the pin 337 and its lower arm projects toward the right and underneath the releasing arm 338 adjacent to the rear side of the lower arm of the releasing elbow lever 336. When both lower arms of the releasing elbow levers 336 and 350 are arranged underneath the releasing arm 338 the depression of the latter by the rocking frames causes the supplemental releasing bar to be moved toward the left so that its lugs disengage the locking plates of the word and shifting keys from their respective stems at the same time that the main and auxiliary releasing bars disengage the locking plates of the main and auxiliary number keys from their respective stems, thereby releasing all of the keys simultaneously after the registering and recording of the words and numbers has been effected.

*Repeat key.*

For the purpose of permitting all the words and numbers represented by the depressed keys to be added and recorded repeatedly the releasing elbow levers 336, 350 are shifted toward the right and their lower arms are moved from underneath the releasing arm 338 so that the depression of the lever 340 by the rocking frames will not affect the releasing elbow levers 336, 350, thereby retaining the keys in their shifted position and permitting of producing repeated additions and impressions of the types which correspond to the depressed keys. The releasing elbow levers 336, 350 are moved into an operative or inoperative position by means of a supporting elbow lever 351, as shown in Figures 14, 26 and 27. This lever is pivoted on a stationary bracket 352 and its upper arm carries the pin 337 on which the releasing elbow levers 336, 350 are pivoted. 353 represents an actuating rock lever which engages with its rear arm against the underside of the lower arm of the supporting elbow lever 351. 354 represents a repeating shifting key having a depending stem which is guided in the top and bottom of the key-board and which engages with its lower end against the front arm of the actuating rock lever 353. Upon depressing the repeating key, the supporting elbow lever 351 is turned by the actuating lever in the direction for moving the releasing elbow levers 336, 350, so that their lower arms clear the releasing arm 338 and will not be affected by the depression of the latter. Upon releasing the repeating key the supporting elbow lever 353 is returned to its normal position by a spring 355, shown in Figures 14 and 26, and the releasing elbow levers 336, 350 are shifted into an operative position with their lower arms projecting underneath the releasing arm 338. The releasing elbow lever 350 is turned in the direction for moving the supplemental releasing bar 348 into its retracted position by a spring 356 which is secured to the supporting elbow lever 351. The movement of the elbow lever 350 in this direction is limited by a stop 357 on the supporting elbow lever 351, as shown in Figures 26 and 27.

When it is desired to record either the grand-total or the sub-total of the added numbers or when it is desired to return the grand-total or sub-total dials to zero, the number keys must all be released in order to permit the key levers to assume a position corresponding to the grand-total or sub-total dials preparatory to recording the totals registered by the same. This is effected by an intermediate elbow lever 358 which is pivoted on the pin 339 and which projects rearwardly over the lower arm of the releasing elbow lever 336 but does not project over the lower arm of the releasing elbow lever 350, as shown in Figures 26 and 27. 359 represents a longitudinal connecting bar connected at its rear end to the lower arm of the intermediate elbow lever 358 and provided with longitudinal slots 360 which receive pins or projections 361 on the lower arms of the elbow levers 118, 177, 80 and 85 and which are operated by the grand-total and sub-total printing keys 84, 181 and the grand-total and sub-total zero keys 87, 120, as represented in Figure 14. The pins 361 of the total and zero elbow levers engage normally with the front ends of their respective slots in the connecting bar 359 which causes the latter to be shifted forward by any one of the respective keys without disturbing the others. Upon moving the connecting bar 359 forwardly by the depression of any one of the total or zero keys, the intermediate elbow lever 358 is turned in the direction for depressing its upper arm into engagement with the lower arm of the releasing elbow lever 336, thereby releasing all of the number keys. The depressed word keys and the shifting keys remain depressed until the rocking frames 15 and 29 have completed their forward movement and the registering and recording of the totals have been effected. The locking mechanism of the shifting keys is so constructed that the grand-total zero key 87 cannot be held down by the adjacent locking plate, as shown in Figure 14, because the depression of the same is necessary only during the backward movement of the rocking frames.

*Special key-lock.*

For the purpose of locking the consecutive numbering key 230, non-printing key 176 or repeating key 354 in a depressed position when it is desired to continue the use of these keys and the mechanism controlled thereby indefinitely each of these keys is provided with a movable locking block 362. Each of these blocks is arranged below the top of the key-board adjacent to its respective shifting key and is provided with a thumb piece 363 which is guided in a slot 364 in the top of the key-board and projects above the same. Upon retracting the locking block from above the stop shoulder of the shifting key, as shown in Figure 28, the key can rise to its uppermost position. Upon depressing this key and then shifting the locking block so that it is arranged between the stop shoulder 44 of the key and the top of the keyboard, as shown in Figure 29 the key is held in a depressed position.

*Key interlocking mechanism.*

In order to produce a correct register and record of the numbers and words, each column of number and word keys is provided with a locking mechanism which prevents more than one key in each of these columns from being held in a depressed position at the same time. This locking mechanism is best shown in Figures 26, 28, 45, 46 and 52 and is constructed as follows:—

365 represents a number of tumblers or blocks arranged in longitudinal row on the bottom of the key-board, each row being adjacent to the right side of the stems of a respective row of number or word keys. These tumblers are capable of a longitudinal movement with reference to the column of keys and each set of tumblers is guided on a rod 366 which is supported on the key-board bottom. Each of the tumblers is provided with a convex upper side which preferably slopes or inclines from its highest central part toward the front and rear sides of the tumbler in the form of an inverted letter V. The longitudinal movement of the tumblers is limited by front and rear stops 367, 368 which are engaged by the front and rear tumblers and which also serve to support the guide rod 366 on the bottom 42, as shown in Figure 45. The stem of each number and work key is provided on the side opposite to its locking plate 327 with a follower or spreading head 369. The heads of the intermediate keys have a convex underside which preferably inclines from its lowest central part to the front and rear sides of the head in the form of the letter V. Each of the spreading heads, except the foremost and rearmost is arranged over the space between two tumblers. The heads of the foremost and rearmost keys are arranged in front and in rear of the foremost and rearmost tumblers and these heads are inclined only on the side facing the adjacent tumbler, as shown in Figure 45. Upon depressing a key in any one of the columns of number or word keys, the spreading head of this key engages with the tumblers on opposite sides thereof and crowds the tumblers in front of the head forwardly and those in rear of the head rearwardly. When the shifting head has been depressed to its fullest extent, the foremost tumbler bears against the front stop 367 and the rearmost tumbler bears against the rear stop 368 and the slack between the several tumblers is fully taken up. In Figure 45, key number 5 is shown depressed fully and the slack between the tumblers is taken up, in which position of the key its shoulder 329 is engaged by the catch of the adjacent locking plate and is prevented from rising. If key number 5 was depressed erroneously and the correct key, for instance number 3 is subsequently depressed, this correct key moves downwardly idly until it engages or nearly engages the adjacent tumbler and when the correct key reaches this position its releasing cam or convex face engages with the adjacent locking plate and shifts the same out of engagement from the locking shoulder 329 of the depressed key number 5, as shown in Figure 46, thereby releasing this key and permitting the same to rise. During the continued downward movement of the correct key number 3, the spreading head of the same moves downwardly between the adjacent tumblers and shifts the same so as to take up the slack between them. When the correct key reaches the end of its downward movement the same is locked in this position by the adjacent locking plate in the same manner in which key number 5 was previously locked. The slack between the several tumblers is only sufficient to permit of the full depression of one key at a time and the tumblers are so constructed that when two keys are depressed simultaneously these keys are arrested in their downward movement before their locking shoulders are engaged by the locking plate. By this means any one key in a column may be depressed and locked in its depressed position and if an incorrect key has been depressed, the same is released by the subsequent depression of the correct key and the correct key is in turn locked in a depressed position, but the locking of two keys at the same time in a depressed position is prevented.

It is some times desirable to depress several of the shifting keys simultaneously and lock the same in a depressed position. In the machine as organized no more than three shifting keys require to be depressed and locked at the same time. In order to prevent more than three shifting keys from being locked in a depressed position at the same time, the following mechanism is provided:—

370 represents a number of tumblers which are arranged in a longitudinal row below the stems of the shifting keys and each of which is secured to the lower end of a flat spring 371 depending from the underside of a supporting bar 372. Each of these tumblers has the form of an upwardly tapering wedge, as shown in Figure 47, and is capable of swinging lengthwise of the column of shifting keys but is held against transverse movement by arranging the depending springs so that their flat sides extend transversely. 373, 374 represent front and rear stops arranged in front and in rear of the foremost and rearmost tumblers 370. 375 represents a number of followers or spreading heads one of which is secured by a flat spring 376 to the lower end of the stem of each shifting key. Each of these heads is preferably cylindrical in form and is capable of swinging lengthwise of the column of shifting keys, but is held against lateral movement owing to the transverse arrangement of the flat supporting spring. Upon depressing any one of the shifting keys its head moves downwardly between the adjacent tumblers and shifts the same forwardly and backwardly from opposite sides of the spreading head. The front and rear stops 373, 374 are so arranged that the slack between the several tumblers is sufficient to allow of full depression of three shifting keys. As shown in Figure 47, the sub-total printing, numbering and dating keys are depressed fully and their followers or spreading heads have been moved between the adjacent tumblers so that the several tumblers bear against each other and against the depressed followers or heads and against the front and rear stops 373, 374, thereby taking up all of the slack between the tumblers. In order to lock these three keys in a depressed position the same must be depressed simultaneously. If an additional key, for instance the non-printing key 176, is depressed, as shown in Figures 47 and 48, this fourth key is free to move downwardly without disturbing the previously depressed keys until its follower or head engages or nearly engages with the adjacent tumblers and when this fourth key reaches this position its releasing cam engages with the adjacent locking plate 327 and deflects the same, as shown in Figure 48, thereby disengaging the plate from all of the previously depressed keys and causing the same to rise simultaneously. It will thus be seen that by this means three keys can be locked in a depressed position and if an error has been made in the depression of one or more of the keys the subsequent depression of the correct key or group of three keys permits the release of the previously depressed incorrect keys and the locking of the correct keys in a depressed position. If it is desired to permit of locking more or less than three shifting keys in a depressed position, the slack space between the several tumblers must be adjusted accordingly. Instead of supporting the tumblers of the shifting keys from the top, as shown in Figures 47 and 48, the same may be supported by flat springs 377 from the bottom, as shown in Figure 49. If desired the tumblers and followers of the shifting keys may have the form of spheres, as shown at 378, 379, in Figure 49.

In order to permit the key levers to be readily removed from and inserted in the machine for adjusting the same while assembling the machine, the means for fastening the key levers in the machine are constructed as follows:—

380 represents a number of spacing sleeves which are mounted on the supporting rod 35 and which separate the several key levers, grand trip arms, sub-total retarding arms, tension arms, feeling levers and pawl arms mounted on said rod from each other and from the main frame, as shown in Figures 18 and 41. The trip arms, retarding arms, tension arms, feeling levers and pawl arms are permanently mounted on the rod 35, and cannot be removed from the rod except by removing the screws 381 which secure the ends of the rod to the frame. Each of the key levers is provided with a pivot opening 382 which is larger in diameter than the diameter of the supporting rod 35, and a lateral passage or slot 383 which extends from the pivot opening to the outer side of the lever and which is of less width than the diameter of the pivot opening, but greater than the diameter of the supporting rod 35, as shown in Figures 42 and 44. 384 represents a spacing sleeve mounted on the rod 35 on one side of the key lever and provided with a concentric bushing 385 which fits into the pivot opening of the key lever. When the parts are assembled the several sleeves, levers and arms bear against one another and the key levers are thereby held on the bushings and compelled to turn thereon concentrically with the supporting rod, but are prevented from becoming detached by reason of the slots in the key levers being narrower than the diameter of the pivot opening and bushing. One of the spacing sleeves, preferably the outermost spacing sleeve 386, arranged between one of the pawl arms 105 and the adjacent side of the frame is provided with a lateral slot 387 extending its full length, as represented in Figures 41 and 43, which permits this sleeve to be readily placed upon or removed from the supporting rod. When all of the arms and levers have been placed in position, the slotted spacing sleeve 386 is placed on the rod 35 between the pawl arm and frame, thereby taking up all the slack between the several levers, arms and sleeves on the supporting rod and holding them in place. When it is desired to remove any one of the key levers, the slotted spacing sleeve 386 is first removed and then the other spacing sleeves, arms and levers are shifted on the rod sufficiently to permit the bushing to be withdrawn from the pivot opening of the key lever which it is desired to remove. When the bushing is thus removed its key lever can be moved with its slot over the supporting rod and detached therefrom. After the desired fitting of the key lever has been effected the same is first passed with its slot over the supporting rod, the bushing is then inserted in the pivot opening of the key lever and then the sleeves, arms and levers are shoved together and the slotted sleeve 386 is placed on the rod. The sleeve 386 is preferably held in place by a screw 388 passing through the frame.

Keys of different aspect.

In order to enable the operator to distinguish the figures or numbers readily on the key-board and thereby enable the same to be manipulated more rapidly the columns of main figure or number keys are arranged in groups and each group is distinguished by color, or otherwise from the adjacent groups. As shown in Figure 1, the keys in the first three columns representing figures to the right of the decimal point or less than a whole number are indicated in black on a white background, the second three columns of figures from the left of the decimal point to the first pointing off place representing the whole numbers less than thousands are indicated in white on a black background, and the third three columns of figures from the first pointing off place to the second pointing off place representing the whole numbers between hundreds and millions are indicated in black on a white background, The words and characters on the word keys and shifting keys are also indicated in white on a black background and to distinguish them readily from the intermediate auxiliary number keys which are indicated in black on a white background.

Operation.

Assuming that the item "Dec. 14, 1899, 28 Rebate 34061.97 5/8" is to be registered and recorded on a bill the operation, briefly stated, is as follows:—

The operator first adjusts the date printing segments into the proper position by means of the catches 250 and then depresses the dating key 257. All the other shifting keys are released and permitted to rise whereby all of the devices controlled by these keys are thrown out of gear excepting the recording mechanism which is thrown into gear by the rising of its shifting key 176.

The slide 223 is then shifted toward the left into its inoperative position so as to permit the auxiliary registering and recording mechanism to add numbers after which the keys 2 and 8 in the tens and units columns of the auxiliary keys are depressed. The word key representing "Rebate" in the column of word keys is next depressed and then the main keys representing the numbers 34061.97 and the fraction 5/8 are depressed in their proper columns. The depression of these keys causes the key levers to be shifted so as to move the proper differential stops into the path of the controlling arms and the detector dials 238 are turned so as to indicate the numbers or characters of the keys which have been depressed, thereby enabling the operator to correct any error if a wrong key has been depressed before registering and recording the item. If the item appears correctly on the detector dials the operator moves the handle 21 forwardly and backwardly once. During the first part of the forward movement of the handle, the main gear segments are moved forwardly into engagement with the dial pinions. During the next part of the forward movement of the handle the main gear segments which correspond with the depressed keys are moved downwardly a distance corresponding with the numbers or characters of the depressed keys at which point the key levers arrest the main gear segments through the medium of the controlling arms. While the main gear segments are effecting their registering movement, the hammers of the recording mechanism are retracted as represented in Figure 7. After the gear segments have completed their downward or registering movement the hammers are released and produce an impression of the types at the printing line. During the last part of the forward movement of the handle 21 the main gear segments are retracted rearwardly out of engagement from the dial pinions and are elevated while so retracted to their initial position during the subsequent backward movement of the handle.

During the last portion of the forward movement of the operating handle the depressed keys are released preparatory to being again depressed for registering and recording another item. The addition of further items to this bill is repeated in the same manner. If all the items have the same date, the dating key 257 may be released after recording the first item, whereby the date will be only printed once at the head of the items. If the items bear different dates the dating segments must be adjusted accordingly. After all the items of one bill have been registered and recorded the operator depresses the sub-total printing key 181 and the sub-total zero key 120 and then moves the handle 21 forwardly and backwardly, thereby recording the sub-total at the foot of the column of auxiliary numbers and the sub-total at the foot of the column of main numbers and sub-total dials are also turned to zero, but the grand-total dials which register the grand-total of the numbers which have been added are not disturbed.

The addition of the group of items in further bills proceeds in the same manner, the numbers of each bill being added and recorded and the sub-totals of the same printed at the foot of the column. After all the groups of items or numbers in the several bills have been added separately the operator depresses the grand-total printing key 84 and then moves the handle forwardly, whereby the grand-total of all the numbers of the several bills is recorded. While the handle is in its foremost position the operator depresses the grand-total zero key 87, thereby causing the gear segments to be moved forwardly into engagement with the dial pinions and turn the grand-total dials back to zero during the subsequent backward movement of the handle.

If it is desired to record the main numbers in duplicate the operator shifts the bar 191 so as to permit the duplicate hammer pawls to cause the hammers to actuate the duplicate printing types and thereby produce a separate record at the printing line of the numbers recorded by the main printing types.

The vertical ruling between the dollars and cents number is effected automatically and if a cross rule is desired at the foot of a column of numbers the operator depresses the cross ruling key 198. When it is desired to print the same item or numbers two or more times in succession the depression of the repeating key 354 shifts the mechanism to produce this result. By depressing the non-printing key 176 the recording mechanism is thrown out of gear and no record is produced of the numbers. When it is desired to consecutively count the number of items in a bill which has been added on the main registering mechanism, the slide 223 is shifted toward the right so that its stops and finger intercepts the lugs and latches of the adjacent controlling arms and segments, whereby the auxiliary registering mechanism is caused to operate as a counting machine instead of an adding or registering machine. This is especially desirable in banks where the number of vouchers which are returned to a customer require to be counted and the amounts on the faces of the vouchers require to be added.

If it is desired to throw the printing mechanism of the auxiliary register out of action and still permit the recording mechanism of the main register to operate, the thumb piece 234 is moved rearwardly.

It is obvious that the dials may be wholly omitted without affecting the operation of the registering and recording mechanism, in which case, the operator can not determine the result of the work until the same has been printed, but it is preferable to employ the dials because they enable the operator to see at what numbers the machine has been set before adding and recording the same and the totals can also be seen without printing the same.

I claim as my invention:—

1. The combination of a grand-total registering mechanism whereby the total of a series of numbers may be registered and a sub-total registering mechanism whereby the totals of consecutive groups of numbers which are included in the whole series of numbers may be registered separate from the grand total of all the numbers, of a key operated setting device whereby mechanical representations of the numbers to be added are set up in the machine, a universal operating mechanism whereby all of the registers may be moved forward simultaneously according to said setting device, and means whereby the operating mechanism may restore to zero the grand-total registering mechanism and the sub-total registering mechanism either simultaneously or independently of each other, substantially as set forth.

2. In a calculating machine, the combination of a plurality of accumulators; a plurality of actuators, one actuator for each accumulator of a plurality of said accumulators; a plurality of rows of digital keys, one row for each actuator of a plurality of said actuators, each row comprising keys from 1 to 9, a plurality of stop members, each of said stop members being operable by a plurality of the keys of one of said rows of keys for controlling actuating movement of its actuator according to the value of the key operated; a shaft connected with a plurality of said accumulators for operating said accumulators a plurality of digit spaces for clearing; a gear wheel on said shaft; a gear member; a hand-operated operation-controlling member for effecting movement of said gear member to rotate said gear wheel to operate said shaft during clearing of said machine.

3. The combination with a register shaft provided with a gear pinion, of a register mounted loosely on said shaft, a coupling device constructed to connect the register with said shaft, a gear segment meshing with said pinion, a movable operating rod, a hook pivoted on said segment, a lever whereby said hook is engaged with and disengaged from said rod, and a key whereby said lever is controlled, substantially as set forth.

4. In a calculating machine, the combination of a plurality of sets of accumulators, movable accumulator controlling keys provided with mechanism for automatically returning said keys to normal position, whereby any one or any number of the accumulators may be caused to register one or more numbers at a time, and means whereby the accumulations on one set of accumulators may be controlled by the accumulations on another set of accumulators.

5. In a calculating machine, the combination of a plurality of sets of accumulators, movable accumulator controlling keys provided with mechanism for automatically returning said keys to normal position, whereby any one or any number of the accumulators may be caused to register one or more numbers at a time, and automatic means whereby the accumulations on one set of accumulators may be controlled by the accumulations on another set of accumulators.

6. In a calculating machine, the combination of a plurality of sets of accumulators, movable accumulator controlling keys provided with mechanism for automatically returning said keys to normal position, whereby any one or any number of the accumulators may be caused to register one or more numbers at a time, and means whereby the accumulations on one set of accumulators are controlled by the accumulations on another set of accumulators.

7. In a calculating machine, the combination of a plurality of sets of accumulators, movable accumulator controlling keys provided with mechanism for automatically returning said keys to normal position, and means whereby the accumulations on one set of accumulators may be controlled by the other set of accumulators while the number key mechanism is inactive.

8. In a calculating machine, the combination of a number key mechanism, a plurality of sets of accumulators which may be controlled by said number key mechanism, means whereby a group of numbers may be accumulated and totalized on one of said sets of accumulators, means nondependent on said number key mechanism for simultaneously clearing the set of accumulators on which the accumulations have been effected and retaining the total of such accumulations on another set of accumulators, so that the totals of subsequent groups of numbers may be accumulated on the first mentioned set of accumulators and automatically added to the last mentioned set of accumulators for producing a grand total of the numbers accumulated and a printing mechanism operable to print said totals.

9. The combination with a recording mechanism and its operating mechanism, of a grand-total cam and a sub-total cam which are shifted by the movement of said operating mechanism, and a shifting device whereby the recording mechanism may be operated relatively to either of said cams, substantially as set forth.

10. The combination with a grand-total accumulator and a sub-total accumulator, of an operating mechanism whereby said accumulators are operated, movable accumulator controlling keys for controlling the extent of operation of said accumulators by said operating mechanism and comprising means whereby said keys are automatically returned to normal position when they have exercised said control, a recording mechanism connected with said operating mechanism, and shifting means which controls the recording mechanism according to the amount registered on either of said accumulators, substantially as set forth.

11. The combination with a registering mechanism and its operating mechanism, of a grand-total cam and a sub-total cam which are shifted by the movement of said operating mechanism, a feeling lever connected with said registering mechanism, and a shifting device whereby said feeling lever is engaged with either of said cams and the registering mechanism is shifted relatively to said cams, substantially as set forth.

12. The combination with a grand-total dial, a sub-total dial, an actuating mechanism for operating the dials, and a recording mechanism connected with said actuating mechanism, of a key lever provided with a series of differential stops whereby said actuating mechanism may be arrested at different points in its forward movement, a flexible feeling lever connected with said key lever and adapted to move the key lever forwardly with the feeling lever, and a shifting device whereby said feeling lever may be deflected so as to cause the same to engage with either of said cams during its forward movement, substantially as set forth.

13. In a calculating machine, the combination of a flexible lever provided with two arms and a horseshoe-shaped slot, said slot having its bight arranged in one of said arms on one side of the pivot of the lever and having its branches extending along the opposite sides of the pivot into the opposite arm of the lever, a stop arm adapted to be coupled with the flexible lever by moving this lever laterally, a dial, and a spiral cam which is associated with said dial and which is adapted to be engaged by said stop arm, substantially as set forth.

14. The combination with a grand-total dial provided with a pinion, a sub-total dial coupled with the grand-total dial, and a printing segment, of a gear segment adapted to mesh with said pinion and coupled with said printing segment, a key lever provided with a series of differential stops whereby the gear segment and the parts connected therewith may be arrested at different points in their downward or forward movement, an upright feeling lever provided with a U-shaped slot which is arranged with its bight above the pivot of the feeling lever and which extends with its branches downwardly on opposite sides of said pivot, a lug arranged on the upper arm of the feeling lever and bearing against the key lever, a feeling finger arranged on the upper arm of the feeling lever, a transverse shifting bar provided with a finger or shoulder whereby the upper arm of the feeling lever is shifted to bring its feeling finger adjacent to the grand-total dial or the sub-total dial and a shifting device connected with the lower arm of the feeling lever, substantially as set forth.

15. In a calculating machine, the combination with a plurality of sets of accumulators, all of the accumulators of each set being of like denominational order; of a plurality of series of depressible controlling keys, one series for each set of accumulators for controlling the accumulations on a plurality of the accumulators of its respective set; a locking means for each series of keys for locking any depressed key in its depressed position; means whereby the depression of any one of said keys will release any other key of its series which is locked depressed; universal releasing means for releasing any depressed keys of all the series from their respective locking means, and universal operating means for operating any of said accumulators according to the control of said keys and for operating said universal releasing means.

16. In a calculating machine, the combination of a plurality of sets of accumulators, means for causing said sets of accumulators to accumulate items, printing mechanism, a plurality of total keys one for each of a plurality of said sets of accumulators and operable to effect printing by said printing mechanism of the amount accumulated on its respective set of accumulators, number setting keys operable to control the items to be accumulated on said sets of accumulators, locking means for holding said number setting keys in set position when set, and devices whereby the depression of any of said plurality of total keys will release any set number setting key from said locking means.

17. In a calculating machine, the combination of accumulating mechanism, printing mechanism for printing items accumulated on said accumulating mechanism, operating mechanism for said machine, a row of controlling keys for said accumulating and printing mechanism and comprising a plurality of total keys upon the depression of any of which total keys and the operation of said operating mechanism said printing mechanism will be controlled to print the total amount accumulated on said accumulating mechanism, and interlocking mechanism co-operative with said controlling keys for preventing more than a predetermined number of said keys from being in operative position at any one time.

18. In a calculating machine, the combination with toothed actuators, means for controlling the amount of movement of said actuators, two independently operable groups of totalizer wheels in operative relation to said actuators, means for introducing items into one or both totalizers, said means being under control of the operator, and means for transferring numbers from one totalizer to the other; substantially as described.

19. In a calculating machine, the combination with two groups of totalizer wheels, of means under control of the operator for consecutively registering items into either group, said means comprising movable accumulator controlling keys provided with mechanism for automatically returning said keys to normal position and means for transferring items accumulated in one group to the other; substantially as described.

20. In a calculating machine, the combination of two groups of totalizer wheels, of means for introducing a series of numbers to be added together into one or both groups, said means comprising movable accumulator controlling keys provided with mechanism for automatically returning said keys to normal position, and means for transferring the numbers so accumulated in one group to the other group of totalizer wheels; substantially as described.

21. In a calculating machine, the combination with two groups of totalizer wheels, each of said groups comprising a plurality of totalizer wheels of progressive denominational orders and arranged in axial alinement, of actuating devices therefor, means for rendering either of said groups of totalizer wheels operative with respect to said actuating devices in additive operations, means for obtaining separate totals from said groups respectively, and means for transferring a total from one group to the other and adding said total to the number already registered in the receiving totalizer; substantially as described.

22. In a calculating machine, the combination with actuating devices, of two independently operable groups of totalizer wheels in operative relation to said actuating devices, movable totalizer controlling keys for controlling the extent of actuation of said totalizer wheels by said actuating devices and provided with mechanism for automatically returning said keys to normal position, means whereby both groups may be engaged with and operated by said actuating devices, whereby a number registered in one group of totalizer wheels may be transferred to the other group of totalizer wheels, printing type which are positioned by said actuating devices, and means for causing said type to make a printing impression and make a record of the number which is transferred from one totalizer to the other; substantially as described.

23. In a calculating machine, the combination with actuating devices, means for controlling the amount of movement of said devices, printing type which are positioned by said actuating devices, means for causing said type to make a printing impression, two independently operable groups of totalizer wheels in operative relation to said actuating devices, means for introducing items into one or both of said groups of totalizers and making a record of said items, said means being under control of the operator, and means for transferring numbers from one totalizer to the other and making a record of the number transferred; substantially as described.

24. In a calculating machine, a plurality of groups of total wheels, means comprising number keys for operating them, and means nondependent on said number keys for dissipating a number from one group of wheels and introducing the number into another group of wheels at a single operation of said machine.

25. In a machine of the class described, the combination with word-printing mechanism employing a platen arranged to carry paper, of devices separate from the word-printing mechanism for recording numbers, total wheels operable to add the numbers so recorded, means for producing and retaining within the total wheels separate totals of the distinctive items so recorded, and automatic means for producing a grand total of said items in addition to the said separate totals; substantially as described.

26. In a machine of the class described, the combination with groups of independently operable totalizers, a single set of actuating devices therefor, printing type which are positioned by said actuating devices to print items registered in said totalizers, and the totals of said items, independently operable type hammers for said type, and separate mechanism for printing words adjacent to and in line with said first-mentioned type; substantially as described.

27. In an adding and listing machine, the combination, with means for listing a series of items and an accumulator for accumulating the total thereof, and a total key and connections by depressing which key and operating the machine the total of the series of items may be printed, of a supplemental accumulator for accumulating in one grand total the amount of the items in several successive series of items, and a supplemental total key and connections by depressing which key and operating the machine a grand total may be printed from said supplemental accumulator.

28. In a calculating machine, means for printing items, separate totals of certain of said items, and a grand total of all the items; separate totalizers for contemporaneously registering the items constituting the separate totals, and the grand total, and means under control of the operator for effecting printing by the first said means of separate totals or a grand total as desired.

29. The combination of a plurality of sets of accumulators said sets having accumulators arranged in denominational order, means comprising a movable accumulator controlling key provided with mechanism for automatically returning said key to normal position and operable at a single operation for controlling accumulating of any one of a plurality of different amounts by one set of said sets of accumulators, and means whereby accumulators of said set of accumulators may control accumulations on accumulators of like denominations of another set of said sets of accumulators according to the accumulations on the controlling set of accumulators.

30. The combination of a plurality of sets of accumulators each of said sets having accumulators arranged in denominational order, means comprising movable accumulator controlling keys provided with mechanism for automatically returning said keys to normal position and operable for controlling accumulations on one of said sets of accumulators, means whereby accumulators of this set of accumulators may control accumulations on accumulators of like denominations of another of said sets of accumulators according to the accumulations on the controlling set of accumulators, and printing mechanism controllable by one of said sets of accumulators for printing the amount accumulated thereon.

31. The combination of a plurality of sets of accumulators each of said sets having accumulators arranged in denominational order, means for controlling accumulations on one of said sets of accumulators, means whereby accumulators of this set of accumulators may control accumulations on accumulators of like denominations of another of said sets of accumulators according to the accumulations on the controlling set of accumulators, and a printing mechanism common to said sets of accumulators for printing any of the items and totals accumulated on any of said sets of accumulators.

32. The combination of a plurality of sets of accumulators each of said sets having accumulators arranged in progressive denominational order and in axial alinement, a number key mechanism operable at a single operation to control accumulating of any one of a plurality of different amounts by one set of said sets of accumulators, and means whereby accumulators of said set of accumulators may control accumulations on accumulators of like denominations of another set of said sets of accumulators according to the accumulations on the controlling set of accumulators.

33. The combination of a plurality of sets of accumulators each of said sets having its accumulators arranged in axial alinement and in progressive denominational order, means operable for controlling accumulations on one of said sets of accumulators, means whereby accumulators of this set of accumulators may control accumulations on accumulators of like denominations of another of said sets of accumulators according to the accumulations on the controlling set of accumulators, and means for turning to zero one of said sets of accumulators without disturbing the accumulation on another of said sets.

34. In a calculating machine, the combination of a set of accumulators arranged in axial alinement and in denominational order, actuating means for said set of accumulators, a second set of accumulators arranged in axial alinement and in progressive denominational order, and means whereby an accumulator of the first said set of accumulators may control accumulations of an accumulator of like denomination of the said second set of accumulators according to the accumulation on the controlling accumulator of the first said set and at the same time that said controlling accumulator is being actuated to accumulate.

35. In a calculating machine, the combination with a laterally shiftable paper carriage for supporting a sheet of paper to be printed upon, of a plurality of groups of totalizer wheels, actuating devices for said totalizer wheels, printing type which are positioned by said actuating devices, means whereby the accumulations on one of said groups of totalizer wheels may be controlled by the accumulations on another of said groups of totalizer wheels, and means for causing said type to make a printing impression to record on a sheet of paper supported by said carriage, an item or the total of items registered in any of said groups of totalizers, or the grand total of a plurality of totals of separate groups of numbers registered in any of said groups of totalizers.

36. In a calculating machine the combination with a plurality of groups of totalizer wheels, the totalizer wheels of each group being arranged in axial alinement and in progressive denominational order, of manipulative means operable at a single operation for controlling accumulations greater than unity on one of said groups of totalizer wheels, and means other than said manipulative means and automatically controlled by one of said groups of wheels for transferring the number registered in one group to another.

37. In a calculating machine, the combination of a plurality of sets of accumulator wheels, the accumulator wheels of each of said sets being arranged in axial alinement and in progressive denominational order, the denominational orders of the wheels of one of said sets being the same as the denominational orders of corresponding wheels in another of said sets, and the wheels of one of said sets being capable of controlling the transfer to wheels of the same respective denominational orders in another of said sets of an amount registered in the wheels controlling said transfer.

38. In a calculating machine, the combination with actuating devices, of a plurality of independently operable groups of totalizer wheels in operative relation thereto, the totalizer wheels of each group being arranged in axial alinement and in progressive denominational order and means for bringing said groups of totalizer wheels into such connection with said actuating devices, that a number registered in one set of totalizer wheels may be transferred to another set of totalizer wheels under control of the set transferred from.

39. In a calculating machine, the combination with actuating devices and movable keys for controlling them, which keys are provided with mechanism for automatically returning them to normal position, of a plurality of sets of accumulator wheels, one of which sets is in operative relation to said actuating devices, one of said sets having counterpart accumulator wheels of like denomination in another of said sets; and means for transferring numbers from the operatively related set to the other set of accumulator wheels.

40. In a calculating machine, the combination of a plurality of sets of accumulators the accumulators of each set being arranged in axial alinement and in progressive denominational order, means for accumulating numbers on one of said sets of accumulators, means for transferring the accumulations from said set of accumulators to another of said sets of accumulators, and means for printing the numbers accumulated on the first said set of accumulators.

41. In a calculating machine, the combination of two sets of accumulators the accumulators of each set being arranged in axial alinement and in progressive denominational order, common actuating means for both sets of accumulators, and means whereby the accumulations on one of said sets of accumulators may be transferred to the other set, in combination with separate means for controlling clearing of each of said sets.

42. In a calculating machine, the combination of a plurality of sets of accumulators the accumulators of each set being arranged in axial alinement and in progressive denominational order, and means for accumulating one of various numbers on one of said sets of accumulators at each single operation and for transferring the accumulations from this set of accumulators to another set of accumulators and for turning to zero said set of accumulators from which the numbers were transferred.

43. In a calculating machine, the combination of a plurality of sets of accumulators the accumulators of each set being arranged in axial alinement and in progressive denominational order, actuating devices therefor, carrying devices for said sets of accumulators and operable to carry from a lower to a higher accumulator of each set of a plurality of said sets under control of the lower accumulator of the respective set, and means for transferring numbers registered in one of said sets of accumulators to another of said sets of accumulators.

44. In a calculating machine, the combination with a plurality of sets of accumulators the accumulators of each set being arranged in axial alinement and in progressive denominational order, of means for transferring a number registered on one of said sets of accumulators to another of said sets of accumulators and retaining the number transferred on the transferring set.

45. In a calculating machine, the combination of a registering device comprising a plurality of registering elements arranged in axial alinement and in progressive denominational order; a plurality of actuators, one for each of a plurality of said registering elements; a second registering device comprising a plurality of registering elements the accumulators of each set being arranged in axial alinement and in progressive denominational order and operating mechanism operable for causing said actuators to actuate the first said registering device for accumulating amounts and operable for causing a total registered in the first said registering device to be transferred to the second said registering device.

46. In a calculating machine, the combination with actuating devices, means for controlling the amount of movement of said devices, printing type which are positioned by said actuating devices, means for causing said type to make a printing impression, a plurality of independently operable groups of totalizer wheels operable by said actuating devices, means for transferring the number registered in one group to another, and for making a record of the number transferred.

47. A machine for listing items in several successive series and printing the total of each series at the end thereof and a grand total of all of the items at the end of all of the series, comprising printing devices for listing the individual items, a set of accumulators for accumulating the individual items of each series listed, a second set of accumulators for accumulating the grand total of all the items of all of the series, means for transferring amounts from one of said sets of accumulators to the other, means for effecting the printing of a total by said printing devices from the first said set of accumulators, and clearing of the same, and means for subsequently effecting printing of a grand total by said printing devices from the second said set of accumulators and clearing of the same.

48. The combination of a set of adding devices; stops for said devices to stop them and their operating means, when moving in a direction reverse to that of adding, as soon as such adding devices arrive at their zero position; operating means adapted to move said set of adding devices in said reverse direction whereby said set of adding devices is cleared; a second set of adding devices; and means co-operating with said operating means whereby the accumulations on the first set of adding devices are transferred to said second set, whereby the total represented by said first set of adding devices is transferred to said second set.

49. In a calculating machine, the combination of a plurality of sets of accumulators, a plurality of actuators common to said sets, a total key, means whereby the operation of said total key effects the positioning of said actuators according to the total on one of said sets of accumulators, and mechanism whereby another of said sets of accumulators may be thereafter controlled according to the positioning of said actuators effected by said total key.

50. In a calculating machine, the combination of a grand-total totalizer whereby the grand-total of a plurality of groups of numbers may be registered, a sub-total totalizer whereby the respective total of each group of a plurality of said groups of numbers may be registered separate from the grand-total of all of said numbers, and means for mechanically printing a total under the control of either of said totalizers at will.

51. In a calculating machine, the combination of a grand-total totalizer whereby the grand-total of a plurality of groups of numbers may be registered, a sub-total totalizer whereby the respective total of each group of a plurality of said groups of numbers may be registered separate from the grand-total of all of said numbers, printing mechanism common to said totalizers, a grand-total key, a sub-total key, and means controllable by each of said keys for effecting the printing by said printing mechanism of the total standing on the respective totalizer.

52. In a calculating machine, the combination of a grand total totalizer whereby the grand total of a plurality of groups of numbers may be registered, a sub-total totalizer whereby the respective total of each group of a plurality of said groups of numbers may be registered separate from the grand-total of all of said numbers, printing mechanism for printing items totalized on said totalizers, and means co-operative with said printing mechanism for effecting printing of the total amount totalized on either of said totalizers without leaving the same at zero.

53. In a calculating machine, the combination of a set of sub-total accumulator dials, a set of grand-total accumulator dials, controlling means for determining the items to be accumulated on said sets of dials, actuating means for actuating both of said sets of dials to the extent determined by said controlling means and at a single operation of the machine, means operable at the will of the operator for returning said set of sub-total accumulator dials to zero independently of said grand-total accumulator dials, and a shield for said sets of dials and provided with a plurality of sight openings for constantly displaying to the operator the totals accumulated on both of said sets of dials.

54. In a calculating machine, the combination of a sub-total accumulator for accumulating a sub-total of a series of items, a grand-total accumulator for accumulating a grand-total of a plurality of series of items accumulated by said sub-total accumulator, operating mechanism for registering each item on said sub-total accumulator and on said grand-total accumulator at a single operation, and a printing mechanism for printing the total amount accumulated on either of said accumulators at any desired point in the addition of a series at the will of the operator.

55. In a calculating machine, the combination of a sub-total accumulator whereby a separate total of each group of a plurality of groups of numbers may be obtained, a grand-total accumulator whereby the grand total of a plurality of said separate totals may be obtained, controlling means for determining the items to be accumulated on said sub-total and grand total accumulators, actuating means for actuating both of said accumulators at a single operation of the machine to the extent determined by said controlling means, means for returning said sub-total accumulator to zero independently of said grand-total accumulator, printing mechanism for printing the items accumulated on said sub-total and said grand total accumulators, means co-operative with said printing mechanism and with said sub-total accumulator for affecting printing of a total of all the items entered in said machine since said sub-total accumulator was last cleared, and means co-operative with said printing mechanism and with said grand-total accumulator for affecting printing of a grand total of a plurality of said separate totals which have been accumulated on said sub-total accumulator and including all items which have been entered in said machine since said sub-total accumulator was last cleared.

56. In an adding and listing machine, the combination with means for listing a series of items and an accumulator for accumulating a total thereof, and key-operated means by operating which means and operating the machine the total of the series of items may be printed and the accumulator cleared or reset to zero, of a supplemental accumulator for accumulating in one grand total the amount of all of the items in several successive series of items, and supplemental key-operated means by operating which means and operating the machine a grand total may be printed from said supplemental accumulator and the accumulator be cleared.

57. In an adding and listing machine, the combination of type, reciprocatory racks, means for determining the extent of movement of the racks, two sets of accumulators operated by said racks, and means for controlling the co-operative relationship of the two sets of accumulators with the racks, whereby a series of items may be listed and accumulated upon one set of accumulators and said accumulators returned to zero position and the total of the series of items printed, and whereby the total amount of several successive series of items may be accumulated and preserved upon the other set of accumulators and the type set up to print said total amount and said accumulators be returned to zero.

58. In a calculating machine, the combination with a sub-total set of registers, a grand-total set of registers, and co-operating printing mechanism, of means co-operating therewith whereby a group of items may be accumulated on said sub-total registers, listed, its total printed and said sub-total registers cleared at the will of the operator, and whereby a plurality of such totals may be accumulated and preserved on said grand-total registers for producing a grand-total of groups of items which have been accumulated on said sub-total registers.

59. In a calculating machine, the combination with a sub-total set of registers, a grand-total set of registers, and cooperating printing mechanism, of means co-operating therewith whereby a group of items may be accumulated on said sub-total registers, listed, its total printed and said sub-total registers cleared at the will of the operator, and whereby a plurality of such totals may be accumulated and preserved on said grand-total registers for producing a grand-total of groups of items which have been accumulated on said sub-total registers, and whereby said grand-total may be printed and said grand-total registers cleared.

60. In a calculating machine, the combination of a set of sub-total accumulators for accumulating the total of a series of items, a set of grand-total accumulators for accumulating the grand-total of a plurality of such series, a key mechanism common to both of said sets of accumulators for controlling the accumulations effected thereon, and printing mechanism common to both of said sets of accumulators for printing the items accumulated thereon and for printing under the control of said sets of accumulators, the amounts accumulated thereon.

61. The combination of a plurality of sets of accumulators, and a universal printing mechanism for said sets, said accumulators and printing mechanism comprising means whereby numbers may be accumulated on one of said sets and their total automatically preserved on another of said sets, and whereby the total of either of said sets may be printed by said printing mechanism.

62. In a calculating machine, the combination of a set of main accumulators, a set of auxiliary accumulators, a universal printing device operatively related to each of said sets of accumulators, universal actuating means at a single operation of which a number may be accumulated on both of said sets of accumulators and printed by said printing device, and means operable at the will of the operator for clearing one of said sets at total printing operations of the machine, said total remaining undisturbed in the other set of accumulators, so that a plurality of separate sets of items may be totalized on one of said sets of accumulators while the other set of accumulators accumulates the grand-total of all of the sets of items.

63. In a calculating machine, the combination of a set of sub-totalizer elements of successive denominational orders and whereby a separate total of each group of a plurality of groups of numbers may be obtained, a set of grand-totalizer elements of successive denominational orders and whereby the grand-total of a plurality of said separate totals may be obtained, actuating means therefor, and means operable by each element of lower order of one set for causing 64. In a calculating machine, the combination with a plurality of printing types; of a paper support, said types and support being movable one with relation to the other for presenting different columnar portions of a record sheet to said types, so that a plurality of items may be printed on said record sheet in horizontal alignment; a set of accumulators operable for totalizing items printed in a horizontal line; a set of grand-total accumulators operable to yield a grand-total of a plurality of line-totals; and mechanism whereby said types may be caused to print items on said record sheet and the first said set of accumulators may be caused to accumulate said items, and whereby said types may at the will of the operator be caused to print the line-totals accumulated on the first said set of accumulators and concomitantly effect turning of the first said set of accumulators to zero, and whereby said types may be caused to print the grand totals accumulated by said set of grand-total accumulators and concomitantly effect turning to zero of said set of grand-total accumulators.

65. In a calculating machine, the combination with a plurality of printing types; of a paper support, said types and support being movable one with relation to the other for presenting different columnar portions of a record sheet to said types so that a plurality of items may be printed on said record sheet in horizontal alignment; a set of accumulators whereby the items printed in a horizontal line may be totalized; setting mechanism for determining the items to be printed by said types and accumulated by said accumulators; a hand-controlled operation-controlling member operable for effecting printing by a plurality of said types and accumulating by said set of accumulators at a single operation of said member and according to the control of said setting mechanism; a total device co-operative with said accumulators and printing types and operable to enable said hand-controlled operation-controlling member to effect printing of a line-total from said accumulators and to effect clearing of the same; a set of grand-total accumulators operable to accumulate the various line totals into a grand-total; and a grand-total device co-operative with said grand-total accumulators and said printing types and operable to enable said hand-controlled operation-controlling member to effect printing of a grand-total from said grand-total accumulators and to effect clearing of the same.

66. In a calculating machine, the combination of printing types, a paper support, said types and support being movable one with relation to the other for presenting different columnar portions of a record sheet to said types so that a plurality of columns of items may be printed on said record sheet, a set of accumulators whereby the items printed in a column may be totalized, a set of grand-total accumulators operable to yield a grand-total of a plurality of column-totals, and mechanism whereby said types may be caused to print items on said record sheet and the first said set of accumulators may be caused to accumulate said items, and whereby said types may be caused to print the column-totals accumulated on the first said set of accumulators and concomitantly effect turning of the first said set of accumulators to zero, and whereby said types may be caused to print the grand-totals accumulated by said set of grand-total accumulators and concomitantly effect turning to zero of said set of grand-total accumulators.

67. In a calculating machine, the combination of a plurality of printing types, a paper support, said types and support being movable one with relation to the other for presenting different columnar portions of a record sheet to said types so that a plurality of columns of items may be printed on said record sheet, a set of accumulators whereby the items printed in a column may be totalized, setting mechanism for determining the items to be printed by said types and accumulated by said accumulators, a hand-controlled operation-controlling member operable for effecting printing by a plurality of said types and accumulating by said set of accumulators at a single operation of said member and according to the control of said setting mechanism, a total device co-operative with said accumulators and said printing types and operable to enable said hand-controlled operation-controlling member to effect printing of a column-total from said accumulators and to effect clearing of the same, a set of grand-total accumulators operable to accumulate the various column-totals into a grand-total, and a grand-total device co-operative with said grand-total accumulators and said printing types and operable to enable said hand-controlled operation-controlling member to effect printing of a grand-total from said grand-total accumulators and to effect clearing of the same.

68. In a calculating machine, the combination of a plurality of accumulators operable to accumulate items into totals, a plurality of accumulators operable to accumulate a plurality of said totals into grand-totals, printing mechanism adapted to print the items and totals and grand-totals on a record sheet, and a carriage adapted to support said record sheet and movable to carry the same transversely of said printing mechanism, whereby the items may be printed in one column on said record sheet and the totals and grand-totals printed in another column on said record sheet.

69. In a calculating machine, the combination of two groups of totalizer wheels, a series of differentially movable racks for operating both of said groups of totalizer wheels, means whereby the accumulations on one group may be controlled by the other group, and means whereby the total of a plurality of items may be accumulated in one of said groups to the exclusion of the other.

70. In a calculating machine, the combination of a sub-total accumulating mechanism comprising accumulating elements arranged in axial alinement and in progressive denominational order, a grand-total accumulating mechanism comprising accumulating elements arranged in axial alinement and in progressive denominational order, said mechanisms being constructed and arranged so that said grand total accumulating mechanism can normally accumulate only such items as are accumulated on said sub-total accumulating mechanism, and actuating means for said accumulating mechanisms and operable for actuating them to accumulate numbers exceeding unity during a single operation of said actuating means.

71. In a calculating machine, the combination of a grand total accumulator comprising a plurality of accumulator wheels of different denominational order, a sub-total accumulator comprising a plurality of accumulator wheels of different denominational order, said accumulators being constructed and arranged so that said grand total accumulator can normally accumulate only such items as are accumulated on said sub-total accumulator, means for causing said accumulators to accumulate items of a plurality of denominations at a single operation of said machine, and means operable at the will of the operator for clearing said sub-total accumulator independent of said grand total accumulator.

72. In a calculating machine, the combination of a device for accumulating numbers into totals, a device for totalizing the totals into grand totals, one of said devices being provided with gear teeth, and a single actuating gear member engageable with said gear teeth of one of said devices and thereby connected with the other of said devices so as to actuate both of said devices.

73. In a calculating machine, the combination of a device for accumulating numbers into sub-totals, a device for totalizing the sub-totals into grand totals, each of said devices including accumulating elements arranged in axial alinement and in progressive denominational order, and an actuating gear member having a single row of teeth and correlated with said devices for actuating them simultaneously.

74. In a calculating machine, the combination of a toothed device for accumulating each of a plurality of series of numbers into sub-totals, a toothed device for totalizing a plurality of such sub-totals into grand-totals, and a toothed actuator all the teeth of which are immovable relatively to each other, said actuator being correlated with said devices for actuating them, and operable for actuating said devices to accumulate numbers greater than unity at a single operation of said actuator.

75. In a calculating machine, the combination of a set of accumulators for accumulating numbers into sub-totals, a set of accumulators for accumulating a grand-total of a plurality of said sub-totals, and means for causing the same number to be accumulated on both said sets during a single operation of said machine, said means remaining effective for subsequent operations of said machine.

76. In a calculating machine, the combination of a plurality of sets of main accumulators to accumulate sets of items, a plurality of sets of auxiliary accumulators for accumulating separate sets of items from those accumulated by said sets of main accumulators, each of said sets of said main accumulators and said sets of said auxiliary accumulators being provided with mechanism for causing carrying from each lower to its next higher accumulator the construction and arrangement being such that none of the accumulators of any of said sets is capable of causing carrying to an accumulator of another of said sets, controlling mechanism for determining a plurality of different items to be simultaneously accumulated by respective sets of said sets of accumulators, and common operating mechanism for operating any of said sets of main and auxiliary accumulators according to the control of said controlling mechanism.

77. In a calculating machine, the combination of a plurality of sets of main accumulators, a plurality of sets of auxiliary accumulators, each of said sets of said main accumulators and said sets of said auxiliary accumulators being provided with mechanism for causing carrying from each lower to its next higher accumulator the construction and arrangement being such that none of the accumulators of any of said sets is capable of causing carrying to an accumulator of another of said sets, key mechanism for said main accumulators, separate key mechanism for said auxiliary accumulators, and an operating mechanism operable to effect accumulation on any of said sets of accumulators according to the control of the respective key mechanisms.

78. In a calculating machine, the combination of a plurality of sets of main accumulators to accumulate sets of items, a plurality of sets of auxiliary accumulators for accumulating separate sets of items from those accumulated by said sets of main accumulators, each of said sets of said main accumulators and said sets of said auxiliary accumulators being provided with mechanism for causing carrying from each lower to its next higher accumulator the construction and arrangement being such that none of the accumulators of any of said sets is capable of causing carrying to an accumulator of another of said sets, printing mechanism for printing the items accumulated by said sets of main and auxiliary accumulators, controlling mechanism for determining the items to be accumulated by said sets of accumulators and printed by said printing mechanism, and operating mechanism common to all of said sets of accumulators for operating said sets of accumulators to accumulate items and for operating said printing mechanism to print the same, according to the control of said controlling mechanism and for operating said printing mechanism to print the totals standing on any of said sets of accumulators and under control of such set of accumulators.

79. In a calculating machine, the combination of a plurality of sets of accumulators operable to accumulate separate totals of items; a plurality of sets of grand-total accumulators, one set for each of a plurality of the first said sets of accumulators and each operable to accumulate a grand-total of a plurality of said totals accumulated on its respective one of the first said sets of accumulators; each of said sets of accumulators and said sets of grand total accumulators being provided with mechanism for causing carrying from each lower to its next higher accumulator the construction and arrangement being such that none of the accumulators of any of said sets is capable of causing carrying to an accumulator of another of said sets, and common operating means for all of said sets of accumulators.

80. In a calculating machine, the combination of a main and an auxiliary set of total accumulators, each operable to accumulate separate totals of items; a main and an auxiliary key mechanism for determining the items to be accumulated on the respective sets of total accumulators; a main and an auxiliary set of grand total accumulators each set operable to accumulate a grand total of a plurality of said totals accumulated on its respective one of the first said sets of accumulators; each of said sets of said main accumulators and said sets of said auxiliary accumulators being provided with mechanism for causing carrying from each lower to its next higher accumulator the construction and arrangement being such that none of the accumulators of any of said sets is capable of causing carrying to an accumulator of another of said sets, and common operating means whereby said total accumulators are caused to accumulate according to the control of their respective key mechanisms and whereby said grand total accumulators are caused to accumulate grand totals of the respective totals.

81. In a calculating machine, the combination of a plurality of sets of accumulators operable to accumulate separate totals of items; a plurality of sets of grand-total accumulators, one for each of a plurality of the first said sets of accumulators and each operable to accumulate a grand-total of a plurality of the said totals accumulated on its respective one of the first said sets of accumulators; each of said sets of accumulators and said sets of grand total accumulators being provided with mechanism for causing carrying from each lower to its next higher accumulator the construction and arrangement being such that none of the accumulators of any of said sets is capable of causing carrying to an accumulator of another of said sets, printing mechanism for said sets of accumulators and operable to print the items, totals and grand-totals on a record material; and common operating means for operating said sets of accumulators and said printing mechanism.

82. In a calculating machine, the combination of a plurality of sets of accumulators each set comprising accumulators of successive denominational orders and the accumulators of all of said sets being arranged with their axes in substantially one straight line, a carrying mechanism comprising carrying devices each for use exclusively in carrying from an accumulator of a specific denomination to the accumulator of next higher denomination, universal actuating means for controlling said accumulators, and printing mechanism for printing the items as accumulated on said accumulators.

83. In a calculating machine, the combination of a plurality of sets of accumulators each set comprising accumulators of successive denominational order all of said accumulators being arranged with their axes in substantially one straight line, and a single set of actuators including one actuator for each denominational order and each actuator of which set is a single tooth-carrying member correlated with for actuating all of said accumulators of its respective denomination.

84. The combination with a plurality of sets of accumulators each set comprising a separate accumulator for each denomination and arranged in successive denominational order, each accumulator of each denominational order except the highest of each of said sets being provided with means for carrying from each lower accumulator to the accumulator of the next higher denominational order, the accumulators of all of said sets being arranged with their axes in substantially a straight line, of a set of pivoted actuators each actuator of said set being operable to actuate the accumulators of a respective denomination the axes of which actuators are arranged substantially in a straight line, which is other than and parallel with the first said straight line.

85. In a registering machine, the combination with a plurality of totalizers each comprising a series of denominational elements, and a rod on which said elements are all mounted side by side in lateral alignment, of a plurality of totalizer operating racks also mounted side by side in lateral alignment and equaling in number the denominational elements of any one of the totalizers, means for producing engagement and disengagement of said racks and totalizers for driving the latter, means for giving said operating racks differential extents of movements, devices carrying type and movable by said operating racks, and means for forcing said types against a record material.

86. The combination of a plurality of sets of registers arranged with their axes substantially in a straight line and each set including registers of successive denominations and each set provided with means for carrying from each of its registers of lower denomination to its register of next higher denomination, printing mechanism for printing items registered by said registers, and a number of key mechanism common to all of said sets of registers and operable to determine the items to be registered on said registers and printed by said printing mechanism and means whereby one of said sets of registers may be automatically turned to zero at the will of the operator without disturbing the accumulations on the other of said sets of registers.

87. The combination of a plurality of sets of registers arranged with their axes substantially in a straight line and each set including registers of successive denominations and each set provided with means for carrying from each of its registers of lower denomination to its register of next higher denomination, supporting means for said registers, a plurality of actuators adapted to simultaneously engage to actuate a plurality of registers of one of said sets of registers, supporting means for said actuators independent of the supporting means for said registers, a number key mechanism common to all of said sets of registers and operable to determine the item to be registered on said registers, one of said sets of registers being mechanically returnable to zero without disturbing the accumulation on the other sets of registers.

88. In a calculating machine, the combination of a plurality of accumulators of like denomination, and a plurality of movable accumulator controlling keys provided with mechanism for automatically returning them to normal position, any single one of which keys may be operated for controlling and permitting actuation of a plurality of said accumulators during a single complete operation of said machine.

89. In a calculating machine, a plurality of sets of accumulators and a single set of number keys provided with mechanism for automatically returning them to normal position any single one of which may be operated for simultaneously controlling the accumulating movements and permitting actuation of a plurality of said sets of accumulators to an extent exceeding unity at a single operation.

90. The combination of a plurality of sets of accumulators, each of said sets comprising accumulators of successive denominational orders, accumulators of one set being of the same denominational orders as accumulators of another of said sets; actuators operable to actuate a plurality of said accumulators of the same denomination, means for turning one of said sets of accumulators to zero at the will of the operator independent of the other of said sets; and a shield apertured for constantly displaying to the operator the amounts standing on said sets of accumulators.

91. The combination with an actuator having gear teeth of a pinion which may be engaged by said actuator, a plurality of accumulators all associated with the same pinion and adapted to be actuated by the same actuator through the medium of said pinion.

92. In a calculating machine, the combination of a plurality of accumulators of like denomination and a single actuator for causing actuation of a plurality or said accumulators for registering on each of said accumulators a number greater than unity at a single operation of the machine, and printing mechanism operable at the will of the operator to print the total accumulated on either of said accumulators.

93. In a calculating machine, the combination of a plurality of accumulators of the same denomination, an actuating mechanism correlated with a plurality of said accumulators for actuating the same and being normally inoperative with relation to said accumulators and being capable of moving independently of the latter, a set of number keys so correlated with said actuating mechanism and with said accumulators that by the depression of any one of said number keys the said actuating mechanism is thereby rendered operative with relation to a plurality of said accumulators and is controlled for actuating said accumulators according to the number key depressed, one of said accumulators being returnable to zero without disturbing the accumulation on another of said accumulators.

94. In a calculating machine, the combination of a plurality of totalizer wheels of the same denominational order, and means comprising a plurality of keys for controlling the extent of operation of said wheels, said keys being provided with mechanism for automatically returning them to normal position at each operation of the keys, and operable at a single operation to add to one of said wheels and turn another of said wheels to zero.

95. In a calculating machine, the combination with an actuator, of a plurality of accumulators each operable to accumulate a number greater than unity at a single operation of said actuator, and a shield for said accumulators and apertured for constantly displaying to the operator the amounts standing on said accumulators.

96. In a calculating machine, the combination of a plurality of total wheels, mechanism comprising digit keys provided with mechanism for automatically returning them to normal position at each operation of the keys and operable for operating a plurality of said total wheels, whereby a number can be introduced into one of said total wheels and taken out of another of said total wheels at a single operation of said machine.

97. In a calculating machine, the combination of a plurality of sets of accumulators, each of said sets of accumulators being provided with mechanism for causing carrying from each lower to its next higher accumulator the construction and arrangement being such that none of the accumulators of any of said sets is capable of causing carrying to an accumulator of another of said sets, and printing mechanism controllable by either of said sets of accumulators for printing a total of the respective set of accumulators.

98. In a calculating machine, the combination of a plurality of sets of totalizers; each of said sets of totalizers being provided with mechanism for causing carrying from each lower to its next higher accumulator the construction and arrangement being such that none of the totalizers of any of said sets is capable of causing carrying to a totalizer of another of said sets, a plurality of sets of printing types, each set of types being common to and controllable by a respective totalizer of each of said sets of totalizers; and means operable for causing said sets of printing types to print the total accumulated by any one of a plurality of said sets of totalizers and under control of such set of totalizers.

99. In a calculating machine, the combination of a plurality of sets of accumulators, manipulative devices for controlling the entering of numbers on said accumulators, a plurality of total printing controlling keys one for each of said sets, and printing mechanism controllable by any of said total printing controlling keys for effecting printing of the total of the corresponding set of accumulators under control of said corresponding set of accumulators.

100. In a calculating machine, the combination of a plurality of sets of totalizers, actuating mechanism, operating mechanism, means operable by the operating mechanism for bringing different sets of totalizers into co-operative relation with said actuating mechanism each exclusively of the other, irrespective of whether or not any number is recorded on any of said sets of totalizers, and a manipulative device for controlling said means in selecting the set of totalizers to be brought into said relation.

101. In a calculating machine, the combination of a plurality of sets of totalizers, actuating mechanism, operating mechanism, means operable by the operating mechanism for bringing different sets of totalizers into co-operative relation with said actuating mechanism each exclusively of the other, a manipulative device for controlling said means in selecting the set of totalizers to be brought into said relation, and means whereby the operation of said operating mechanism will effect the return of said manipulative device to normal position.

102. In a calculating machine, the combination of a plurality of sets of totalizers, actuating mechanism, operating mechanism, means operable by the operating mechanism for bringing different sets of totalizers into co-operative relation with said actuating mechanism each exclusively of the other, irrespective of whether or not any number is recorded on any of said sets of totalizers, a manipulative device for controlling said means in selecting the set of totalizers to be brought into said relation, and means for automatically selecting a particular set of said totalizers when said manipulative device is not manipulated.

103. In a calculating machine, the combination with a plurality of sets of accumulators, of a printing device for printing the items accumulated on said accumulators, and key operated means co-operative with said printing device for effecting printing of the total of one of said sets and clearing of the same without affecting the accumulations on another of said sets of accumulators.

104. The combination of a plurality of accumulators of like denominational order one of which accumulators is movable independently of another of said accumulators, means for actuating one of said accumulators, and means whereby a second of said accumulators is driven by the actuated accumulator simultaneously with and an amount equal to the accumulating actuation of the latter.

105. The combination of a plurality of sets of accumulators one of which sets is movable independently of another of said sets, actuating means for one of said sets, means whereby a second of said sets is driven by the actuated set simultaneously with the actuation of the latter, and means for turning the accumulators of one of said sets to zero position without affecting the other set.

106. In a calculating machine, the combination of a plurality of sets of accumulators, the accumulators of each set being arranged in axial alignment and in successive denominational order, and means whereby each of a plurality of the accumulators of one of said sets may drive an accumulator of like denominational order of another of said sets.

107. In a calculating machine, the combination of two accumulators of like denomination, and a connection between said accumulators whereby one of said accumulators may drive the other, and constructed and arranged to permit movement of one of said accumulators relative to the other and for positioning said accumulator after said relative movement in predetermined relation to the other.

108. In a calculating machine, the combination with a plurality of sets of registers, an actuating mechanism, and a plurality of manipulative devices provided with mechanism for automatically returning them to inoperative position, of means whereby said actuating mechanism may be made to actuate one of said sets of registers to effect various accumulations thereon under the control of said manipulative devices, and means whereby said set of registers may actuate a second of said sets of registers for the purpose of adding thereon the amounts registered on said first set of registers.

109. In a calculating machine, the combination of a plurality of sets of accumulators, one of said sets being operable to drive a second of said sets; printing mechanism; and a separate total key for each of the two said sets of accumulators and each operable for effecting printing by said printing mechanism of the total of its respective set of accumulators.

110. In a calculating machine, the combination with a shaft, of a set of accumulators, actuators for said accumulators, a plurality of connections which permit the free movement of said accumulators when the latter are rotated for accumulating and which connections may rotate said accumulators when said shaft is turned, operating mechanism for operating said actuators to actuate said accumulators while said shaft remains at rest, a device normally out of effective relationship with said operating mechanism, and a manipulative member operable for establishing effective relationship between said operating mechanism and said device so that said operating mechanism may cause said device to turn said shaft and thereby cause movement of said connections for turning a plurality of said accumulators to zero position.

111. In a calculating machine, the combination of a plurality of sets of accumulators, a shaft upon which a plurality of said sets of accumulators is mounted, mechanism for operating said shaft for turning the accumulators of one of said sets mounted on said shaft to zero, and mechanism operable independently of said shaft for turning the accumulators of another of said sets mounted on said shaft to zero.

112. In a calculating machine, the combination of a plurality of accumulators, actuator for causing said accumulators to accumulate items, printing mechanism operable to print said items, a sub-total key which causes said printing mechanism to print the amount standing on said accumulators and without clearing them, a separate key which causes the turning of said accumulators to zero, and operating mechanism for operating said accumulators and printing mechanism according to the control of said keys.

113. In a calculating machine the combination of a plurality of accumulators, a shaft, a plurality of engaging members one for each accumulator of a plurality of said accumulators and mounted on said shaft so as to be caused to rotate therewith, means for operating said shaft to cause said members to rotate a plurality of said accumulators, and actuating means independent of said shaft and said engaging members for actuating said accumulators for accumulating items thereon.

114. In a calculating machine the combination of a plurality of sets of accumulators, printing means including an arbitrary number printing mechanism, counting means including total and grand total counting mechanisms, and a universal operating mechanism for said accumulators, printing means and counting means whereby the machine can be operated to cause one of said accumulators to accumulate items into totals and another of said accumulators to accumulate said totals into grand totals and said counting means to automatically count the number of items in each said total and to register the grand total of the number of such items, and the printing means to print the items accumulated together with related arbitrary numbers.

115. In a calculating machine, the combination of calculating mechanism; numeral types operable for printing on a record sheet items registered on said calculating mechanism; manipulative means co-operative with the calculating mechanism and numeral types and which, prior to the operation of the machine, can be set and automatically detained in set condition to effect printing of the total registered on said calculating mechanism without clearing the latter and which, prior to the operation of the machine, can be set and automatically detained in set condition to effect printing of the total registered on said calculating mechanism and clearing of the latter; and a hand-controlled operation-controlling member operable for effecting operation of said calculating mechanism and said numeral types under control of said manipulative means, and for automatically effecting the return of said manipulative means from set condition to normal condition.

116. In a calculating machine, the combination of an accumulating mechanism and a co-operative printing mechanism, a plurality of keys, means for causing said printing mechanism to print the total registered on said accumulating mechanism without clearing the same or for causing said printing mechanism to print the total registered on said accumulating mechanism and clearing the same, and either of which functions can be completely determined by the manipulation of said keys before the operation of said machine, and a hand-controlled operation-controlling member for operating said means according to the control of said keys.

117. In a calculating machine, the combination of a plurality of sets of accumulators, mechanism for effecting different operations of any desired set of accumulators, a plurality of cams for controlling said mechanism to effect said different operations, and means for making any desired cam effective or ineffective.

118. In a calculating machine, the combination of a plurality of sets of accumulators; a plurality of actuating members, each actuating member being correlated with, for effecting operation of, one of the accumulators of each of a plurality of said sets of accumulators; printing mechanism operable for automatically printing the items accumulated on any of a plurality of said sets of accumulators; and mechanism for effecting printing by said printing member at the will of the operator of the total of either of a plurality of said sets of accumulators and under the control of the respective set of accumulators in an operation of said machine which immediately succeeds an accumulating operation of said machine.

119. In a calculating machine, the combination of a set of accumulators operable for accumulating separate totals of a series of items, a set of accumulators for accumulating a grand total of a plurality of the series of totals accumulated on the first said set of accumulators, means for operating said sets of accumulators to effect such accumulations, and a manipulative device operable at the will of the operator to effect clearing of both of said sets of accumulators, automatically during a single cycle of operation of the machine.

120. In a calculating machine, the combination of a set of accumulators for accumulating items into totals, a set of accumulators for accumulating said totals into grand totals, printing mechanism, and means whereby at a single operation of said machine, said printing mechanism may be caused to print the amount standing on one of said sets of accumulators and both of said sets of accumulators may be automatically turned to zero.

121. In a calculating machine, the combination of a set of accumulators, operating means therefor, a depressible key for causing said operating means to clear said set of accumulators, and locking means for locking said key in a depressed position, said locking means being releasable by said operating means.

122. In a calculating machine, the combination of a plurality of sets of accumulators, means for transferring numbers from one of said sets of accumulators to another, a key for effecting clearing of the set of accumulators transferred to, automatic means for locking said key in an operative position, and automatic means for releasing said key from said locking means.

123. In a calculating machine, a plurality of sets of accumulators, universal operating means for causing said sets of accumulators to simultaneously accumulate numbers, mechanism operable by said operating means for causing clearing one of said sets of accumulators independent of the other set of accumulators, manipulative means for controlling said mechanism and means for automatically returning said mechanism to its normal position whereupon numbers may again be simultaneously accumulated on said plurality of sets.

124. In a calculating machine, the combination of a plurality of sets of accumulators, a plurality of shifting keys for causing one of said sets of accumulators to perform various functions, a plurality of shifting keys for causing another of said sets of accumulators to perform various functions, and a universal operating mechanism for operating the said sets of accumulators according to the control of the respective sets of keys.

125. In a calculating machine, the combination of an accumulating mechanism, printing mechanism for printing items accumulated on said accumulating mechanism, a plurality of total keys each movable from inoperative to operative position for causing said printing mechanism to print the total amount accumulated on said accumulating mechanism, common detaining means for a plurality of said total keys for detaining any of them in operative position when moved to operative position, a hand-controlled operation-controlling member operable for effecting operation of said accumulating mechanism and of said printing mechanism and for causing said detaining means to release any of said total keys which may be detained thereby.

126. In a calculating machine, the combination of a set of accumulators for accumulating items into totals, a set of accumulators for accumulating a plurality of said totals into grand-totals, printing mechanism, a grand-total key which may be set and automatically detained in set condition for controlling said printing mechanism to print the amount accumulated on said set of grand total accumulators, and operating mechanism for operating both of said sets of accumulators and also operable for operating said printing mechanism according to the control of said grand-total key and for effecting restoring of said grand-total key to normal ineffective condition.

127. In a calculating machine, the combination of a plurality of sets of accumulators, means for accumulating items thereon, printing devices, and mechanism co-operative with said printing devices for automatically effecting printing at the will of the operator of a total from either of said sets of accumulators under control of said set of accumulators and independently of another of said sets of accumulators.

128. In a calculating machine, the combination of a set of accumulators for accumulating a plurality of items into a total, a set of accumulators for accumulating a grand-total of a plurality of such totals, and printing mechanism operable to print duplicate records of said totals and grand-totals under control of the respective set of accumulators.

129. In a calculating machine, the combination of a set of accumulators for accumulating a plurality of items into a total, a set of accumulators for accumulating a grand-total of a plurality of such totals, printing mechanism operable to print duplicate records of said totals and grand-totals under control of said accumulators, and means for rendering said printing mechanism effective and ineffective for printing in duplicate.

130. In a calculating machine, the combination of a plurality of accumulators of like denomination, an actuator therefor, and a differential stop member for controlling the actuating movements of said actuator.

131. In a calculating machine, the combination of a plurality of sets of accumulators; a plurality of actuators therefor, each of said actuators being operatively related to one of the accumulators of each set; and a plurality of differential stop members one for each actuator; and each operable for controlling a plurality of differential actuating movements of said actuators.

132. In a calculating machine, the combination of a plurality of accumulators of like denomination, an actuator therefor, a differential stop member operable for controlling a plurality of differential actuating movements of said actuator, and a series of keys for controlling said stop member.

133. In a calculating machine, the combination of a plurality of accumulators of like denominational order, actuating means therefor, stops for controlling the extent of actuation of said accumulators by said actuating means, a plurality of keys for controlling said stops, a type-carrier, and a plurality of printing types movably mounted on said type-carrier and operable for printing on a record sheet the digits which are accumulated on said accumulators.

134. In a calculating machine, the combination of a plurality of accumlators of like denomination, a setting member for controlling operation of said accumulators, and an indicator other than a setting member and operable by said setting member for indicating the number being registered, the construction and arrangement being such that said indicator always remains at rest during the time that the amount indicated thereon is being registered on any of said accumulators under the control of said setting member.

135. In a calculating machine, the combination of a plurality of accumulators of like denomination, a single actuator for actuating a plurality of said accumulators, a setting device for controlling the extent of actuation of said actuator and indicating each number to be registered on said accumulators, and a device other than said setting device and operable for temporarily indicating the numbers to be registered on said accumulators.

136. In a calculating machine, the combination of a plurality of sets of accumulators, actuating mechanism therefor, a set of indicators common to a plurality of said sets of accumulators for indicating items accumulated on said sets of accumulators, and means whereby said indicators may be caused to indicate the total amount accumulated on either set of a plurality of said sets of accumulators.

137. In a calculating machine, the combination of a plurality of sets of accumulators, actuating members for causing said accumulators to accumulate items, a set of dials, and means for transferring to said dials the total amount accumulated on either of said sets of accumulators.

138. In a calculating machine, the combination of a device for accumulating numbers into totals, a device for accumulating a plurality of such totals into grand-totals, a plurality of numeral keys provided with means for automatically returning them to normal position for controlling said devices, and an indicator other than a numeral-key and operable by said numeral keys for indicating the number being registered.

139. In a calculating machine, the combination of a plurality of sets of accumulating devices, each set comprising means for accumulating sub-totals and grand-totals of series of numbers independent of those accumulated by the other of said sets; a plurality of sets of controlling keys provided with means for automatically returning them to normal position, one set for each of said sets of accumulating devices and operable to control its respective set of accumulating devices; and indicating means other than recording means, for indicating the numbers registered on any of said sets of accumulating devices.

140. In a calculating machine, the combination of a plurality of sets of accumulators, printing mechanism common to a plurality of said sets of accumulators for printing items accumulated on each of such sets of accumulators, key mechanism common to a plurality of said sets of accumulators for determining items to be accumulated on each set of a plurality of said sets of accumulators and printed by said printing mechanism, and a carriage comprising means for supporting and backing a record sheet and operable for moving said record sheet relatively to said printing mechanism to a plurality of columnar print-receiving positions.

141. In a calculating machine, the combination of a plurality of sets of accumulators, printing mechanism common to a plurality of said sets of accumulators for printing items accumulated on each of said sets, key mechanism common to a plurality of said sets of accumulators and to said printing mechanism for determining items to be accumulated on each of such sets and printed by said printing mechanism, and a carriage adapted to carry a record sheet and move the same transversely of said printing mechanism, whereby items related to one set of said sets of accumulators may be printed in one column, and items related to another set of said sets of accumulators may be printed in another column.

142. In a calculating machine, the combination of a plurality of sets of accumulators, printing mechanism common to a plurality of said sets of accumulators for printing items accumulated on each of such sets of accumulators, mechanism comprising a plurality of keys and operable for effecting simultaneous accumulation by a plurality of said sets of accumulators of an item determined by a single setting of the keys representing such item, and for effecting printing of such item by said printing mechanism, and a carriage comprising means for supporting and backing a record sheet and operable for moving said record sheet relatively to said types for effecting printing of items in a plurality of columns on said record sheet.

143. In a calculating machine, the combination of a set of accumulators for accumulating items into sub-totals, a set of accumulators for accumulating a grand-total of a plurality of said sub-totals, and a case for said machine provided with openings for normally exposing to the view of the operator only such numerals on said dials as represent the amount registered thereon.

144. In a calculating machine, the combination of a set of accumulators operable to accumulate items into totals, a set of accumulators operable to accumulate a plurality of such totals into a grand total, corresponding accumulators of both sets being of like denominational order; a plurality of actuators, one for each denominational order of accumulators and each said actuator being provided with a single row of gear teeth; and a single hand controlled operation controlling device for causing simultaneous movement of a plurality of said actuators for actuating their respective accumulators.

145. In a machine, a pair of adjacent dials, each of said dials being provided with a plurality of characters thereon, one of said dials being constructed with a plurality of sight openings arranged in alternate relation with the characters thereon, and for displaying the characters borne by the other of said dials.

146. In a calculating machine the combination of a plurality of sets of key-controlled accumulators, each set comprising an accumulator for each order of a plurality of successive decimal orders and provided with means for moving each higher order accumulator one step when the next lower order accumulator of its set has been moved ten steps, the accumulators of one of said sets being interspersed with the accumulators of another of said sets, the construction and arrangement being such that each wheel of each set of accumulators is positioned to represent its single denominational digit of the total accumulated on its respective set.

147. In a calculating machine the combination of a plurality of sets of key-controlled accumulator wheels, each set consisting of a plurality of accumulator wheels of different denominations and wheels of one set being interspersed with the wheels of another of said sets; the construction and arrangement being such that each wheel of each set of accumulators is positioned to represent its single denominational digit of the total accumulated on its respective set.

148. In a calculating machine, the combination of two sets of accumulators arranged with the accumulators of one set interspersed with the accumulators of the other set, accumulators of one of said sets being provided with sight openings for displaying characters borne by the accumulators of the other of said sets.

149. In a calculating machine, an accumulator dial consisting of a disk formed with a substantially cylindrical flange provided with a series of spaced sight-openings there-through, substantially as described.

150. In a calculating machine, a pair of cup-shaped dials, said dials being arranged with the flange of one dial extending inside the flange of the other dial, said last mentioned dial being provided with a plurality of openings in its flange for exposing portions of the enclosed flange.

151. In a calculating machine, a primary accumulator, a sleeve to which said accumulator is secured, and a secondary dial mounted to rotate on said sleeve.

152. In a calculating machine, the combination of a plurality of sets of accumulators, all of the accumulators of each set being of like denominational order; operating means for said machine; a plurality of actuating gear members, one for each said set and each adapted to actuate a plurality of accumulators of its respective set during a single complete operation of said operating means; a plurality of differently positioned stops for each gear member for controlling the actuating movement thereof; and carrying devices operable by an accumulator of a set of lower order for controlling the actuating movement of the gear member correlated with the set of accumulators of next higher order.

153. In a calculating machine the combination of a plurality of accumulators of successive denominational orders, operating means for said accumulators, means deriving its power from said operating means for carrying from each lower to the next higher accumulator, and means for delaying such carrying.

154. In a calculating machine the combination of a plurality of accumulators of successive denominational orders, operating means for said accumulators, means deriving its power from said operating means for carrying from each lower to the next higher accumulator, means for delaying such carrying, and means under the control of said lower accumlator for releasing said delaying means.

155. In a calculating machine the combination of a plurality of accumulators of successive denominational orders, operating means for said accumulators, means deriving its power from the operating means for causing carrying movement from the accumulator of lower to the accumulator of next higher order and means for delaying such carrying, the time at which such carrying is effective being under the control of the lower accumulator.

156. In a calculating machine, the combination with a numeral wheel, a spring actuated carrying mechanism; means for releasing said carrying mechanism for action and means for delaying said action, pending predetermined movements of other mechanism in said machine.

157. In a calculating machine, the combination of two sets of accumulating devices and means whereby carrying in one set furnishes motive power for carrying in the other set.

158. In a calculating machine, the combination of a toothed device for accumulating each of a plurality of series of numbers into sub-totals, a toothed device for totalizing a plurality of such sub-totals into grand-totals; and a toothed actuator all the teeth of which are immovable relatively to each other, said actuator being correlated with said devices for actuating them, and operable for actuating said devices to accumulate numbers greater than unity at a single operation of said actuator, and a printing device constructed to be governed by said toothed devices.

159. In a calculating machine, the combination of a plurality of sets of accumulators each set comprising accumulators of successive denominational orders and the accumulators of all of said sets being arranged with their axes in substantially one straight line, a carrying mechanism comprising carrying devices each for use exclusively in carrying from an accumulator of a specific denomination to the accumulator of next higher denomination, universal actuating means for controlling said accumulators, and printing mechanism for printing the items and totals thereof as accumulated on said accumlators.

160. In a calculating machine the combination of a plurality of sets of key-controlled accumulators, each set comprising an accumulator for each order of a plurality of successive decimal orders and provided with means for moving each higher order accumulator one step when the said accumulator of its set has been moved ten steps, the construction and arrangement being such that one accumulator of each set is journaled between two accumulators of another of said sets, each accumulator of each set of accumulators is positioned to represent its single denominational digit of the total accumulated on its respective set.

161. In a calculating machine the combination of a plurality of key-controlled sets of accumulators, each set comprising an accumulator for each order of a plurality of successive decimal orders and provided with means for moving each higher order accumulator one step when the said accumulator of its set has been moved ten steps, a rod, the accumulators of said sets being journaled on said rod and arranged in denominational groups each group comprising accumulators of like denominational order arranged adjacent to each other, and a plurality of actuators each common to for actuating the accumulators of a respective one of said groups, the construction and arrangement being such that each wheel of each set of accumulators is positioned to represent its single denominational digit of the total accumulated on its respective set.

162. In a calculating machine the combination of a plurality of key-controlled sets of accumulators, each set comprising an accumulator for each order of a plurality of successive decimal orders and provided with means for moving each higher order accumulator one step when the said accumulator of its set has been moved ten steps, the accumulators of said sets being arranged in denominational groups all the accumulators of any of said groups being of like denomination and unintervened by any accumulator of unlike denomination, the construction and arrangement being such that each wheel of each set of accumulators is positioned to represent its single denominational digit of the total accumulated on its respective set.

163. In a calculating machine the combination of a plurality of sets of key-controlled accumulators, each set comprising an accumulator for each order of a plurality of successive decimal orders and provided with means for moving each higher order accumulator one step when the said accumulator of its set has been moved ten steps, the accumulators of said sets being spaced apart, the accumulators of one of said sets being arranged in alternate relation with those of another of said sets, the construction and arrangement being such that each wheel of each set of accumulators is positioned to represent its single denominational digit of the total accumulated on its respective set.

164. In a calculating machine the combination of a plurality of key-controlled sets of accumulators, each set comprising an accumulator for each order of a plurality of successive decimal orders and provided with means for moving each higher order accumulator one step when the said accumulator of its set has been moved ten steps, the accumulators of said sets being spaced apart, the accumulators of one of said sets being arranged in alternate relation with those of another of said sets and being operable separately from those of another of said sets, the construction and arrangement being such that each wheel of each set of accumulators is positioned to represent its single denominational digit of the total accumulated on its respective set.

165. In a calculating machine the combination of a plurality of key-controlled sets of accumulators, each set comprising an accumulator for each order of a plurality of successive decimal orders and provided with means for moving each higher order accumulator one step when the said accumulator of its set has been moved ten steps, the accumulators of all of said sets being arranged in axial alignment in groups, all of the accumulators of each group being of like denomination and arranged adjacent to each other, the construction and arrangement being such that each wheel of each set of accumulators is positioned to represent its single denominational digit of the total accumulated on its respective set.

166. In a calculating machine, the combination of a plurality of key-controlled accumulators each provided with numbers, said accumulators being arranged in sets, each set consisting of several accumulators of different denomination orders, the several sets being arranged with one of the accumulators of each set extending between two accumulators of another set; and means provided with a plurality of sets of number stations, one set for each set of accumulators, each set of number stations being constructed to distinguish it from the other set.

167. In a calculating machine, the combination of a plurality of key-controlled accumulators each provided with numbers, said accumulators being arranged in sets, each set consisting of several accumulators of different denominational orders, the several sets being arranged with one of the accumulators of each set journaled between two accumulators of another set; and a plurality of sets of number-stations one set for each set of accumulators, each set of number-stations being arranged in a separate row parallel with the axes of the accumulators, each accumulator having its numbers arranged to register with the respective number-station.

168. A computing mechanism combining a totalizer comprising co-axial denominational digit wheels, a second totalizer comprising denominational digit wheels co-axial with those of the first totalizer, means for operating the two totalizers simultaneously, whereby computations effected on the first embrace computations effected on the second totalizer, means for affording a reading of either totalizer after the registration of each item thereon, and means for printing the numbers shown by the totalizers.

169. The combination of a plurality of registers, a plurality of number keys for controlling without actuating said registers, means which may be operated independent of said number keys for actuating said registers, and hand-operated means which may be actuated independent of said number keys and said operating means for automatically simultaneously turning said registers to zero position.

170. In a calculating machine, the combination with a plurality of sets of accumulators; of a plurality of manipulative devices, each of said devices being correlated with a respective one of said accumulators of each of a plurality of said sets of accumulators for determining the extent of actuation of its respective accumulators, the said devices being so colored that one is noticeably different from another, the resulting demarcation between said devices serving to facilitate the control of said sets of accumulators by said manipulative devices.

171. In a calculating machine, the combination with a plurality of sets of accumulators, of a plurality of rows of accumulator-controlling elements each row of which elements is correlated with for differentially controlling a respective one of said accumulators of each of a plurality of said sets of accumulators, the elements of adjacent rows being so colored as to render one of said rows noticeably different from another of said rows, the resulting demarcation between the rows of accumulator-controlling elements serving to facilitate control of said sets of accumulators by said rows of accumulator-controlling elements.

172. In a calculating machine, the combination with a plurality of sets of accumulators; of a plurality of groups of rows of manipulative elements, each row of which elements is correlated with for differentially controlling a respective one of said accumulators of each of a plurality of said sets of accumulators, the elements of adjacent groups of rows being so colored as to render one of said groups noticeably different from another of said groups, the resultant demarcation between the groups of rows of manipulative elements serving to effectually indicate punctuation with relation to a plurality of said sets of accumulators, and thereby facilitate control of such sets of accumulators.

173. In a calculating machine, the combination with a plurality of sets of accumulator dials; of a plurality of manipulative devices, each of said devices being correlated with a respective one of said accumulator dials in each of a plurality of said sets of accumulator dials for determining the extent of actuation of its respective accumulator dials, the said devices and their correlated dials being so colored that said devices are readily associated with their respective dials and that one of said devices and its respective dials are noticeably different from another of said devices and its respective dials, the resulting demarcation between said devices and between their dials in each of a plurality of said sets serving to facilitate control of said accumulator dials.

174. In a calculating machine, the combination with a plurality of sets of accumulator dials; of a plurality of rows of accumulator-controlling elements, each row of which elements is correlated with for differentially controlling a respective one of said accumulator dials in each of a plurality of said sets of accumulator dials, the elements of adjacent rows and their respective dials being so colored that said rows are readily associated with their respective dials and that one of said rows and its respective dials are noticeably different from another of said rows and its respective dials, the resulting demarcation between said rows and between their dials in each of a plurality of said sets serving to facilitate control of said accumulator dials.

175. In a calculating machine, the combination with a plurality of sets of accumulator dials; of a plurality of groups of rows of manipulative elements, each row of which elements is correlated with for differentially controlling a respective one of said accumulator dials in each of a plurality of said sets of accumulator dials, the elements of adjacent groups of rows and their respective accumulator dials being so colored that said groups of rows are readily associated with their respective dials and that one of said groups of rows of elements and its respective dials are noticeably different from another of said groups of rows of elements and its respective dials, the resultant demarcation between said groups of rows and between their dials in each of a plurality of said sets serving to effectually indicate punctuation, and thereby facilitate control of said accumulator dials.

176. In a calculating machine, the combination with a plurality of sets of accumulator dials arranged in axial alignment and denominational order, the accumulators of like denomination in a plurality of said sets being arranged adjacent to each other and unintervened by any accumulator of unlike denomination; of a plurality of manipulative devices, each of said devices being correlated with a respective one of said accumulator dials in each of a plurality of said sets of accumulator dials for determining the extent of actuation of its respective accumulator dials, the said devices and their correlated dials being so colored that said devices are readily associated with their respective dials and that one of said devices and its respective dials are noticeably different from another of said devices and its respective dials, the resulting demarcation between said devices and between their dials in each of a plurality of said sets serving to facilitate control of said accumulator dials.

177. In a calculating machine, the combination with a plurality of sets of accumulator dials arranged in axial alignment and denominational order, the accumulators of like denomination in a plurality of said sets being arranged adjacent to each other and unintervened by any accumulator of unlike denomination; of a plurality of rows of accumulator-controlling elements, each row of which elements is correlated with for differentially controlling a respective one of said accumulator dials in each of a plurality of said sets of accumulator dials, the elements of adjacent rows and their respective dials being so colored that said rows are readily associated with their respective dials and that one of said rows and its respective dials are noticeably different from another of said rows and its respective dials, the resulting demarcation between said rows and between their dials in each of a plurality of said sets serving to facilitate control of said accumulator dials.

178. In a calculating machine, the combination with a plurality of sets of accumulator dials arranged in axial alignment and denominational order, the accumulators of like denomination in a plurality of said sets being arranged adjacent to each other and unintervened by any accumulator of unlike denomination; of a plurality of groups of rows of manipulative elements, each row of which elements is correlated with for differentially controlling a respective one of said accumulator dials in each of a plurality of said sets of accumulator dials, the elements of adjacent groups of rows and their respective accumulator dials being so colored that said groups of rows of elements are readily associated with their respective dials and that one of said groups of rows of elements and its respective dials are noticeably different from another of said groups of rows of elements and its respective dials, the resultant demarcation between said groups of rows and between their dials in each of a plurality of said sets serving to effectually indicate punctuation, and thereby facilitate control of said accumulator dials.

179. In a calculating machine, the combination of a plurality of sets of accumulator dials; a plurality of indicator dials, each indicator dial being correlated with for indicating what is to be accumulated on a respective one of said accumulator dials of each of a plurality of said sets of accumulator dials; and a plurality of manipulative devices, each of said manipulative devices being correlated with a respective accumulator dial in each of a plurality of said sets of accumulator dials and with a respective indicator dial for controlling what shall be accumulated by its respective accumulator dials and indicated by its respective indicator dial, the said sets of accumulator dials and the said indicator dials and the said manipulative devices being so colored that each of said manipulative devices and its respective accumulator and indicator dials are readily associated and that one of said manipulative devices and its respective accumulator dials and its respective indicator dial are noticeably different from another of said manipulative devices and its respective accumulator dials and its respective indicator dial, the resultant demarcation between said devices and between their accumulator dials in each of a plurality of said sets and between their indicator dials serving to facilitate control of said accumulator dials and indicator dials.

180. In a calculating machine, the combination of a plurality of sets of accumulator dials; a plurality of indicator dials, each indicator dial being correlated with for indicating what is to be accumulated on a respective one of said accumulator dials of each of a plurality of said sets of accumulator dials; and a plurality of rows of accumulator-controlling elements, each row of which elements is correlated with for differentially controlling a respective one of said accumulator dials of each of a plurality said accumulator dials of each of a plurality of said sets of dials and a respective one of said indicator dials, the elements of adjacent rows and their respective accumulator and indicator dials beng so colored that each of said rows is readily associated with its respective accumulator and indicator dials and that one of said rows and its respective accumulator and indicator dials are noticeably different from another of said rows and its respective accumulator and indicator dials, the resultant demarcation between said rows and between their accumulator dials in each of a plurality of said sets and between their indicator dials serving to facilitate control of said accumulator dials and indicator dials.

181. In a calculating machine, the combination of a plurality of sets of accumulator dials; a plurality of indicator dials, each indicator dial being correlated with for indicating what is to be accumulated on a respective one of said accumulator dials of each of a plurality of said sets of accumulator dials; and a plurality of groups of rows of manipulative elements, each row of which elements is correlated with for differentially controlling a respective one of said accumulator dials in each of a plurality of said sets of accumulator dials and a respective one of said indicator dials, the elements of adjacent groups of rows and their respective accumulator and indicator dials being so colored that each of said groups of rows and its respective accumulator and indicator dials are noticeably different from another of said groups of rows and its respective accumulator and indicator dials, the resultant demarcation between said groups of rows and between their accumulator dials in each of a plurality of said sets accumulator dials and between their indicator dials serving to effectually indicate punctuation, and thereby facilitate control of said accumulator dials and said indicator dials.

182. The combination with an operating mechanism, of a total counter having elements of successive denominational orders for counting the number of operations of said operating mechanism in each of a plurality of series of operations of the same, means for carrying from the element of each lower denomination to the element of the next higher denomination of said total counter, a grand total counter having elements of successive denominational orders for counting the number of operations in a plurality of such series of operations of said operating mechanism, means for carrying from the element of each lower denomination to the element of the next higher denomination of said grand total counter, and means whereby the consecutive number of each operation of said operating mechanism may be printed on a record sheet as counted, the construction and arrangement being such that the carrying means of either of said counters is incapable of causing carrying in the other of said counters.

183. The combination of a plurality of sets of counters, printing mechanism, operating mechanism, means co-operative with said operating mechanism for operating said counters to separately register the number of operations of said operating mechanism in a plurality of sets of operations thereof and for causing said printing mechanism to print consecutive numbers, and manipulative devices for causing said printing mechanism to print a total from any one of a plurality of said counters at the will of the operator.

184. The combination with operating mechanism, of a set of total accumulators, each accumulator of said set of total accumulators being provided with means for carrying from each lower to the next higher accumulator of its set, a key mechanism comprising finger pieces for controlling the extent of actuation of said accumulators by said operating mechanism whereby totals of series of items may be accumulated on said accumulators the construction and arrangement being such that said finger pieces are not dependent on being variably moved by said actuating mechanism for exercising said control, a set of grand-total accumulators each accumulator of said set of grand total accumulators being provided with means for carrying from each lower to the next higher accumulator of its set and operable for accumulating a grand-total of a plurality of such totals, the construction and arrangement being such that the carrying means of any of said sets of accumulators is incapable of causing carrying in any other of said sets of accumulators, and means for removing said accumulators from the control of said key mechanism and causing the same to automatically count the number of operations of a series of operations of said operating mechanism, and for causing said grand-total accumulators to accumulate a grand-total of a plurality of such series of operations.

185. In a calculating machine, the combination of a plurality of sets of accumulators each set including accumulating elements of successive denominational orders arranged in axial alinement, a counting device comprising dials for counting the number of items accumulated on one of said sets of accumulators, and operating mechanism, common to, for operating a plurality of said sets of accumulators and said counting device.

186. In a calculating machine, the combination of a plurality of sets of accumulators, each of said sets of accumulators being provided with means for carrying from each lower to the next higher accumulator of its set, a counting device constructed with elements of successive denominational orders and operable for counting the number of items accumulated on one of said sets of accumulators, means for carrying from each element of lower denomination to the element of the next higher denomination of said counting device, the construction and arrangement being such that the carrying means of any of said sets of accumulators is incapable of causing carrying in any other of said sets of accumulators or in said counting device and that the carrying means of said counting device is incapable of causing carrying in any one of said sets of accumulators, operating mechanism, common to, for operating a plurality of said sets of accumulators and said counting device, and means for rendering said counting device ineffective for counting.

187. In a calculating machine, the combination of a plurality of sets of accumulators, each of said sets of accumulators being provided with means for carrying from each lower to the next higher accumulator of its set, a plurality of counting devices each constructed with elements of successive denominational orders and operable for separately registering the number of items comprising the amount accumulated on each of a plurality of said sets of accumulators, means for carrying from each element of lower denomination to the element of the next higher denomination of said counting devices, the construction and arrangement being such that the carrying means of any of said sets of accumulators is incapable of causing carrying in another of said sets of accumulators or in any of said counting devices and that the carrying means of any of said counting devices is incapable of causing carrying in another of said counting devices or in any of said sets of accumulators, printing mechanism for printing such items, and the consecutive numbers thereof, and means for causing said printing mechanism to print totals from each of said counting devices.

188. The combination with a plurality of sets of accumulators each set comprising a separate accumulator for each denomination and arranged in successive denominational order, each accumulator of each denominational order except the highest of each of said sets being provided with means for carrying from each lower accumulator to the accumulator of the next higher denominational order, the accumulators of all of said sets being arranged (on a common shaft) of a set of pivoted actuators each actuator of said set being operable to actuate the accumulators of a respective denomination the axes of which actuators are arranged substantially in a straight line, which is other than and parallel with the first said straight line.

189. The combination of a plurality of counters, each operable to count the number of its operations, and mechanism common to a plurality of said counters for effecting simultaneous clearing of the same.

190. In a calculating machine, the combination of an accumulating mechanism including accumulating elements of successive denominational orders arranged in axial alinement, a plurality of sets of counters for separately registering the number of items comprising each of a plurality of totals accumulated on said accumulating mechanism, and mechanism for simultaneously clearing a plurality of said sets of counters.

191. In a calculating machine, the combination of a plurality of sets of accumulators the accumulators of each set being arranged in successive denominational order and in axial alinement; a plurality of counting devices; means operable to effect accumulating of a plurality of items by one of said sets of accumulators and counting of said items by one of said counting devices; means for clearing the said set of accumulators and the said counting device, the construction and arrangement being such that the respective amounts are retained and totalized on another of said sets of accumulators and on another of said counting devices, whereby the grand-total of a plurality of series of items and the number of items comprising such grand-total may be obtained.

192. In a calculating machine, the combination of a plurality of sets of accumulators, the accumulators of each set being arranged in successive denominational order and in axial alinement, a plurality of counting devices one for each of a plurality of said sets of accumulators, and means for turning one of said sets of accumulators and its respective counting device to zero without disturbing another of said sets of accumulators and its respective counting device.

193. In a calculating machine, the combination of a set of accumulators comprising accumulating elements of successive denominational orders arranged in axial alinement and operable for accumulating a plurality of items into a total, a total counter operable for automatically counting the number of items in each total accumulated by said set of accumulators, and a grand-total counter operable for registering the grand-total of the number of items accumulated by said set of accumulators in accumulating a plurality of totals which are separately counted by the first said counter.

194. In a calculating machine, the combination of a toothed device for accumulating each of a plurality of series of numbers into sub-totals; a toothed device for totalizing a plurality of such sub-totals into grand-totals, and toothed actuating means, said actuating means being correlated with said devices for actuating them, and operable for actuating said devices to accumulate numbers, and a printing device constructed to be governed by said toothed devices.

195. The combination of a printing mechanism operable for impressing a plurality of sets of type at each of a plurality of operations, of a counter automatically operable for counting the number of printing operations in each of a plurality of series of operations of said printing mechanism, a device for automatically registering the number of operations of said printing mechanism in a plurality of series of operations, universal operating means for said printing mechanism, said counter and said device, means for rendering the operation of one of said sets of type by said operating means ineffective, the construction and arrangement being such that said counter and device may indicate the number of items printed singly and the number printed in duplicate.

196. In a calculating machine, the combination of a plurality of sets of accumulators, each of said sets of accumulators comprising accumulating elements of successive denominational order arranged in axial alinement, a platen, printing mechanism for printing on said platen the items accumulated on said accumulators, a counting device for counting the number of items accumulated on one of said sets of accumulators, and a printing device for automatically printing on said platen the consecutive numbers of the items counted.

197. In a calculating machine, the combination of a plurality of sets of accumulators each of said sets of accumulators comprising accumulating elements of successive denominational order arranged in axial alinement, a separate counter for each of a plurality of said sets of accumulators, a printing device automatically operable to print the consecutive numbers of the items counted on one of said counters, and manipulative means for controlling printing by said printing device, of a total from any of said counters.

198. In a calculating machine, the combination of a plurality of sets of accumulators each of said sets of accumulators comprising accumulating elements of successive denominational order arranged in axial alinement; printing mechanism for printing items accumulated on said sets of accumulators; a plurality of counters, one for each of a plurality of said sets of accumulators for registering the number of items comprising the amount accumulated on the respective set of said accumulators; a printing device for printing the consecutive numbers of items accumulated on said sets of accumulators; and manipulative devices for causing said printing mechanism and said printing device to print the totals from any one of a plurality of said sets of accumulators and from the respective counter, counting by said counters being automatically suspended during total printing operations of said machine.

199. In a calculating machine, the combination with a plurality of sets of main accumulators, of an auxiliary accumulating device operable to accumulate items independently of the accumulating of items by said main accumulators, key mechanism for controlling the amounts to be accumulated on said sets of main accumulators and on said auxiliary accumulating device, and means for removing the auxiliary accumulating device from the control of said key mechanism and causing it to automatically count the number of items accumulated on one of said sets of main accumulators.

200. In a calculating machine, the combination of a plurality of sets of number keys; a plurality of sets of accumulators, each set consisting of a plurality of accumulators of like denomination, there being a greater number of sets of accumulators than there are sets of keys; and a plurality of actuators, one for each set of accumulators, each said set of keys being correlated with for controlling a respective one of said actuators and thereby controlling one of said sets of accumulators.

201. In a calculating machine, the combination of a plurality of sets of accumulators, each set comprising a whole number accumulator and a fraction accumulator, the accumulators of each set being arranged in axial alinement; and common operating mechanism for said sets of accumulators.

202. In a calculating machine, the combination of a set of accumulators operable to accumulate a series of items consisting of whole numbers and fractions into a total, a set of accumulators operable to accumulate a plurality of such totals into a grand total, each of said sets of accumulators comprising accumulating elements arranged in progressive denominational order and in axial alinement, and operating means common to said sets of accumulators.

203. In a calculating machine, the combination of a plurality of sets of accumulators each set comprising accumulating elements of progressive denominational orders arranged in axial alinement, common operating means for a plurality of said sets of accumulators, and means for locking one of said sets of accumulators against operation while another of said sets of accumulators is being operated by said operating mechanism.

204. In a calculating machine, the combination of a plurality of sets of accumulators; printing types common to each of said sets of accumulators for printing items accumulated thereon; inking ribbon mechanism co-operative with said types to effect printing of said items; and a hand-controlled operation-controlling member for effecting accumulating by said sets of accumulators and printing by said printing types, and for effecting feeding and reversing of said inking ribbon mechanism.

205. In a calculating machine, the combination of a plurality of accumulators, an actuating mechanism adapted to simultaneously actuate two adjacent accumulators of said plurality, a key-lever adapted to control the extent of actuation of said two adjacent accumulators by said actuating mechanism, and a plurality of number keys each arranged a different distance from the pivot of said key lever, and adapted to actuate said key lever a different distance, and operating mechanism for causing said actuating mechanism to actuate said two adjacent accumulators according to the manipulation of said keys.

206. In a calculating machine, the combination of a plurality of accumulators, actuating mechanism for causing said accumulators to accumulate items, printing mechanism for printing items accumulated on said accumulators, operating mechanism for operating said actuating and printing mechanisms, and key-controlled means for causing said operating mechanism to turn said accumulators to zero position without affecting said printing mechanism.

207. In a calculating machine, the combination of a plurality of sets of accumulators, each of said sets comprising a plurality of accumulators of successive denominational order; a plurality of numeral types common to a plurality of said sets of accumulators for printing the items accumulated thereon; a plurality of types operable to print matter other than numerals; and a plurality of sets of keys arranged on a common keyboard, the keys of one set being constructed to control when depressed, the printing of numbers by said numeral types and the accumulating by a plurality of said sets of accumulators of the numbers printed, and the keys of another of said sets being constructed to control when depressed, the printing of matter other than numerals by the second said plurality of types.

208. In a calculating machine, the combination of a plurality of sets of accumulators operable so that one of said sets of accumulators may accumulate a total different from the total accumulated by any other of said sets of accumulators, each of said sets comprising a plurality of accumulators of successive denominational order; a plurality of sets of numeral types, one set for each denomination of said accumulators and each set common to the accumulators of like denomination of a plurality of said sets; a set of numeral keys common to a plurality of said sets of accumulators and constructed to control when depressed the accumulating of items by said sets of accumulators and the printing of such items by said numeral types; a hand-controlled operation-controlling member for effecting printing by said numeral types and accumulating by said accumulators of items according to the control of said numeral keys; a plurality of types for printing matter other than items accumulated by said sets of accumulators; and a set of keys for controlling printing by the last said plurality of types, both of said sets of keys being arranged on a common keyboard.

209. In a calculating machine the combination of a set of accumulators, printing means including an arbitrary number printing mechanism, counting means including total and grand total counting mechanisms, and a universal operating mechanism for said accumulators, printing means and counting means, whereby the machine can be operated to cause said accumulators to accumulate a plurality of items into a total and said counting means to automatically count the number of items in each said total and to register the grand total of the number of such items, and the printing means to print the items accumulated together with related arbitrary numbers.

210. In a calculating machine, a plurality of accumulating devices, an actuating mechanism for actuating said accumulating devices, a plurality of series of keys for controlling without actuating said accumulating devices, a plurality of substantially independent and coincidently operated indicators for each series, a rock arm support for the indicators and adapted to swing or oscillate the indicators, in combination with intermediate mechanism between the keys and the rock arm supports, whereby the movement of the keys is transmitted to and actuates the indicators.

211. In a calculating machine, a plurality of accumulating devices, an actuating mechanism for actuating said accumulating devices, a plurality of series of keys for controlling without actuating said accumulating devices, and an oscillating segmental item indicator for each series, adapted to indicate the particular key operated, in combination with intermediate mechanism between the keys and the indicators, whereby the movement of the keys is transmitted to and actuates the indicators.

212. In a calculating machine, a plurality of accumulating devices, an actuating mechanism for actuating said accumulating devices, a plurality of series of keys for controlling without actuating said accumulating devices, and an independent oscillating segmental item indicator for each series adapted to indicate the particular key operated, in combination with intermediate mechanism between the keys and the indicators, whereby the movement of the keys is transmitted to and actuates the indicators.

213. In a calculating machine; the combination of a sub total accumulator and a grand total accumulator; a printing mechanism therefor; depressible keys for controlling said accumulators and said printing mechanism; and means correlated with said accumulators, printing mechanism, and keys, whereby each group of a plurality of groups of items may under the control of said keys be separately totalized on said sub total accumulators and whereby each item of each of said groups of items may be printed by said printing mechanism under the control of said keys, and whereby each total of each of said groups of items may be printed by said printing mechanism under the control of said sub total accumulator, and whereby a grand total of all of said totals may be accumulated on said grand total accumulator, under the control exercised by said keys for said totalization of said groups of items.

214. In a calculating machine; the combination of a sub total accumulator and a grand total accumulator; a printing mechanism therefor; depressible keys for controlling said accumulators and said printing mechanism; and means correlated with said accumulators, printing mechanism and keys whereby each group of a plurality of groups of items may under the control of said keys be separately totalized on said sub total accumulators and whereby each item of each of said group of items may be printed by said printing mechanism under the control of said keys, and whereby each total of each of said groups of items may be printed by said printing mechanism under the control of said sub total accumulator, and whereby a grand total of all of said totals may be accumulated on said grand total accumulator, under the control exercised by said keys for said totalization of said groups of items, and an indicating mechanism under the control of said keys for visibly indicating at each successive item adding operation the amount which is being accumulated on said sub total accumulator.

215. In a calculating machine; the combination of a sub total accumulator and a grand total accumulator; a printing mechanism therefor; depressible keys for controlling said accumulators and said printing mechanism; and means correlated with said accumulators, printing mechanism, and keys, whereby each group of a plurality of groups of items may under the control of said keys be separately totalized on said sub total accumulators and whereby each item of each of said group of items may be printed by said printing mechanism under the control of said keys, and whereby each total of each of said groups of items may be printed by said printing mechanism under the control of said sub total accumulator, and whereby a grand total of all of said totals may be accumulated on said grand total accumulator under the control exercised by said keys for said totalization of said groups of items, and whereby the grand total registered on said grand total accumulator may be printed by said printing mechanism under the control of said grand total accumulator.

216. In a cash register the combination of a plurality of groups of sets of key-controlled accumulators, the accumulators of each of said sets being associated by suitable tens carrying mechanism, the accumulators of one set being interspersed with the accumulators of another set of the same group, actuating means for each group and means for simultaneously computing in a set of accumulators of each group.

217. In a cash register the combination of a plurality of groups of sets of key-controlled accumulators the accumulators of one set being interspersed with the accumulators of another set of the same group, actuating racks for each group under the control of manipulative amount determining means and means for simultaneously inserting an amount in a set of accumulators of each group.

218. In a cash register the combination of a plurality of groups of sets of key-controlled accumulators, the accumulators of one set being interspersed with the accumulators of another set of the same group, actuating means for each group, means for simultaneously inserting a number in a set of accumulators of each group and means for indicating the total of any set in any group.

219. In a cash register the combination of a plurality of groups of sets of key-controlled accumulators the accumulators of one set being interspersed with the accumulators of another set of the same group, actuating racks for each group under the control of manipulative amount determining means, means for simultaneously inserting an amount in a set of accumulators of each group, and means for visibly indicating the total standing on any set of accumulators of any group.

220. The combination with printing mechanism operable for impressing a separately adjustable type in columnar positions on a work sheet, a longitudinally movable carriage for determining such printing position on said work sheet, a counter automatically operable for counting the number of printing operations of said printing mechanism in each of a plurality of said columns, and a device for automatically registering the total number of printing operations of said printing mechanism in said plurality of columns.

221. In a calculating machine, the combination of a plurality of sets of accumulators, manipulative devices common thereto for controlling the entering of numbers on said accumulators, a plurality of controlling keys for said sets of accumulators whereby any desired one of said accumulators may be selected for total printing operations, and printing mechanism controllable by any of said controlling keys for effecting printing of the total of the corresponding set of accumulators under control of said corresponding set of accumulators.

222. In a calculating machine the combination of a plurality of sets of accumulating devices, common manipulative devices for controlling the items entered on either of said accumulating devices, a common printing device for printing the accumulated items and the totals thereof at will, an arbitrary sign printing device operable to print, an arbitrary sign in conjunction with any of said items, manipulative sign printing controlling devices for controlling the said arbitrary sign printing device and an operating mechanism for causing said accumulating devices to accumulate items and said printing devices to print under control of said manipulative devices or causing the totals of said items to be printed at the will of the operator, with or without designating signs.

223. In a calculating machine, the combination of a plurality of accumulators of like denomination, and a plurality of movable accumulator controlling keys provided with mechanism for automatically returning them to normal position, any single one of which keys may be operated for controlling and permitting actuation of a plurality of said accumulators during a single complete operation of said machine, and automatic means for restoring either of said accumulators to zero, by an operation of the machine.

224. In a calculating machine, a plurality of sets of accumulators and a single set of number keys provided with mechanism for automatically returning them to normal position any single one of which may be operated for simultaneously controlling the accumulating movements and permitting actuation of a plurality of said sets of accumulators to an extent exceeding unity at a single operation, with provision for resetting either of said sets of accumulators automatically, by an operation of the machine.

225. The combination of a plurality of sets of accumulators, each of said sets comprising accumulators of successive denominational orders, accumulators of one set being of the same denominational orders as accumulators of another of said sets; actuators operable to actuate a plurality of said accumulators of the same denomination, means for automatically turning either one of said sets of accumulators to zero at the will of the operator independent of the other of said sets by an operation of the machine; and a shield apertured for constantly displaying to the operator the amounts standing on said sets of accumulators.

226. The combination with an actuator whose extent of movement is controllable by any one of a plurality of manipulative devices having gear teeth of a pinion which may be engaged by said actuator, a plurality of accumulators all associated with the same pinion and adapted to be actuated by the same actuator through the medium of said pinion.

227. In a calculating machine, the combination of a plurality of accumulators of like denomination and a single actuator for causing actuation of a plurality of said accumulators for registering numbers on each of said accumulators, and a printing mechanism operable at the will of the operator to print the total accumulated on either of said accumulators.

228. In a machine of the class described, the combination of a plurality of accumulators of like denomination, an actuator therefor adapted to partially rotate said accumulators through angles which may be varied at the will of the operator, printing mechanism adapted to print groups of items with their totals, and coincidentally accumulate a grand total of all said groups of items.

229. In a calculating machine, the combination of a plurality of accumulators of the same denomination, a printing mechanism, an actuating mechanism correlated with a plurality of said accumulators for actuating the same and being normally inoperative with relation to said accumulators and being capable of moving independently of the latter, a set of number-keys so correlated with said actuating mechanism and with said accumulators that by the depression of any one of said number keys the said actuating mechanism is thereby rendered operative with relation to a plurality of said accumulators and is controlled for actuating said accumulators according to the number key depressed, one of said accumulators being returnable to zero without disturbing the accumulation on another of said accumulators, whereby the separate totals of groups of items successively set up on the number keys, may be printed in conjunction with said group of items.

230. In a calculating machine, the combination of a plurality of accumulators of the same denomination, an actuating mechanism correlated with a plurality of said accumulators for actuating the same and being normally inoperative with relation to said accumulators and being capable of moving independently of the latter, a set of number keys so correlated with said actuating mechanism and with said accumulators that by the depression of any one of said number keys the said actuating mechanism is thereby rendered operative with relation to a plurality of said accumulators and is controlled for actuating said accumulators according to the number key depressed, one of said accumulators being returnable to zero automatically by an operation of the machine without disturbing the accumulation on another of said accumulators.

231. In a calculating machine, the combination of a plurality of sets of accumulators, a recording mechanism, mechanism for effecting different operations of any desired set of accumulators, a plurality of cams for controlling said mechanism to effect said different operations, and means for making any desired cam effective or ineffective, whereby the amount standing on any of said sets of accumulators may be recorded.

232. In a calculating machine, the combination of a plurality of sets of accumulators, operating means therefor, a depressible key for causing said operating means to clear one of said sets of accumulators, and locking means for locking said key in a depressed position, prior to the operation of said operating means said locking means being releasable by said operating means.

233. In a calculating machine, the combination with a sub-total set of accumulators, of a grand total set of accumulators; and printing devices including type carriers common to said two sets of accumulators for printing the total from either set as desired.

234. In a calculating machine, the combination of a plurality of accumulators of like denomination, a single actuator for actuating a plurality of said accumulators, a printing device controllable by said actuator and said accumulators, a setting device for controlling the extent of actuation of said actuator and indicating each number to be registered on said accumulators, and a device other than said setting device and operable for temporarily indicating the adjustment of said printing mechanism under control of said accumulators.

235. In a calculating machine, the combination of a sub-total set of accumulators, of a grand total set of accumulators; means for resetting each of said sets of accumulators to zero independently of the other; and printing devices including type carriers common to said two sets of accumulators for printing the total from either of said sets as desired.

236. In a calculating machine, the combination of a plurality of sets of accumulators, printing mechanism common to a plurality of said sets of accumulators for automatically printing items accumulated on each of such sets of accumulators and totals under control of said accumulators, key mechanism common to a plurality of said sets of accumulators for determining items to be accumulated simultaneously on each set of a plurality of said sets of accumulators and printed by said printing mechanism, and a carriage comprising means for supporting and backing a record sheet and operable for moving said record sheet relatively to said printing mechanism to a plurality of columnar print-receiving positions, whereby items accumulated in one set of accumulators may be printed in one column and items accumulated in another set of accumulators may be printed in another column.

237. In a calculating machine, the combination of a plurality of sets of accumulators, printing mechanism common to a plurality of said sets of accumulators for printing items accumulated on any of said sets, key mechanism common to a plurality of said sets of accumulators and to said printing mechanism for determining items to be accumulated on any of such sets and printed by said printing mechanism, and a carriage adapted to carry a record sheet and move the same transversely of said printing mechanism whereby items related to one set of said sets of accumulators may be printed in one column, and items related to another set of said sets of accumulators may be printed in another column, and automatic means under control of the operator for effecting the clearing of said sets of accumulators by an operation of the machine.

238. In a calculating machine, the combination of a set of accumulators for accumulating items into sub-totals, a set of accumulators for accumulating a grand-total of a plurality of said sub-totals, means for automatically erasing said totals upon an operation of the machine, and a case for said machine provided with openings for normally exposing to the view of the operator only such numerals on said accumulators as represent the amount registered thereon.

239. In a calculating machine the combination of two sets of accumulator dials, each set comprising a dial for each order of a plurality of successive decimal orders, all of the dials of any of said sets embracing only single digital values, the dials of one of said sets being interspersed with the dials of the other of said sets, the construction and arrangement being such as to enable the dials of either set to display the total accumulated on the respective set.

240. In a calculating machine, the combination with a plurality of sets of accumulator dials; of a plurality of rows of accumulator-controlling elements, each row of which elements is correlated with for differentially controlling a respective one of said accumulator dials in each of a plurality of said sets of accumulator dials, the elements of adjacent rows and their respective dials being so colored that said rows are readily associated with their respective dials and that one of said rows and its respective dials are noticeably different from another of said rows and its respective dials, the resulting demarcation between said rows and between their dials in each of a plurality of said sets serving to facilitate control of said accumulator dials.

241. In a calculating machine, the combination of a plurality of sets of accumulators, each set including accumulating elements of successive denominational order, a counting device comprising dials for counting the number of items accumulated on one of said sets of accumulators, and operating mechanism common to and for operating a plurality of said sets of accumulators and said counting device, and means for printing the amount standing on said dials.

242. In a calculating machine, the combination of a set of accumulators operable for accumulating a plurality of items into a total, a total counter operable for automatically counting the number of items in each total accumulated by said set of accumulators, and a grand-total counter operable for registering the grand-total of the number of items accumulated by said set of accumulators in accumulating a plurality of totals which are separately counted by the first said counter, with provisions for automatically printing the totals from said counters.

243. The combination with printing mechanism operable for impressing type at a predetermined location on a work sheet, a longitudinally movable work sheet supporting member for determining the printing location, of a counter automatically operable for counting the number of printing operations in each of a plurality of series of operations of said printing mechanism, a device for automatically registering the number of operations in a plurality of such series of operations, and means operable for printing the consecutive numbers of each operation of said printing mechanism under control of said device.

244. In a calculating machine, the combination of a plurality of sets of number keys; a plurality of sets of accumulators, each set consisting of a plurality of accumulators of like denomination, means whereby all the accumulators of one set may control all the accumulators of another set including suitable tens carrying mechanism, there being a greater number of sets of accumulators than there are sets of keys; and a plurality of actuators, one for each set of accumulators, each said set of keys being correlated with for controlling a respective one of said actuators and thereby controlling one of said sets of accumulators.

245. In a calculating machine, the combination of a plurality of sets of number keys; a plurality of sets of accumulators, each set consisting of a plurality of accumulators of like denomination, there being a greater number of sets of accumulators than there are sets of keys; and a plurality of actuators, one for each set of accumulators, each said set of keys being correlated with for controlling a respective one of said actuators and thereby controlling one of said sets of accumulators, and means for clearing any of the sets of accumulators by an operation of the machine.

246. In a calculating machine, the combination of a plurality of sets of accumulators carried by a common shaft, each set comprising accumulating elements of progressive denominational orders, common operating means for a plurality of said sets of accumulators, and means for positively locking one of said sets of accumulators against operation while another of said sets of accumulators is being operated by said operating mechanism.

247. In a calculating machine, the combination of a plurality of sets of accumulators, each set comprising accumulating elements of progressive denominational orders arranged in groups with accumulators of each set of like denominational order adjacent each other, a common actuator for each group of accumulators, and means for controlling said actuator by an accumulator.

248. In a calculating machine, the combination of a plurality of sets of accumulators, each set comprising interspersed accumulating elements of progressive decimal denominational orders arranged in groups with accumulators of each set of like denominational order adjacent each other, a common actuator for each group of accumulators, and means for detaining one of said sets of accumulators against operation while another of said sets of accumulators is being operated by an operating means.

249. In a calculating machine, the combination of a plurality of sets of accumulators, each of said sets comprising a plurality of accumulators of successive denominational order; a plurality of numeral types common to a plurality of said sets of accumulators for printing the items accumulated thereon; a plurality of types operable to print matter other than numerals; and a plurality of sets of keys arranged on a common keyboard, the keys of one set being constructed to control when depressed, the printing of numbers by said numeral types and the accumulating by a plurality of said sets of accumulators of the numbers printed, the keys of another of said sets being constructed to control when depressed, the printing of matter other than numerals by the second said plurality of types, and means for causing said accumulators to govern the positioning of said first mentioned type.

250. In a calculating machine, the combination of a plurality of sets of accumulators operable so that one of said sets of accumulators may accumulate a total different from the total accumulated by any other of said sets of accumulators, each of said sets comprising a plurality of accumulators of successive denominational order; a plurality of sets of numeral types, one set for each denomination of said accumulators and each set common to the accumulators of like denomination of a plurality of said sets; optionally operable means for putting said types under control of said accumulators, a set of numeral keys common to a plurality of said sets of accumulators and constructed to control when depressed the accumulating of items by said sets of accumulators and the printing of such items by said numeral types; a hand controlled operation-controlling member for effecting printing by said numeral types and accumulating by said accumulators of items according to the control of said numeral keys; a plurality of types for printing matter other than items accumulated by said sets of accumulators; and a set of keys for controlling printing by the last said plurality of types, both of said sets of keys arranged on a common keyboard.

251. In a calculating machine, the combination of a plurality of sets of interspersed accumulators operable so that one of said sets of accumulators may accumulate a total different from the total accumulated by any other of said sets of accumulators, each of said sets comprising a plurality of accumulators of successive denominational order; a plurality of sets of numeral types, including a special set of type adapted to be set to identify particular items, one set for each denomination of said accumulators and each set common to the accumulators of like denomination of a plurality of said sets; a set of numeral keys common to a plurality of said sets of accumulators and constructed to control when depressed the accumulating of items by said sets of accumulators and the printing of such items by said numeral types; a hand-controlled operation-controlling member for effecting printing by said numeral types and said special type, and accumulating by said accumulators of items according to the control of said numeral keys; a plurality of types for printing matter other than items accumulated by said sets of accumulators; and a set of keys for controlling printing by the last said plurality of types, both of said sets of keys arranged on a common keyboard.

252. In a machine of the class described, the combination of a plurality of totalizers, constructed so that said totalizers comprise a plurality of denominational elements for each totalizer and arranged so that all elements of like denomination are arranged in segregated groups, a printing mechanism, and means for causing any element of a denominational group of elements to control said printing mechanism.

253. In a machine of the class described, the combination of a plurality of sets of accumulators of successive denominational order arranged so that the accumulators of one set are interspersed with the accumulators of another of said sets, a printing mechanism provided with elements corresponding to the denominational orders of accumulators, and means for controlling the printing elements by the accumulators of any set.

254. In a calculating machine, a plurality of sets of independently operable interspersed totalizer wheels, total controlling means and means for taking a total from any one of said sets at the will of the operator.

255. In a machine of the class described, the combination of a plurality of totalizers and means for operating them, said totalizers each including a series of rotatable members provided with means for causing a transfer controlling element common to a member of each series to move a given predetermined distance when a rotatable totalizer member has completed a revolution, the construction and arrangement being such that the relative positions of the rotatable members and the said element is unaltered regardless of the time of transfer.

256. In a machine of the class described, the combination of a plurality of simultaneously operable totalizers, means whereby one of said totalizers controls the accumulations on the other of said totalizers, a bank of depressible keys arranged in denominational orders, the construction and arrangement being such that only one key in a denominational order can be depressed, and locked in such position and an operation controlling member for actuating said totalizers according to the control of said depressible keys and releasing the lock for said keys.

257. In a calculating machine, the combination of two sets of accumulators arranged with the accumulators of one set interspersed with accumulators of the other set, a number key mechanism common to said sets of accumulators for controlling the extent of actuations of the accumulators, and means for neutralizing the accumulating control of said key mechanism.

258. In a calculating machine, the combination of a plurality of groups of sets of accumulators, each set comprising a plurality of accumulators of successive denominational orders, a shaft common to said plurality of groups of sets of accumulators and upon which said accumulators are arranged side by side, with a plurality of accumulators of like denominational order in adjacent relation.

259. In a calculating machine, the combination of a plurality of sets of accumulators including carrying mechanism comprising a plurality of carrying devices, each device being operable to carry from only one denomination to the next higher denomination and never from any other denomination; key mechanism comprising a plurality of keys each of which may be operated to determine a digit to be accumulated on an accumulator of each of said sets of accumulators, printing mechanism comprising a plurality of types each of which may be operated under control of said key mechanism for printing items accumulated by any of said sets of accumulators; and a paper carriage movable transversely of said printing mechanism for shifting a record sheet to receive printing by said printing mechanism in different columnar positions on said record sheet.

260. In a calculating machine, the combination of a plurality of accumulators of like denominational order, actuating means therefor, stops for controlling the extent of actuation of said accumulators by said actuating means, a plurality of keys for controlling said stops, type-carriers and means for governing the adjustment of said type carries under control of any of said accumulators.

261. In a calculating machine, the combination with two groups of totalizer wheels, actuating devices common thereto, printing type which are positioned by said actuating devices, type hammers co-operating with said positioned printing type, means under control of the operator for driving said actuating devices and operating the type hammers after the printing type are positioned.

262. In a calculating machine, the combination of a plurality of sets of independently operable accumulators of successive denominational orders, the construction and arrangement being that all accumulators of like denominational orders are grouped together, common actuating mechanism for actuating each denominational group of accumulators, and means including a plurality of manipulative devices for determining the set of accumulators to be operated.

263. In a calculating machine, the combination of a plurality of simultaneously operable groups of sets of accumulators, key controlled actuating means therefor, printing mechanism controlled by said key controlled means and by a set of accumulators, and means for simultaneously zeroizing a plurality of sets of accumulators.

264. In a calculating machine the combination of a plurality of groups of sets of accumulators, each group comprising a set of total accumulators for accumulating items into totals and a set of grand total accumulators for accumulating said totals into a grand total, a printing mechanism including a platen adjustable to different print receiving positions, the construction and arrangement being such that the items accumulated on the sets of total accumulators may be printed in columns appropriate to said accumulators and the totals accumulated in the sets of grand total accumulators may be printed in columns appropriate to said sets of grand total accumulators.

265. In a calculating machine, the combination of a set of actuators and two sets of accumulators, motion being transmitted between the actuators and the wheels of one set through the medium of the accumulators of the other set in either direction.

266. In a calculating machine, the combination of a set of actuators and two sets of accumulators connected together, motion being transmitted between the actuators and the accumulators of one set through the medium of the other set in either direction.

267. In a calculating machine, the combination of a set of actuators and two sets of accumulators, upon one of which sets of accumulators successive items or amounts can be accumulated by repeated operations of said actuators and upon the other of which sets of accumulators successive accumulations of the first set of accumulators can themselves be accumulated, motion being transmitted to the first mentiond set of accumulators through the medium of the last mentioned set of accumulators and the former capable of being reset to zero without affecting the accumulation on the latter which is itself capable of being reset to zero.

268. In a calculating machine, the combination of a set of actuators, two sets of accumulators, motion being transmitted between the actuators and the accumulators of one set through the medium of the accumulators of the other set in either direction, means common to the two sets of accumulators for imparting transfer or carrying movement thereto including tripping elements, and separate sets of transfer trippings devices, one set for each set of accumulators.

269. In a calculating machine, the combination with a plurality of actuators, of a plurality of sets of accumulators associated in groups with said actuators, one group for each of said actuators, a shield for said accumulators and apertured for constantly displaying to the operator the amounts standing on said sets of accumulators, and means for automatically causing said apertures to exhibit zeros, by an operation of the machine.

270. In a calculating machine, the combination of a plurality of sets of accumulators, the accumulators of each set being arranged in axial alignment and in successive denominational order, and means whereby each of a plurality of the accumulators of one of said sets may or may not drive an accumulator of like denominational order of another of said sets.

271. In a calculating machine, the combination of a plurality of sets of accumulators, the construction and arrangement being such that one set of accumulators normally drives the accumulators of another set, the accumulators of each set being arranged in axial alignment and in successive denominational order, and means whereby each of a plurality of the accumulators of one of said sets may be driven independently of the accumulators of like denominational order of another of said sets.

272. In a calculating machine, the combination of a plurality of sets of accumulators, a shaft, on which said accumulators are mounted, an operating mechanism for said machine, actuating means operable by said operating mechanism for actuating said accumulators to accumulate numbers, and means independent of said actuating means and operable by said operating mechanism for causing said shaft to turn one set of said accumulators to their initial positions.

273. In a calculating machine, the combination with actuating devices, of two totalizers in common operative relation thereto, carrying mechanism for each totalizer, means for rendering said carrying mechanisms operative when said totalizers are receiving numbers to be registered, and key operated means for rendering said carrying mechanisms inoperative when said totalizers are yielding the numbers registered therein; substantially as described.

274. In an adding and listing machine the combination with key controlled means for listing a series of items and accumulating the total thereof, and means for printing such total at the end of the series and clearing the machine, of a supplemental accumulator, means for transferring to said supplemental accumulator the totals of the several series of items so as to thereby accumulate upon said supplemental accumulator a grand total of all the items in the several series and means for printing such grand total from said supplemental accumulator.

275. In an adding and listing machine the combination, with means for listing a series of items and an accumulator for accumulating the total thereof, and key means and connections by depressing which means and operating the machine the total of the series of items may be printed and the accumulator cleared or reset to zero, of a supplemental accumulator for accumulating in one grand total the amount of all of the items in several successive series of items and supplemental key means and connections by depressing which means and operating the machine a grand total may be printed from said supplemental accumulator and the accumulator be cleared.

276. In an adding and listing machine, the combination, with means for listing a series of items and an accumulator for accumulating the total thereof, and a total key and connections by depressing which key and operating the machine the total of the series of items may be printed, of a supplemental accumulator means for transferring to said accumulator the totals of several series of items, so as to thereby accumulate upon said supplemental accumulator a grand total of all of the items in the several series and a supplemental total key and connections by depressing which key and operating the machine such grand total may be printed through said supplemental accumulator.

277. In an adding and listing machine, the combination, with means for listing a series of items, an accumulator for accumulating the total thereof, and a key mechanism and connections by depressing which and operating the machine the total of the series of items may be printed and the accumulator cleared or reset to zero, of a supplemental accumulator, means for transferring to said accumulator the totals of several series of items, so as to thereby accumulate upon said supplemental accumulator a grand total of all of the items in the several series, and supplemental key mechanism and connections by depressing which and operating the machine said grand total may be printed from said supplemental accumulator and the accumulator cleared.

278. In an adding and listing machine, the combination of printing type, accumulator pinions, reciprocating racks for operating the pinions and setting up the type, means for determining the extent of movement of the racks, means for controlling the engagement of the pinions and racks so as to cause them to accumulate items one by one upon the pinions as the items are listed and for returning the pinions to zero at the end of a series of items and for setting up the type to print the total of such series, an auxiliary or supplemental set of accumulator pinions, and means whereby the total amount of several successive series of items may be accumulated and preserved upon said supplemental pinions and said pinions be returned to zero and said total printed therefrom when desired.

279. In a calculating machine, means for printing items, separate totals of certain of said items, and a grand total of all the items, separate totalizers for contemporaneously registering the items constituting the separate totals, and the grand total, and means under control of the operator in form of keys for printing separate totals or a grand total as desired.

280. In a calculating machine, the combination with means for printing the item, separate totals of certain of said items and a grand total of all the items, separate totalizers for registering the items constituting the separate totals, and connections between said totalizers whereby the elements of one of said totalizers may control the elements of another totalizer independent of the item controlling means.

281. In a calculating machine, the combination of a key-board for controlling a set of actuators, a set of key controlled actuators, a plurality of sets of register wheels in cooperative relation to said actuators, there being denominational control of said register wheels by said actuators whereby one set of register wheels may be placed in control of another independently of the key-board.

282. In combination, a plurality of registers having entries, a record, and means for clearing said registers one after the other and for transferring their indications to said record.

283. In a machine of the class described, a plurality of accounting devices, means for accumulating amounts thereon, a printing mechanism and means for automatically clearing said accounting devices and for transferring their indications to said printing mechanism.

284. In a calculating machine, the combination of a plurality of sets of accumulators, number keys for controlling the items accumulated on either of said sets of accumulators, a printing device for printing the items accumulated on either of said sets of accumulators, a special sign printing device operable to print a special sign in conjunction with any of the items accumulated on either of said accumulators, a key for controlling operation of said special sign printing device, and operating mechanism for operating said accumulators and item printing device according to the control of said number keys and for operating said special sign according to the control of its key.

285. In a machine of the class described, a plurality of accounting devices, a printing mechanism, common actuators for the accounting devices and printing mechanism, and means for automatically clearing said accounting devices and causing said actuators to transfer their indications to said printing mechanism.

286. In a machine of the class described, the combination of a plurality of totalizers, actuators common to all of said totalizers, item entering means for controlling said actuators to enter items in any desired totalizer, printing means common to all of said totalizers for printing the totals of the items entered in said totalizers and automatically returning them to zero, and means for selecting a totalizer for a total printing operation.

287. In a machine of the class described, the combination of a main operating device, a plurality of totalizers, actuators common to all of said totalizers movable during item entering, subtotal or grand total printing operations from either of said totalizers, item entering means operable as a preliminary to an operation of the main operating device for controlling said actuators during item entering operations, and manipulative means also operable as a preliminary to an operation of the main operating device for predetermining whether the succeeding operation is to be an item entering, or a sub-total or grand total printing operation.

288. The combination of two sets of accumulators each of said sets having its accumulators arranged in axial alignment and in progressive denominational order, means operable for controlling accumulations on one of said sets of accumulators, means whereby accumulators of this set of accumulators may control accumulations on accumulators of like denominations of another of said sets of accumulators according to the accumulations on the controlling set of accumulators, and means for clearing or resetting to zero one of said sets of accumulators without affecting the other set, with provisions for printing a total at the will of the operator.

289. In a registering machine, a set of sub-totalizer elements, a set of grand totalizer elements, means for simultaneously entering items on each of said sets, graduated elements movable by said sub-totalizer elements, contact means movable into engagement with said graduated elements, type means adjustable under control of said contact means and said graduated elements to positions corresponding to the amount standing on the sub-totalizer elements, means for taking an impression from said type means, means for restoring said sub-totalizer elements to zero position and a common operating mechanism adapted at a single operation to impel said contact means against said graduated elements, adjust said type means, take a total impression from said type means and restore said sub-totalizer elements to zero.

290. In a registering machine, a set of sub-totalizer elements, a set of grand totalizer elements, means for simultaneously entering items on each of said sets, graduated elements movable under the control of said sub-totalizer elements, pivoted feeler fingers movable into engagement with said graduated elements, type means adjustable under control of said feeler fingers and said graduated elements to positions corresponding to the amount standing on the sub-totalizer elements, means for taking an impression from said type means, means for restoring said sub-totalizer elements to zero position and a common operating mechanism adapted at a single operation to impel said feeler fingers against said graduated elements, adjust said type means, take a total impression from said type means and restore said sub-totalizer elements to zero, without restoring to zero said grand total elements.

291. In a registering machine, a set of sub-totalizer wheels, a set of grand totalizer wheels, means for simultaneously entering items on each of said sets, spirally graduated plates movable under control of said sub-totalizer wheels, pivoted feeler fingers movable into engagement with said plates, type means adjustable under control of said feeler fingers and said plates to positions corresponding to the amount standing on the sub-totalizer wheels, means for taking an impression from said type means, means for turning said sub-totalizer wheels to zero position and a common operating mechanism adapted at a single operation to impel said feeler fingers against said plates, adjust said type means, take a total impression from said type means and turn said sub-totalizer wheels to zero, without turning said grand totalizer wheels to zero.

292. In a registering machine, a set of sub-totalizer wheels, a shaft supporting said wheels, means for entering items on said wheels, graduated elements movable under the control of said sub-totalizer wheels, contact means movable into engagement with said graduated elements, type means adjustable under control of said contact means and said graduated elements to positions corresponding to the amount standing on the sub-totalizer wheels, means for taking an impression from said type means, means for turning said sub-totalizer to zero position comprising said shaft and connections between said shaft and said wheels, and a common operating mechanism adapted at a single operation to impel said contact means against said graduated means, adjust said type means, take a total impression from said type means and rotate said shaft to turn said sub-totalizer wheels to zero.

293. In a registering machine, a set of sub-totalizer wheels, a shaft supporting said wheels, means for entering items on said wheels, graduated elements movable by said sub-totalizer wheels, pivoted feeler fingers movable into engagement with said graduated elements, type means adjustable under control of said feeler fingers and said graduated elements to positions corresponding to the amount standing on the sub-totalizer wheels, means for taking an impression from said type means, means for turning said sub-totalizer wheels to zero position comprising said shaft and connections between said shaft and said wheels, and a common operating mechanism adapted at a single operation to impel said feeler fingers against said graduated elements, adjust said type means, take a total impression from said type means and rotate said shaft to turn said sub-totalizer wheels to zero.

294. In a registering machine, the combination of a set of sub-totalizer elements, a set of grand totalizer elements, means for simultaneously entering items on both of said sets of elements, a set of graduated controlling elements moving in unison with the sub-totalizer elements, a set of arms movable into and out of engagement with the graduated controlling elements, and means comprising springs for effecting said movements, type carriers adjustable to represent sub-totals, devices controlled by the movable arms for adjusting the type carriers to print sub-totals, means for taking impressions from the type carriers, and means for clearing the sub-totalizer elements without disturbing the grand totalizer elements.

295. In a registering machine, the combination with a set of grand totalizer elements, of a set of sub-totalizer elements, means for simultaneously entering items on both of said sets of elements, a set of graduated controlling elements movable under the control of said sub-totalizer elements a set of arms movable into engagement with the graduated elements, a device having a fixed extent of movement in total taking operations, springs for transmitting motion from said device to the movable arms until said arms are arrested by the graduated controlling elements, adjustable type carriers, means controlled by the movable arms for adjusting the type carriers to represent the sub-total on the sub-totalizer elements, and means for taking impressions from said type carriers.

296. In a registering machine, the combination with a set of grand totalizer elements, of a set of sub-totalizer elements, means for simultaneously entering items on both of said sets of elements, a set of graduated controlling elements moving in unison with the sub-totalizer elements a set of arms movable into engagement with the graduated elements, a device having a fixed extent of movement in total taking operations, springs for transmitting motion from said device to the movable arms until said arms are arrested by the graduated controlling elements, adjustable type carriers, means controlled by the movable arms for adjusting the type carriers to represent the sub-total on the sub-totalizer elements, means for taking impressions from said type carriers, and means for clearing the sub-totalizer without disturbing the grand totalizer elements.

297. In a registering machine, the combination of a set of subtotalizer elements, a set of grand totalizer elements, a set of graduated elements for each of said sets of totalizer elements and movable thereby, contact means movable into engagement with either of said sets of graduated elements, type means adjustable under control of said contact means and said graduated elements to positions corresponding to the amount standing on said totalizer elements, means for taking an impression from said type means and common operating means adapted to impel said contact means against a selected one of said sets of graduated elements and adjust said type means to print the total standing on said selected set of totalizer elements.

298. In a registering machine, the combination of a set of subtotalizer elements, a set of grand totalizer elements, graduated elements movable by one of said sets of totalizer elements, contact means movable into engagement with said graduated elements, type means adjustable under control of said contact means and said graduated elements to positions corresponding to the amount standing on one of said sets of totalizer elements, means for taking an impression from said type means, means for restoring one of said sets of totalizer elements to zero position and common operating mechanism adapted to impel said contact means against said graduated elements, adjust said type means, print the total of one of said sets of totalizer elements and to restore one of said sets of totalizer elements to zero without restoring to zero the other of said sets of totalizer elements.

Witness my hand this 26th day of December, 1899.

WILLIAM S. GUBELMANN.

Witnesses:
 THEO. L. POPP,
 JNO. J. BONNER.

---

DISCLAIMER.

1,429,201.—*William S. Gubelmann*, Buffalo, N. Y. ADDING AND RECORDING MACHINE. Patent dated September 12, 1922. Disclaimer filed December 11, 1922, by the patentee.

Hereby enters this disclaimer to that part of the claim in said specification which is in the following words to wit:

"136. In a calculating machine, the combination of a plurality of sets of accumulators, actuating mechanism therefor, a set of indicators common to a plurality of said sets of accumulators for indicating items accumulated on said sets of accumulators, and means whereby said indicators may be caused to indicate the total amount accumulated on either set of a plurality of said sets of accumulators.

"137. In a calculating machine, the combination of a plurality of sets of accumulators, actuating members for causing said accumulators to accumulate items, a set of dials, and means for transferring to said dials the total amount accumulated on either of said sets of accumulators."

[*Official Gazette December 19, 1922.*]

DISCLAIMER.

1,429,201.—*William S. Gubelmann*, Buffalo, N. Y. ADDING AND RECORDING MACHINE. Patent dated September 12, 1922. Disclaimer filed December 11, 1922, by the patentee.

Hereby enters this disclaimer to that part of the claim in said specification which is in the following words to wit:

"136. In a calculating machine, the combination of a plurality of sets of accumulators, actuating mechanism therefor, a set of indicators common to a plurality of said sets of accumulators for indicating items accumulated on said sets of accumulators, and means whereby said indicators may be caused to indicate the total amount accumulated on either set of a plurality of said sets of accumulators.

"137. In a calculating machine, the combination of a plurality of sets of accumulators, actuating members for causing said accumulators to accumulate items, a set of dials, and means for transferring to said dials the total amount accumulated on either of said sets of accumulators."

[*Official Gazette December 19, 1922.*]

DISCLAIMER.

1,429,201.—*William S. Gubelmann*, Buffalo, N. Y. ADDING AND RECORDING MACHINE. Patent dated September 12, 1922. Disclaimer filed May 8, 1923, by the patentee.

Hereby enters this disclaimer to that part of the claims in said specification which read as follows:

"113. In a calculating machine the combination of a plurality of accumulators, a shaft, a plurality of engaging members one for each accumulator of a plurality of said accumulators and mounted on said shaft so as to be caused to rotate therewith, means for operating said shaft to cause said members to rotate a plurality of said accumulators, and actuating means independent of said shaft and said engaging members for actuating said accumulators for accumulating items thereon.

"284. In a calculating machine, the combination of a plurality of sets of accumulators, number keys for controlling the items accumulated on either of said sets of accumulators, a printing device for printing the items accumulated on either of said sets of accumulators, a special sign printing device operable to print a special sign in conjunction with any of the items accumulated on either of said accumulators, a key for controlling operation of said special sign printing device, and operating mechanism for operating said accumulators and item printing device according to the control of said number keys and for operating said special sign according to the control of its keys."

[*Official Gazette May 29, 1923.*]

Certificate of Correction.

It is hereby certified that in Letters Patent No. 1,429,201, granted September 12, 1922, upon the application of William S. Gubelmann, of Buffalo, New York, for an improvement in "Adding and Recording Machines," an error appears in the printed specification requiring correction as follows: Page 45, line 92, claim 60, strike out the word " thereon " and insert instead *on either of said sets;* and that the said Letters Patent should be read with this correction therein that the same may conform to the record of the case in the Patent Office.

Signed and sealed this 14th day of October, A. D. 1924.

[SEAL.]
KARL FENNING,
*Acting Commissioner of Patents.*